United States Patent
Soma et al.

(10) Patent No.: US 6,204,935 B1
(45) Date of Patent: *Mar. 20, 2001

(54) IMAGE PROCESSING METHOD AND AN IMAGE PROCESSING APPARATUS

(75) Inventors: Tsunenori Soma, Kawasaki; Katsumi Masaki, Yokohama; Masayuki Takayama, Yokohama; Hiroshi Netsu, Yokohama; Masashi Takizawa, Yokohama; Makoto Nihei, Yokohama; Koji Kawamura, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/518,326

(22) Filed: Aug. 23, 1995

(30) Foreign Application Priority Data

| Aug. 26, 1994 | (JP) | 6-201894 |
| Aug. 31, 1994 | (JP) | 6-207486 |
| Aug. 31, 1994 | (JP) | 6-207490 |
| Aug. 31, 1994 | (JP) | 6-207491 |
| Nov. 4, 1994 | (JP) | 6-270944 |
| Jan. 18, 1995 | (JP) | 7-023431 |

(51) Int. Cl.$^7$ .............. H04N 1/40; H04N 1/387
(52) U.S. Cl. ............. 358/448; 358/452; 358/453
(58) Field of Search .................. 358/448, 462, 358/453, 467, 463, 464, 540, 452; 382/175, 176, 185, 173

(56) References Cited

U.S. PATENT DOCUMENTS

| 5,506,697 | * | 4/1996 | Li et al. | 358/462 |
| 5,570,432 | * | 10/1996 | Kojima | 358/462 |
| 5,572,601 | * | 11/1996 | Bloomberg | 358/462 |
| 5,617,485 | * | 4/1997 | Ohuchi et al. | 358/462 |

* cited by examiner

*Primary Examiner*—Cheukfan Lee
(74) *Attorney, Agent, or Firm*—Fitzpatrick, Cella, Harper & Scinto

(57) ABSTRACT

An image processor reads an original that includes an original image and an attribute instruction image, for designating the contents of the image processing that is performed on the original image. This ensures that image processing is performed in consonance with the contents of the attribute instructions that are indicated by the attribute instruction image. A scanner reads a format original wherein instructions for data attributes, such as a range for a character frame and a character color, are expressed with a bar code. The pattern of the read bar code is analyzed, and the attribute instruction data, such as the range for a character frame and a character color, are temporarily stored in a RAM. An original to be output is read by the scanner and is stored as image data in the RAM. Image processing (color conversion, etc.) that correspond to the attribute instruction data is performed on the image data, and a printer prints image data obtained by performing all of the instructed image processes.

18 Claims, 47 Drawing Sheets

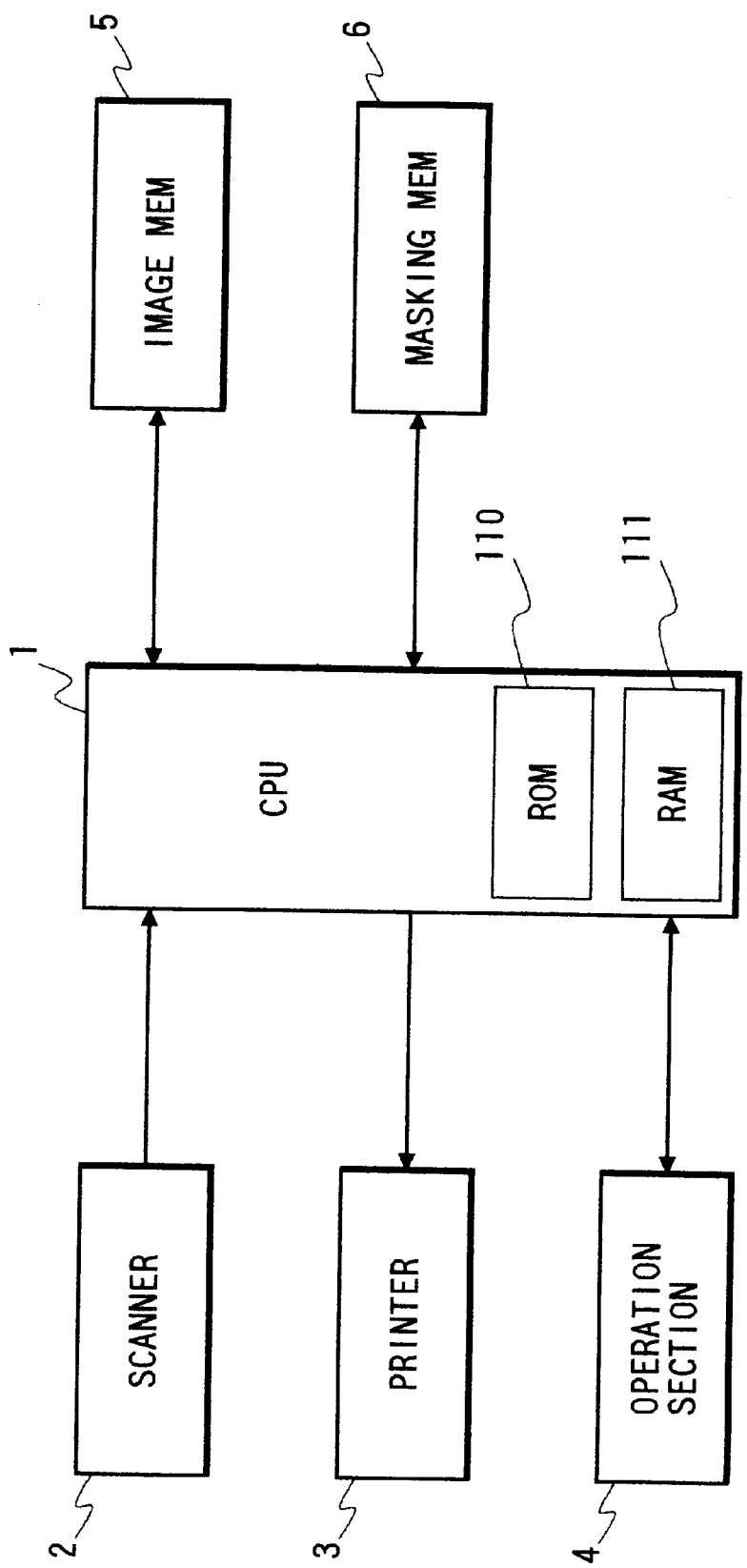

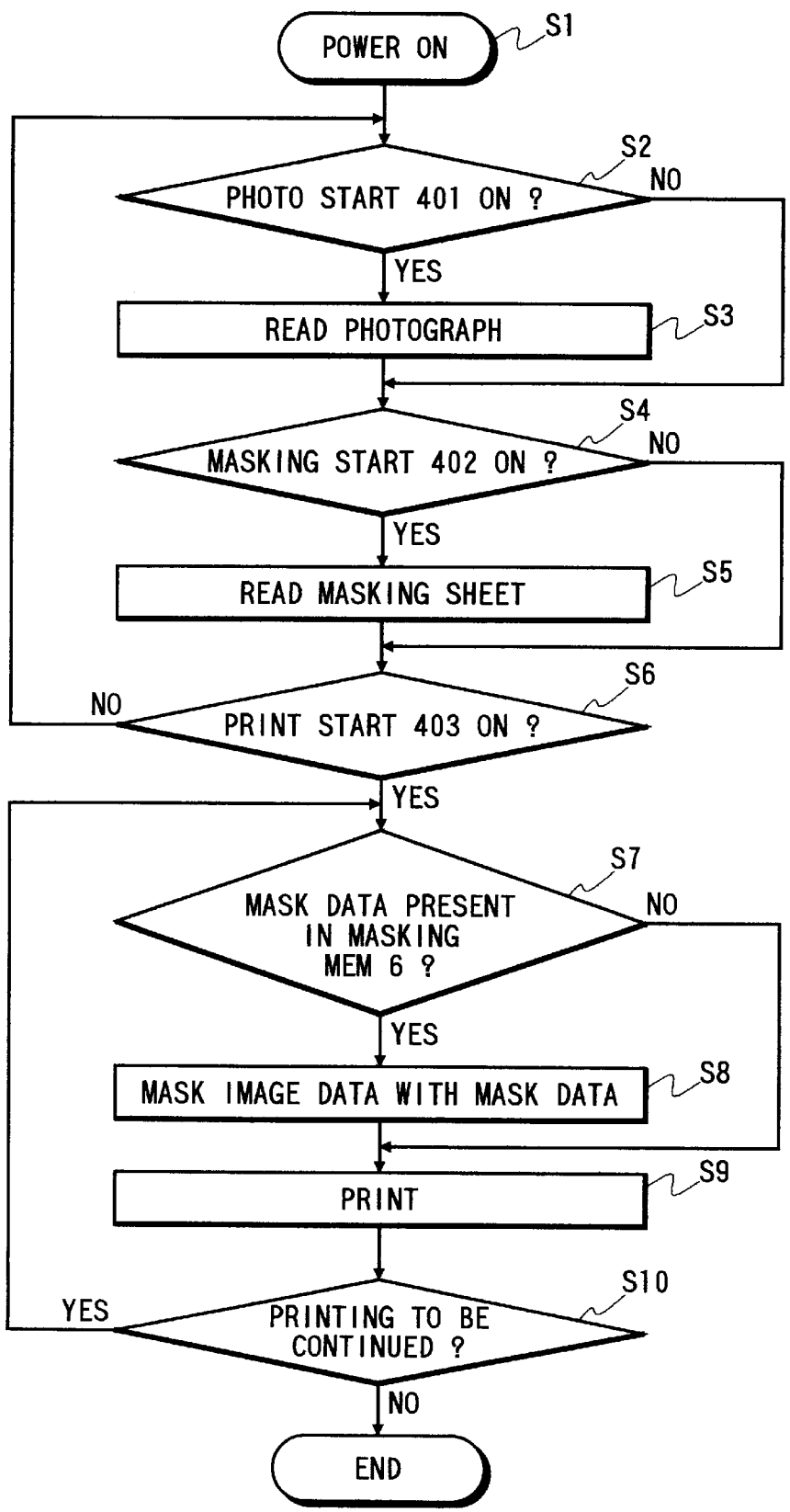

FIG. 9
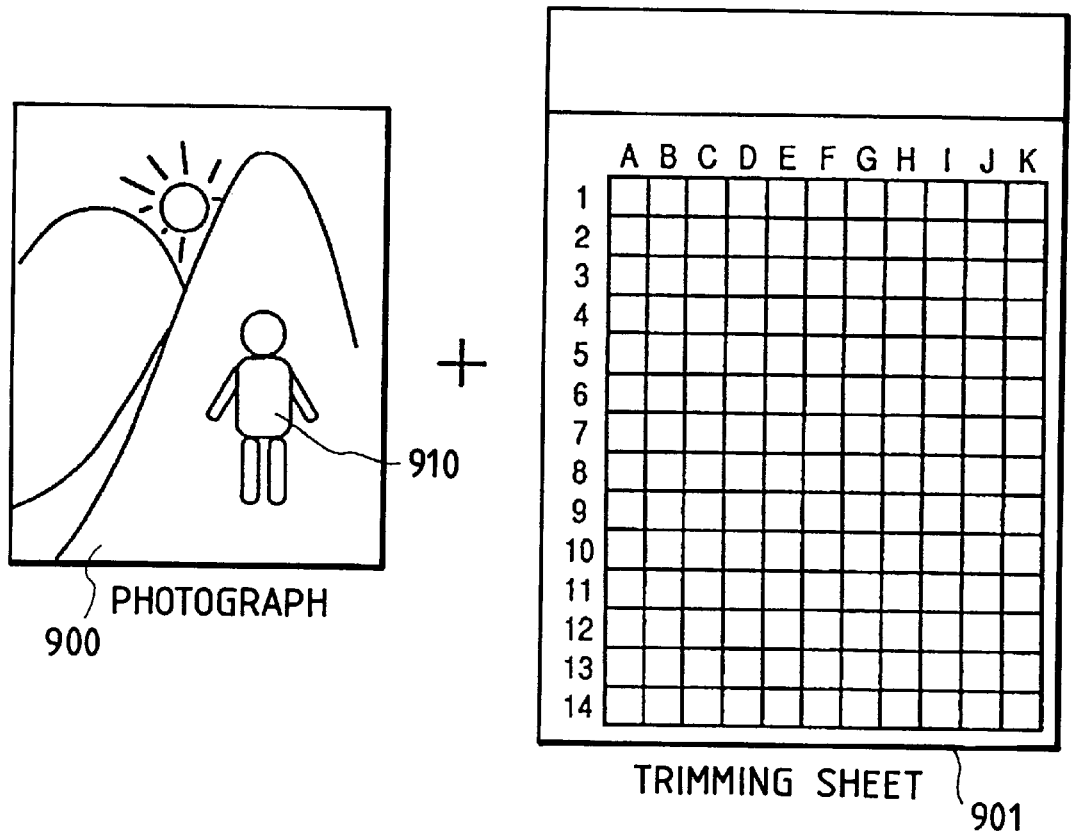
PHOTOGRAPH 900
TRIMMING SHEET 901
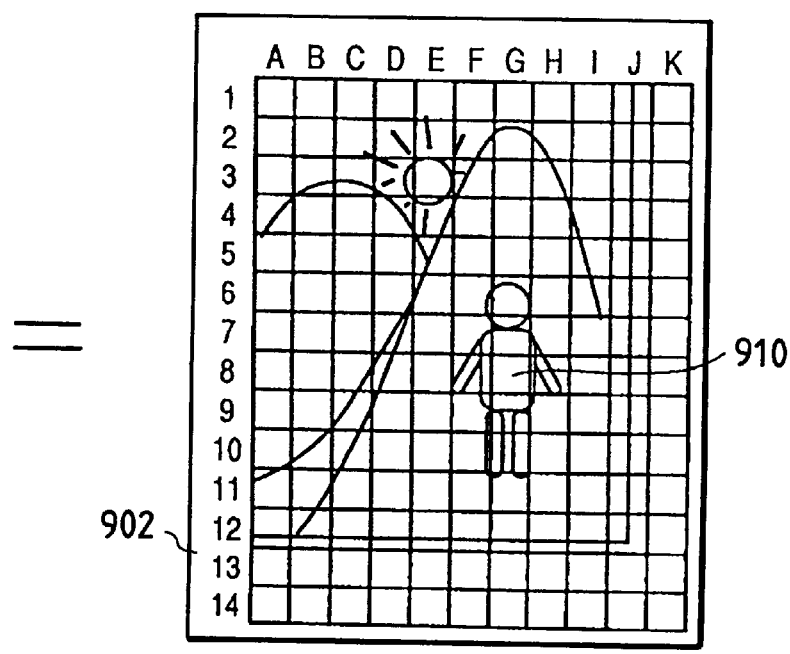

FIG. 30A    FIG. 30B
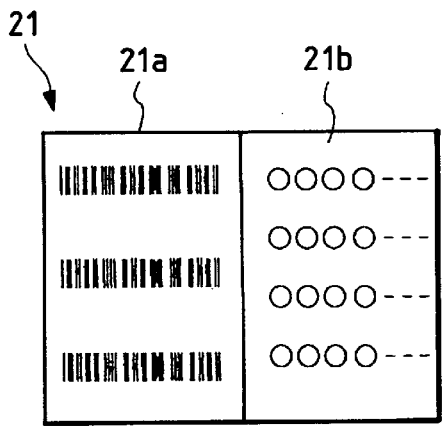
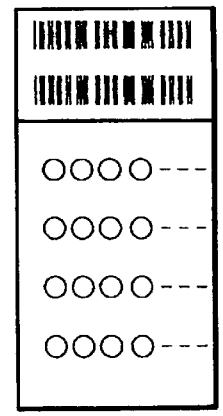
FIG. 30C
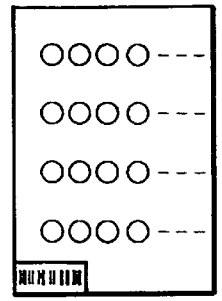
FIG. 32
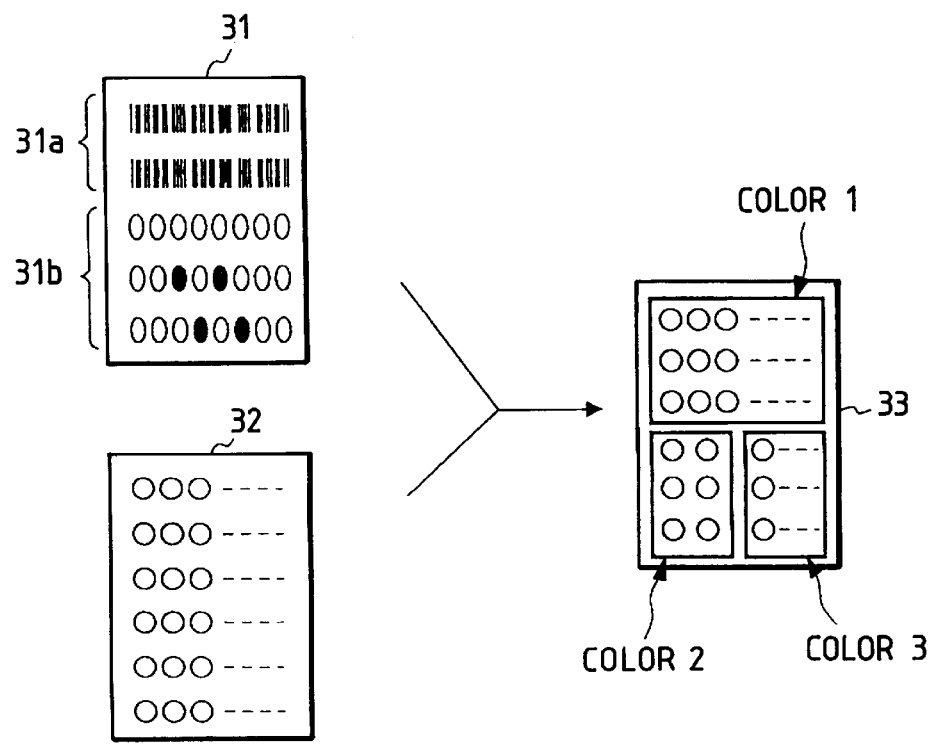

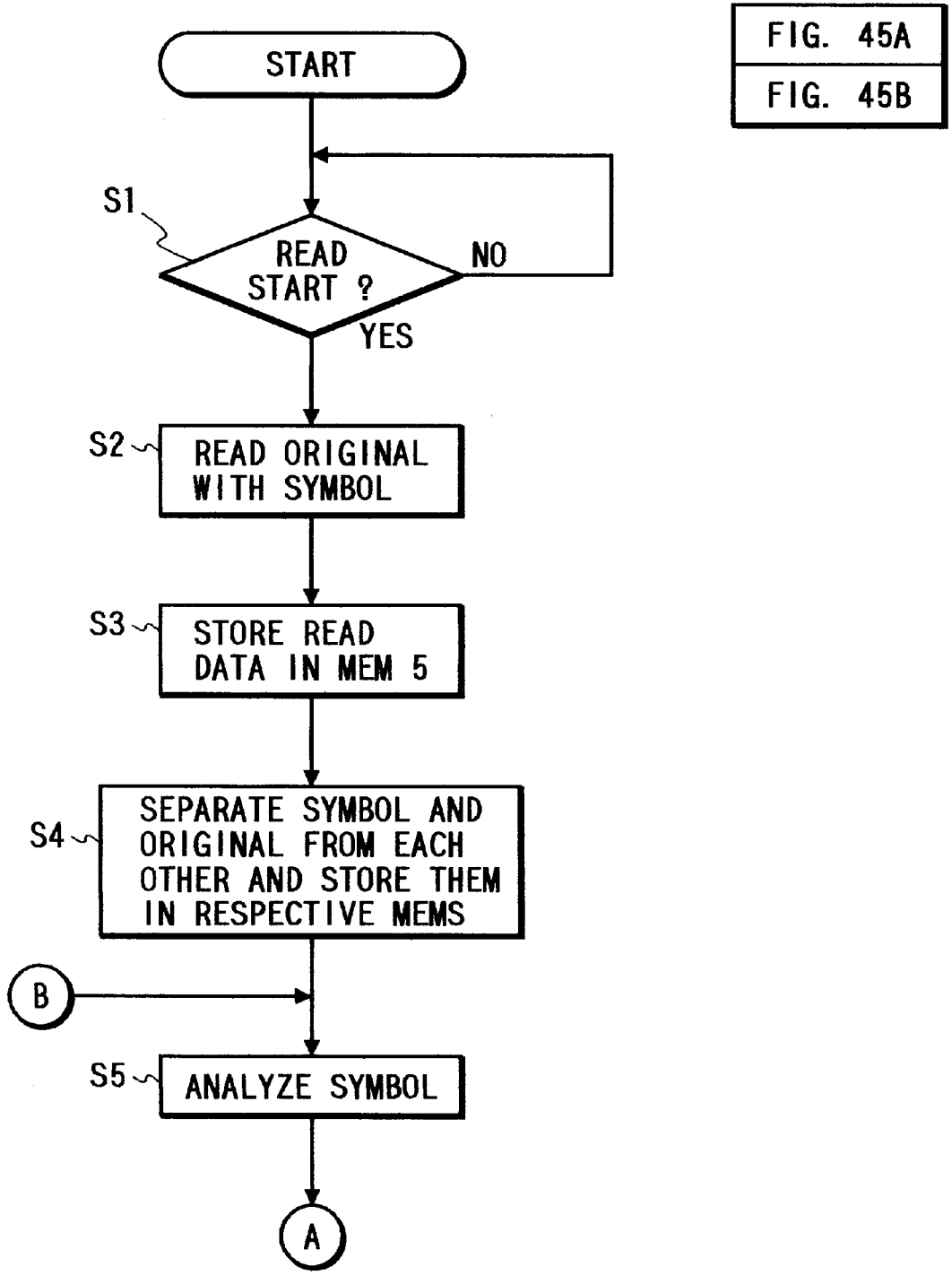

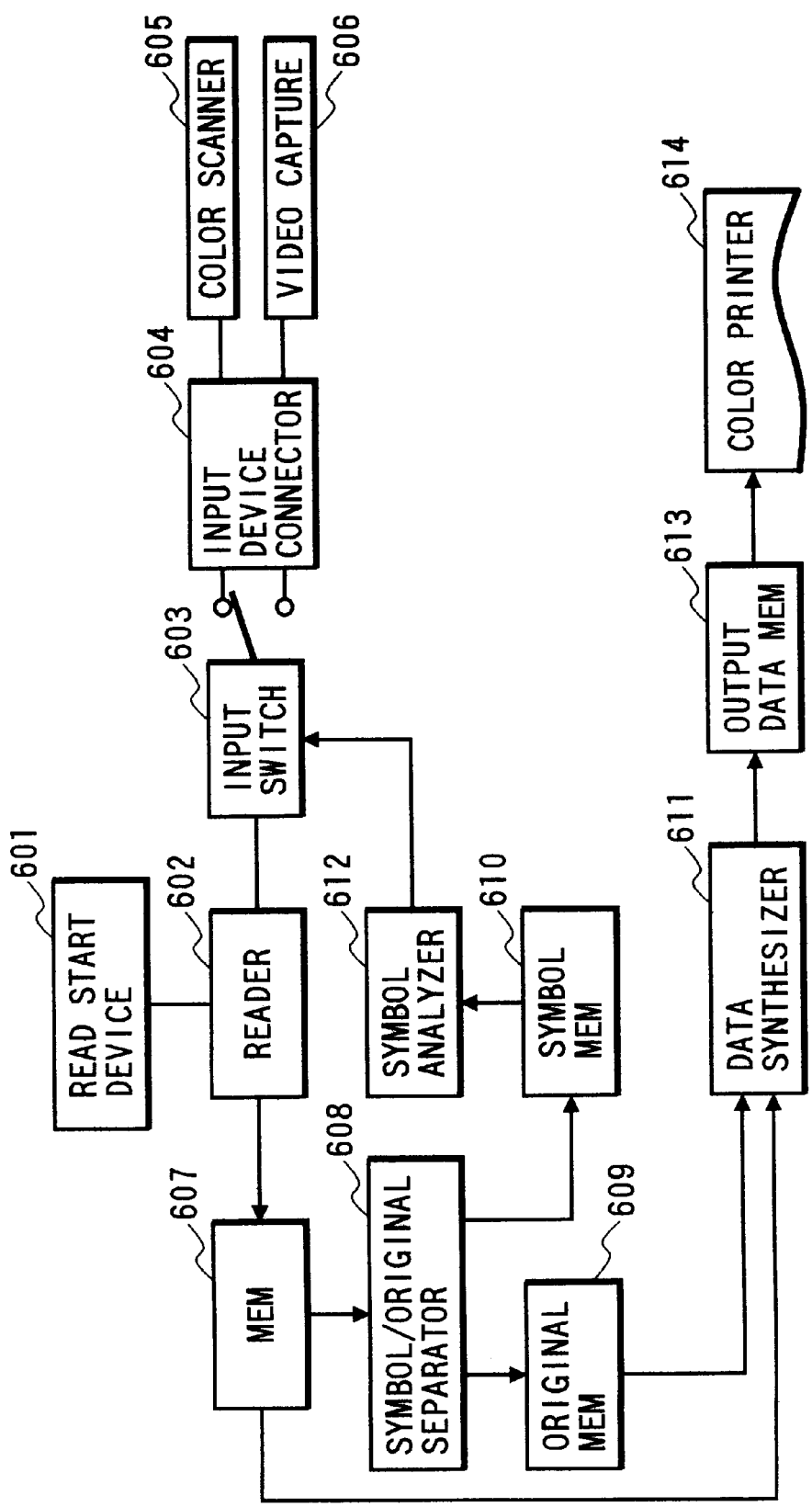

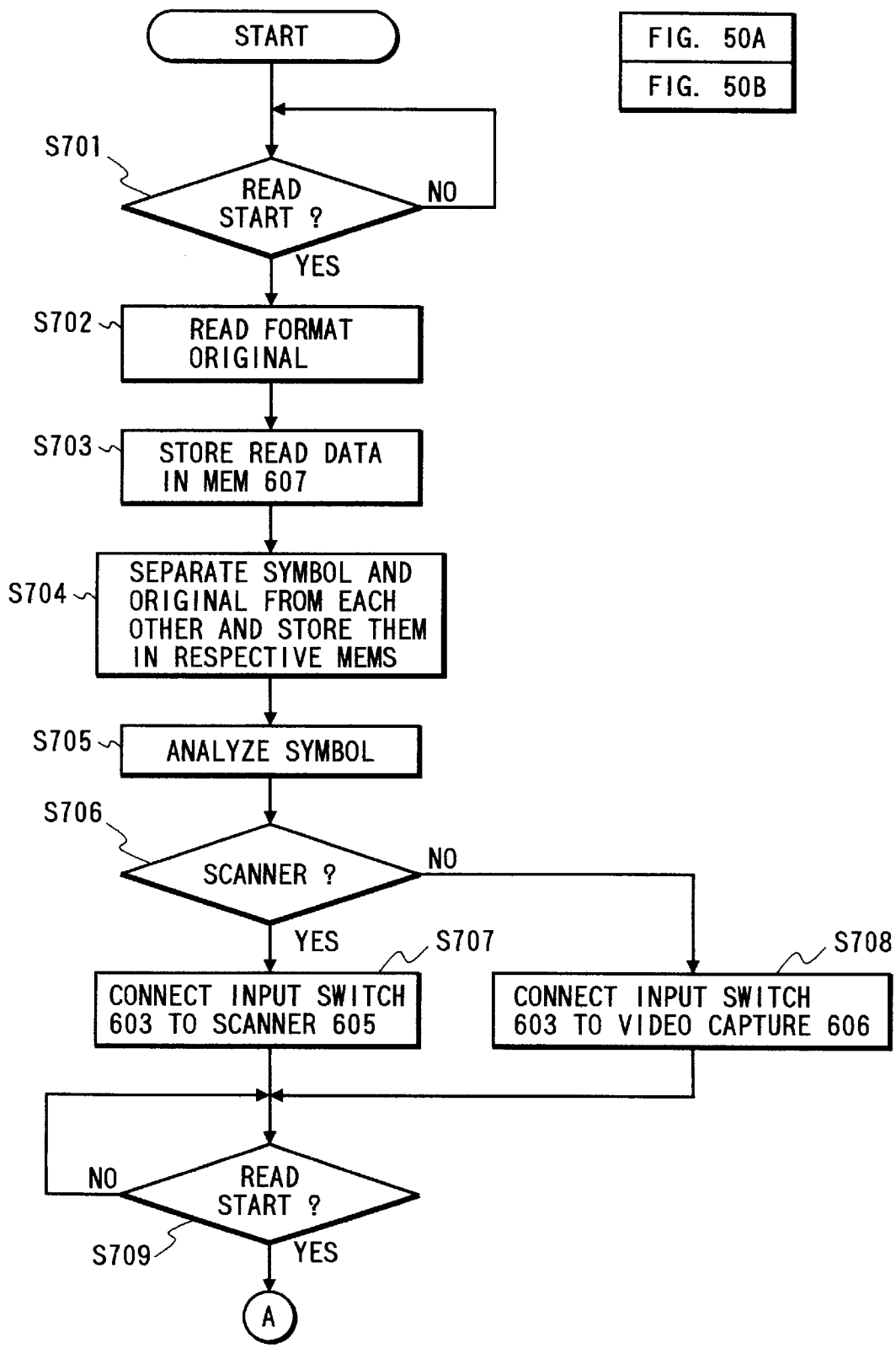

| FIG. 53A |
| FIG. 53B |

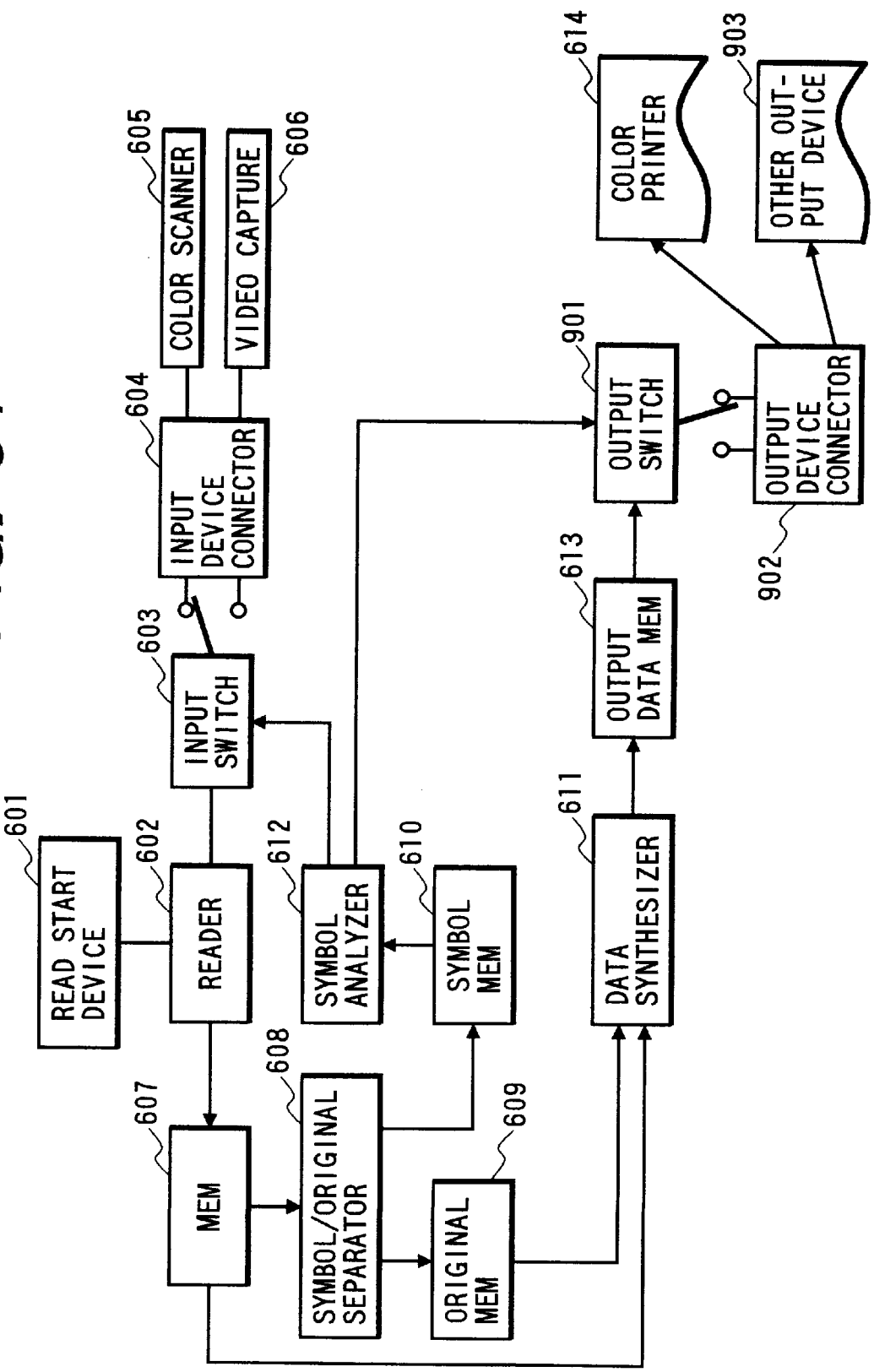

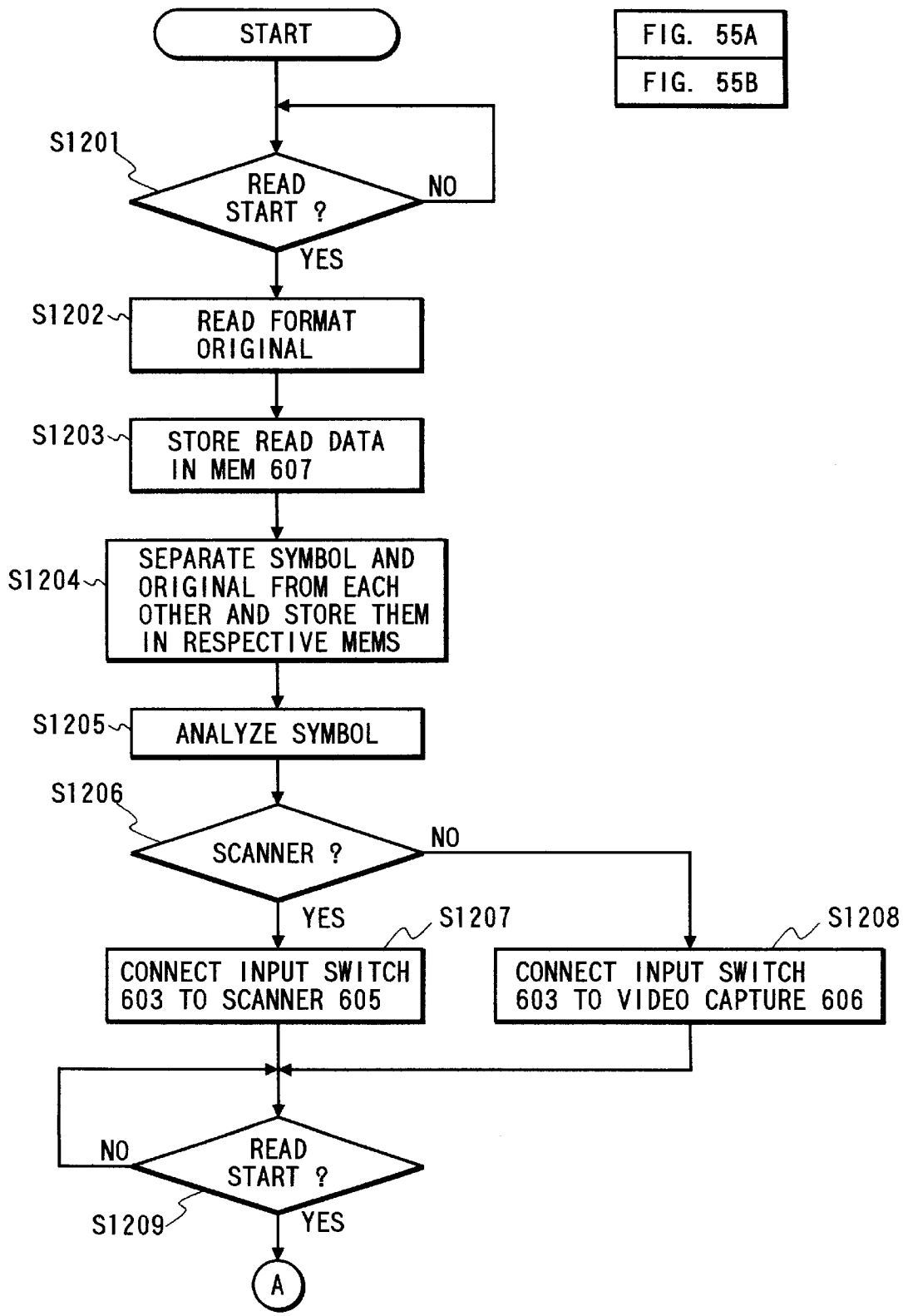

IMAGE PROCESSING METHOD AND AN IMAGE PROCESSING APPARATUS

BACKGROUND OF THE INVENTION

1. Field of the Invention

The present invention relates to an image processing method and apparatus by which image processing is performed on a read image.

2. Related Back Ground Art

Copy machines are known that read an image of a document, such as a photograph, perform desired image processing on the read image, and print the image. With such a copy machine, to make copies while a specific portion of the document image is masked, first, the image is copied and a coordinate input device is used to designate a portion to be masked by referring to the copied image. In a personal computer, etc., to mask a document image, the image is first read by a scanner and is displayed on a display device, such as a monitor or a liquid crystal display, a display screen is then covered with a desired masking pattern to select a masking process.

As described above, since conventionally the masking is performed on image data by either printing a document image and designating a location for masking, or by displaying an image to be processed on a screen and designating a masking position, an output device, such as a printer or a display, is required. Accordingly, the cost and size of the apparatus increases, and its operation becomes complicated.

To overcome the above shortcomings, it is a first object of the present invention to provide an image processing method whereby a sheet, on which information instructing a processing method of a document image is described, is read by an image input section and the instructed image processing on the sheet is performed to output resultant image data, and to provide an apparatus for performing such image processing.

It is a second object of the present invention to provide an image processing method whereby the reading of a sheet on which a mask position is indicated and the reading of a document image are performed by a common reading section and the document image is output, and to provide an apparatus for performing such image processing.

It is a third object of the present invention to provide an image processing method whereby an image processing position is designated by using a mark sheet, image processing is preformed on the designated document image position and the resultant image is output, and to provide an apparatus for performing such image processing.

It is a fourth object of the present invention to provide an image processing method whereby a position for image processing and the number of copies are designated by using mark sheets that ensure the output of a designated number of sheets of desired image data, and to provide an apparatus for performing such image processing.

Conventionally, in an image processing apparatus that employs a color scanner to read a color document image and processes the read document, various procedures are performed with the input color image data before the resultant image is output.

Color image data at a high resolution, for example, is superior in image quality to color image data at a low resolution. When color image data are processed at a high resolution, however, the processing volume is increased as the amount of data involved is significantly larger, and as a result the memory capacity required for storing the image data also increases.

To read and process a color document including both characters and photographs, the required processing time increases as the data amount involved increases. However, although a significant amount of time is spent in performing various procedures, smudges occur in the image of characters that are reproduced and printed.

To resolve the above described conventional problems, it is a fifth object of the present invention to provide an image processing method whereby input character data are binarized and input photographic data are processed by using multi-bit data at a low resolution to reduce the total amount of image data, and to provide an apparatus for performing such image processing.

It is a sixth object of the present invention to provide an image processing method whereby processing time for character data is reduced to shorten the total processing time required for a synthesis image, and to provide an apparatus for performing such image processing.

It is a seventh object of the present invention to provide an image processing method for the reproduction of desirable character images, and to provide an apparatus for performing such image processing.

It is an eighth object of the present invention to provide an image processing method for binarizing character images and for processing photo images at a lower resolution to reduce the total time required for processing image data, and to provide an apparatus for performing such image processing.

Conventionally, an image processing apparatus that performs superimposition of characters, images and illustrations reads, for example, images and illustrations by using an image reader, such as a scanner, to perform superimposition of them.

Therefore, for removing a stain from an image or for correcting a blank area, the read data must first be displayed on a display device, and a user must then designate a range in the data and remove the stain or compensate for the blank area. Such a correction can not be permitted by a dedicated apparatus such as this apparatus.

In addition, although the dedicated apparatus can be connected to a plurality of readers, it must select only one at a time and must read data by switching readers. Further, as means for combining a color image and an illustration into one, documents to be printed must be prepared according to colors. Moreover, when data are to be output to a plurality of different devices, the connections to output devices must be switched, or a user must switch the output devices that are connected via a selector.

Therefore, a conventional apparatus requires a display device and a pointing device, such a keyboard, that designates a range in the data to correct an image; accordingly, the cost of such an apparatus is high. Also, processes requiring an operator, such as delicate correction that is performed after an image has been enlarged, are needed.

To change the connection of input/output devices, an operator must remove a currently connected device and connect a new one or must operate a selector, which reduces the efficiency of the entire processing operation.

To overcome these conventional shortcomings, it is a ninth object of the present invention to provide an image processing method wherein a symbol and a corresponding process are input with an image and are set in as apparatus in advance, to reduce interference by an operator during the procedures that are performed for image processing and to increase the efficiency of the processing, and to provide an apparatus for performing image processing.

It is a tenth object of the present invention to provide an image processing method whereby by reading how to cope with stains or blank areas when an image is read, the stains and the blank areas can be handled according to the read-out processing method and an image can thus be easily corrected without requiring interference by an operator, and to provide an apparatus for performing such image processing.

It is an eleventh object of the present invention to provide an image processing method whereby, by reading, at the same time that a document is read, previously recorded symbols that represent an input and an output device, a switching operation for the input/output devices is not required and the operating efficiency can therefore be increased, and to provide an apparatus for performing such image processing.

SUMMARY OF THE INVENTION

To achieve the above described objects, according to one embodiment of the present invention an image processing apparatus includes, a reading means which reads an original image and an instruction image whose content instructs image processing that is to be performed for the original image, and an acquisition means which acquires instruction information by analyzing the instruction image. A processing means processes original image data that are obtained by reading the document image in consonance with the instruction information, and an output means for outputting original image data obtained by the processing means.

The other objects and features of the present invention will become obvious by referring to the following specification and drawings.

BRIEF DESCRIPTION OF THE DRAWINGS

FIG. 2 is a schematic block diagram illustrating the arrangement of the scanner printer according to the first embodiment of the present invention;

FIG. 4 is a flowchart of the processing performed by the scanner printer according to the first embodiment of the present invention to read and print a photograph original;

FIG. 9 is a diagram for explaining the position of a photographic image relative to a mark sheet according to the second embodiment of the present invention;

FIGS. 30A through 30C are diagrams illustrating original image examples according to an eighth embodiment of the present invention;

FIG. 32 is a diagram showing an attribute instruction image and an original image, and an output that is obtained from them according to a ninth embodiment of the present invention;

FIG. 49 is a block diagram illustrating the arrangement of an apparatus that represents the feature of a twelfth embodiment of the present invention;

FIG. 54 is a block diagram illustrating the arrangement of an apparatus that represents the feature of a fourteenth embodiment of the present invention.

DETAILED DESCRIPTION OF THE PREFERRED EMBODIMENTS

The preferred embodiments of the present invention are described in detail below while referring to the accompanying drawings.

First Embodiment

Figure 1:
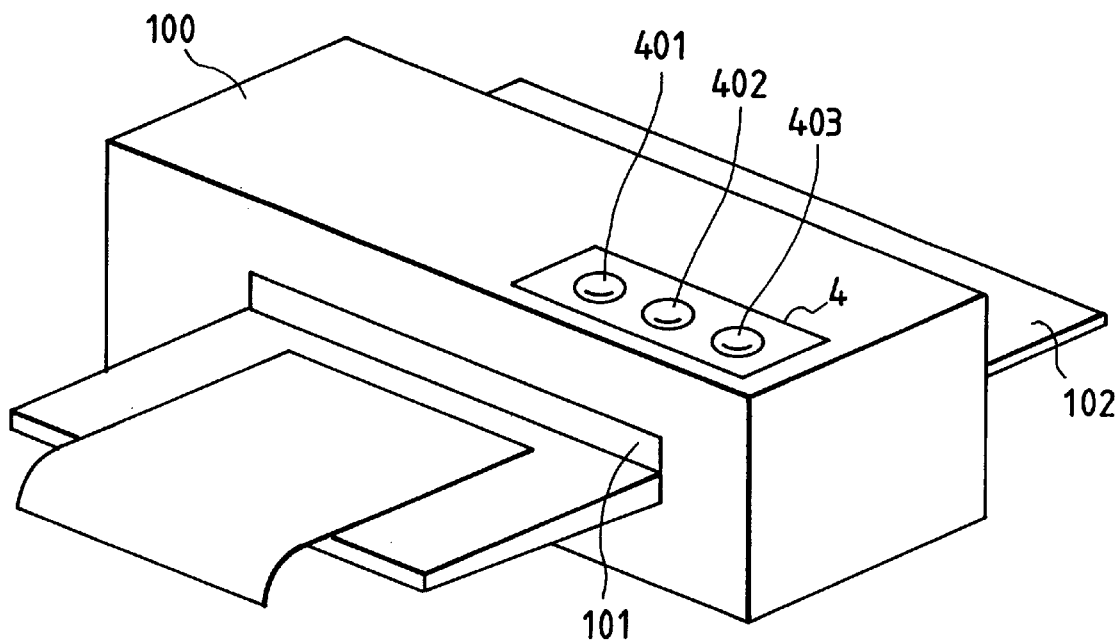
FIG. 1 is a perspective view of the outline of a scanner printer according to a first embodiment of the present invention.

FIG. 1 is a diagram illustrating the configuration of a scanner printer 100 according to a first embodiment of the present invention.

When an operation is instructed by using an operation section 4, and a photograph or a masking sheet, for example, is fed through an entrance 101, the sheet is fetched and read by the main body of the printer 100 and is discharged from an exit 102. Then, when printing is instructed by the operation section 4, and a recording medium, such as a card, is fed through the entrance 101, an image on which masking has been performed is printed on the card, which is discharged from the exit 102.

FIG. 2 is a schematic block diagram illustrating the arrangement of the scanner printer 100 according to the first embodiment of the present invention.

In FIG. 2, a CPU 1 employs a control program that is stored in a ROM 110 to control the entire printer 100. A RAM 111 is used as a work area in which various data are temporarily held during the operation of the CPU 1. A scanner 2 reads a photograph, a masking sheet, etc., that are fed into the main body through the entrance 101. A printer 3 prints an image on a recording medium, such as a card, under the control of the CPU 1. The CPU 1 receives image data from the scanner 2 and instructs the performance of various processes. More specifically, upon the receipt of an instruction from the operation section 4, the scanner 2 reads a photograph or a masking sheet. When the photograph is read by the scanner 2, image processing that is consonant with the output system of the printer 3 is performed, and the result is stored in an image memory 5. In the same manner, when a masking sheet is read by the scanner 2, information that describes a masking area that is instructed on the masking sheet is stored in a masking memory 6. When a printing instruction is entered through the operation section 4, the CPU 1 reads the image data that are stored in the image memory 5 and also the masking area data that are stored in the masking memory 6. A masking process that is consonant with the masking area data is performed on the image data that are read from the image memory 5. The results are output as print information to the printer 3. Through this process, the masked image data is printed by the printer 3.

Figure 3:
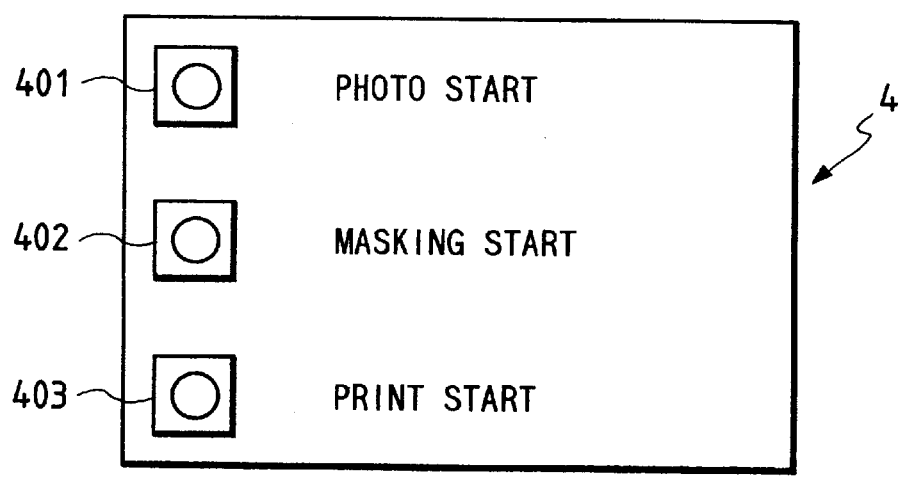
FIG. 3 is a diagram showing a key arrangement example for an operation section according to the first embodiment of the present invention.

FIG. 3 is a diagram illustrating an example arrangement of key switches for the operation section 4 in the scanner printer 100 according to the first embodiment.

A key 401 is used to instruct the start of the reading for a photograph, a key 402 is employed to instruct the start of the reading for a masking sheet, and a key 403 is used to instruct the start of printing. Upon the depression of a key, an LED (a lamp, etc.), which is incorporated in the top of each key is turned on, and a signal corresponding to the key that is depressed is transmitted to the CPU 1. The LEDs for the keys are turned off under the control of the CPU 1 in consonance with a reset procedure when the power is on or upon the termination of the processing.

FIG. 4 is a flowchart showing a printing process performed by the scanner printer 100 according to the first embodiment. A control program for executing this process is stored in the ROM 110.

When the apparatus 100 is powered on at step S1, at step S2, a check is performed to determine whether or not the photo read start key 401 of the operation section 4 has been depressed. When the photo read start key 401 has been depressed, at step S3, the LED for the key 401 is turned on, a photographic original that is positioned at the entrance 101 is fed into the main body of the apparatus, and is read by the scanner 2. The image data thus obtained are stored in the image memory 5. The photograph that has been read in this manner is discharged from the exit 102 and the LED of the key switch 401 is turned off.

Then, at step S4, a check is performed to determine whether or not the masking original read start key 402 of the operation section 4 has been depressed. When the key 402 has been depressed, at step S5, in the same manner as at step S3, the LED of the key switch 402 is turned on, a masking original that is positioned at the entrance 101 is fed into the main body and is read by the scanner 2, and the read masking image data are stored in the masking memory 6. Then, the masking original is discharged from the exit 102 and the LED of the key switch 402 is turned off. While there is no key switch depressed at steps S2 and S4, the process repeatedly loops across steps S2 through S6.

Figure 5:
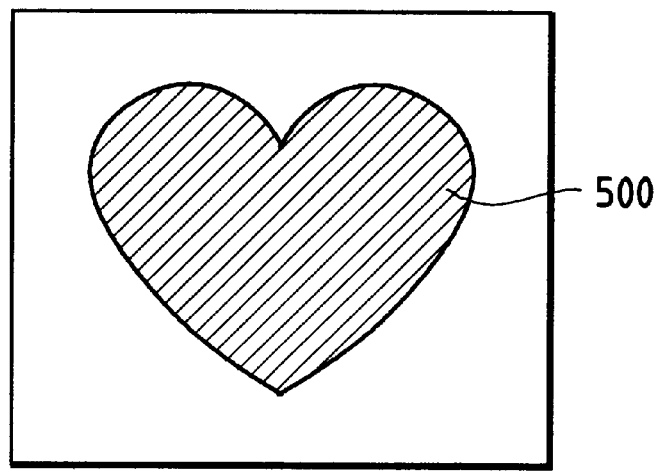
FIG. 5 is a diagram showing an example of a masking sheet according to the first embodiment of the present invention.

FIG. 5 is a diagram showing an example of a masking original (sheet) where a masking area 500 is drawn in an image print area. Information that describes the masking area may be provided by printed material or may be prepared by drawing a masking pattern on a blank sheet by hand.

Program control moves to step S6 where the depression of the print start key 403 is waited for. When the print start key 403 has been depressed to instruct the start of printing, the LED for the key 403 is turned on and the feeding of a recording medium, such as a card, is waited for. At step S7, a check is performed to determine whether or not mask data are present in the masking memory 6. When the mask data are stored there, at step S8 the image data are read from the image memory 5 and are masked with the masking area information that is stored in the masking memory 6. At step S9, the masked image data are transmitted as print data to the printer 3. If, at step S7, no mask data are present in the masking memory 6, the image data in the image memory 5 are output unchanged to the printer 3.

In the case wherein the mask data are stored in the masking memory 6, the image data that are masked with the mask data are printed by the printer 3 on a recording medium, such as a card, and the printed medium is discharged from the exit 102. When the printing has been completed, the LED of the key switch 403 is turned off. When an instruction is issued to again perform the same printing, program control returns from step S10 to step S7, and the same process is repeated. To print an image that is masked with different image data or different mask data, the same process need only be performed again.

As is described above, according to the first embodiment, an original image is masked and printed by employing a simple operation. In addition, since a desired masking, for example, is performed on a photographic image, for example, and the masked image is printed on a card, etc., a variety of different cards are made through the execution of a simple operation.

Second Embodiment

Figure 6:
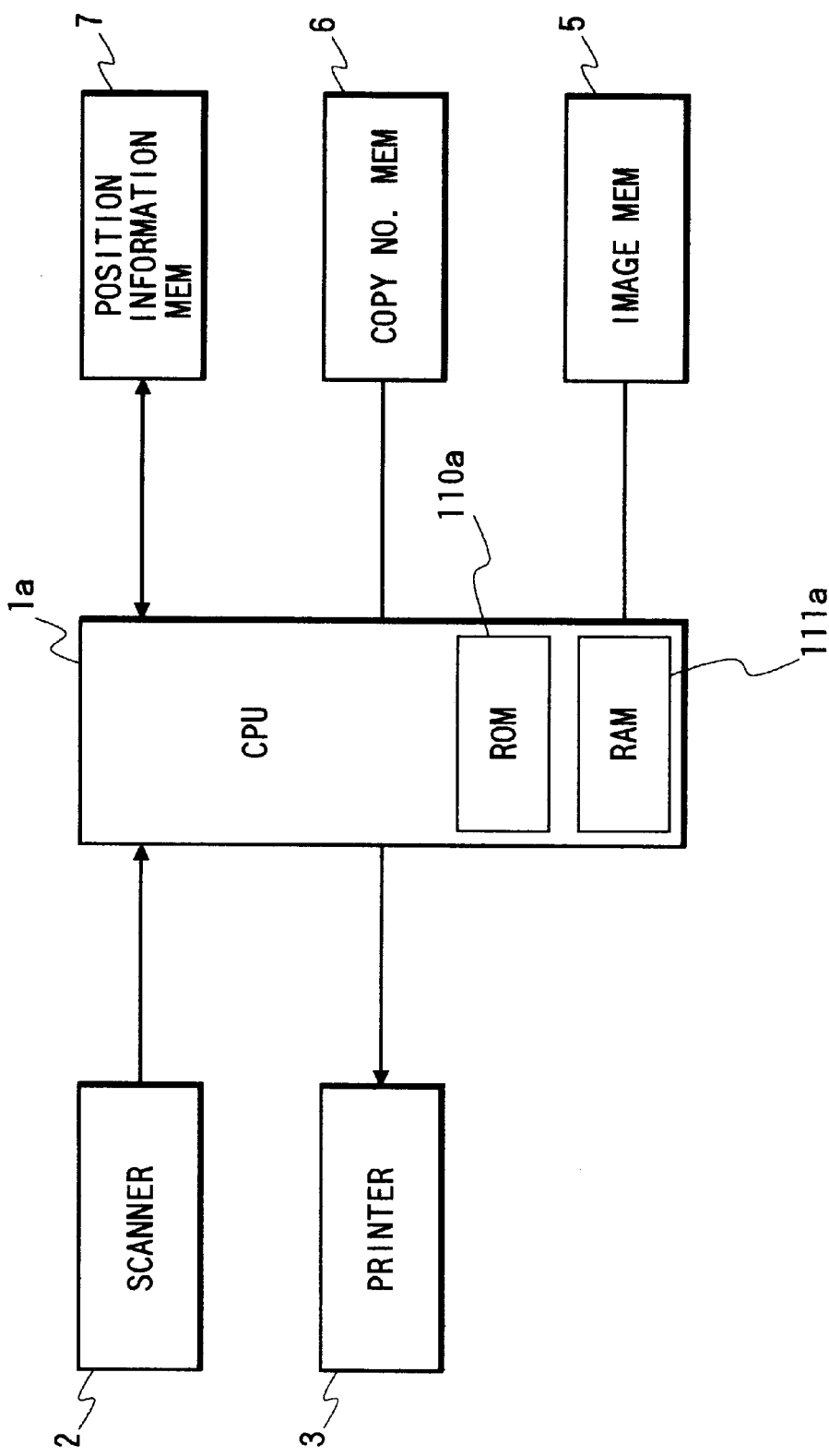
FIG. 6 is a schematic block diagram illustrating the arrangement of a scanner printer according to a second embodiment of the present invention.

FIG. 6 is a schematic block diagram illustrating the arrangement of a scanner printer according to a second embodiment of the present invention. The same reference numbers as are used in the first embodiment are also used to denote corresponding or identical components, and no further description of them is given.

In FIG. 6, a CPU 1a employs a control program that is stored in a ROM 110a to control the entire apparatus. A RAM 111a is used as a work area for the temporary storage of various data during the operation by the CPU 1a. The CPU 1a receives read information (image data) from a scanner 2 and executes various processes. More specifically, at the first reading by the scanner 2 where a mark sheet is assumed to be read, a check is performed to determine whether or not a mark sheet is present, and information that is instructed by a mark sheet is examined. When information to designate a trimming position for a photograph that is next to be read is included in the mark sheet, the position information that is instructed by the mark sheet is stored in a position information memory 7. Under the control of the CPU 1a, the acquired position information is stored in the position information memory 7, or the contents of the information are output to the CPU 1a.

When information that designates the number of the recording medium units, such as cards, that are to be copied is included in the mark sheet, the information for the number of copies is stored in a copy number memory 8. Under the control of the CPU 1a the number of copies are stored in the copy number memory 8, or the number of copies is output to the CPU 1a.

At the second reading by the scanner 2 whereat an original image, such as a photograph, is assumed to be read, image processing is performed whereby image data that are output by the scanner 2 are received and converted into print data in consonance with the output mode of the printer 3. For which position of a photographic image the image processing is to be performed is determined according to position information that is stored in the position information memory 7. The result obtained through the image processing is stored in the image memory 5. An image that is determined by a mark sheet and cut out is enlarged or reduced in consonance with the size of a print area that is established in advance.

When the second reading of an image performed by the scanner 2 and a process for the read image data are completed, the CPU 1a executes the printing process. That is, the CPU 1a controls the printer 3, reads the image data that are stored in the image memory 5, and executes the printing process. Each time printing is performed, the CPU 1a reads the copy number information from the copy number memory 8, decrements that number by one, and stores the decremented results in the copy number memory 8. Further, the CPU 1a examines the decremented results to determine whether or not it is "0". If the result is not "0", printing is again performed. If the result is "0", the process is terminated.

Figure 7:
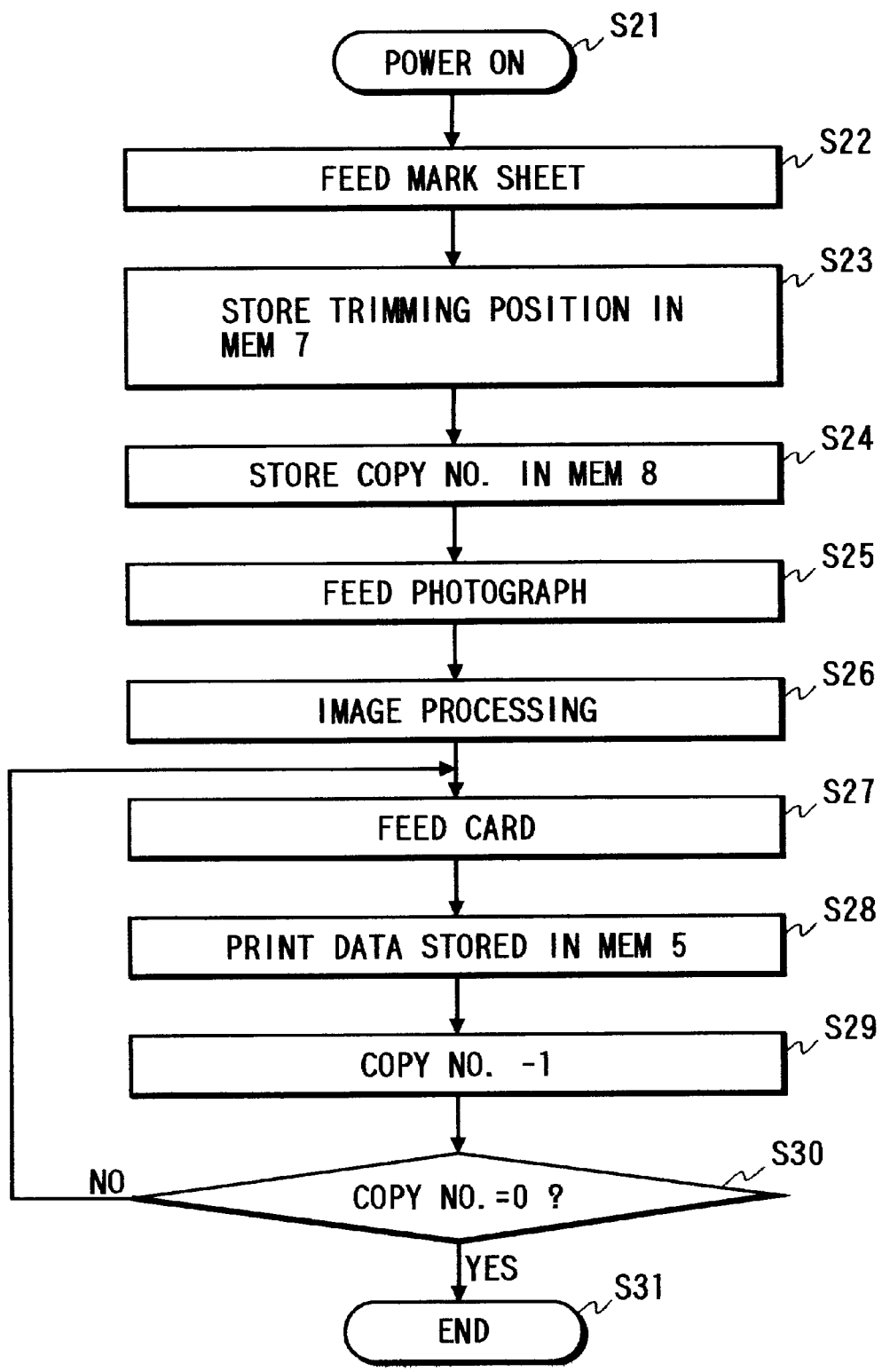
FIG. 7 is a flowchart of the processing performed by the scanner printer according to the second embodiment of the present invention to read and print a photograph original.

The operation of the scanner printer is described below while referring to the flowchart in FIG. 7.

The processing begins when the scanner printer is powered on at step S21. At step S22, a mark sheet that is fed through the entrance 101 is read by the scanner 2. At step S23, a trimming position that is described in the mark sheet is read, and information for the read trimming position is stored in the position information memory 7. Then, at step S24, the number of copies that is indicated on the mark sheet is read and stored in the copy number memory 8.

At step S25, a sheet bearing a photograph is fed through the entrance 101 and the photographic image is read by the scanner 2. At step S26, image processing is performed on the data of the read photographic image. At this time, which portions of the image should be processed is determined by using the position information that is stored in the position information memory 7. Then, a cut-out image is enlarged or reduced in consonance with an image in a determined copy size, and the resultant image data are stored in the image memory 5.

At step S27, a recording medium unit, such as a card, is fed through the entrance 101. Since an automatic paper feeder (not shown) is usually connected to the scanner printer of this embodiment, the procedure can be shifted from step S26 to step S27 without bothering an operator.

At step S28, the printer 3 is activated and the print information that is stored in the image memory 5 is transmitted to the printer 3. Thus, the printing is performed. When the printing is completed, the CPU 1*a* decrements, by one, the data for the number of copies that is stored in the copy number memory 8 and stores the resultant value in the copy number memory 8 (step S29). At step S30, the CPU 1*a* examines the result to determine whether or not it is "0". If the result is not "0", program control moves to step S27 and the printing of the next sheet is performed. If the result is "0", program control advances to step S31 where a series of processes is terminated.

Figure 8:
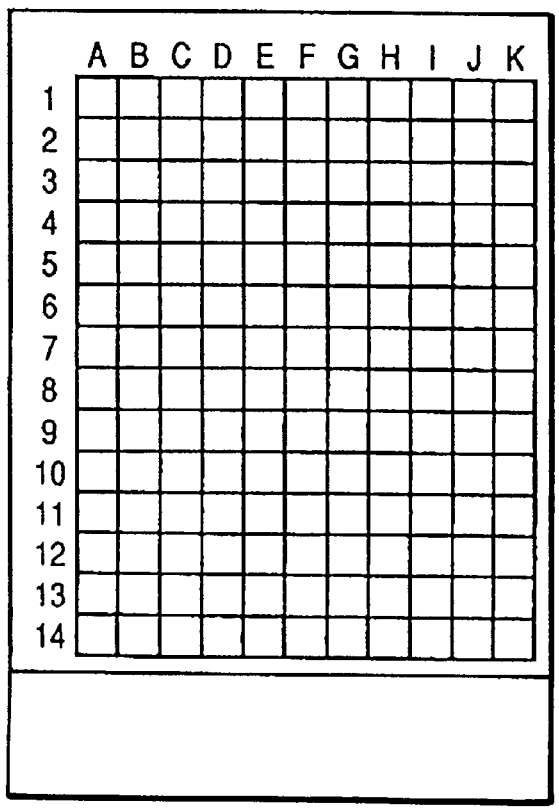
FIG. 8 is a diagram showing an example of a masking sheet according to the second embodiment of the present invention.
Figure 10:
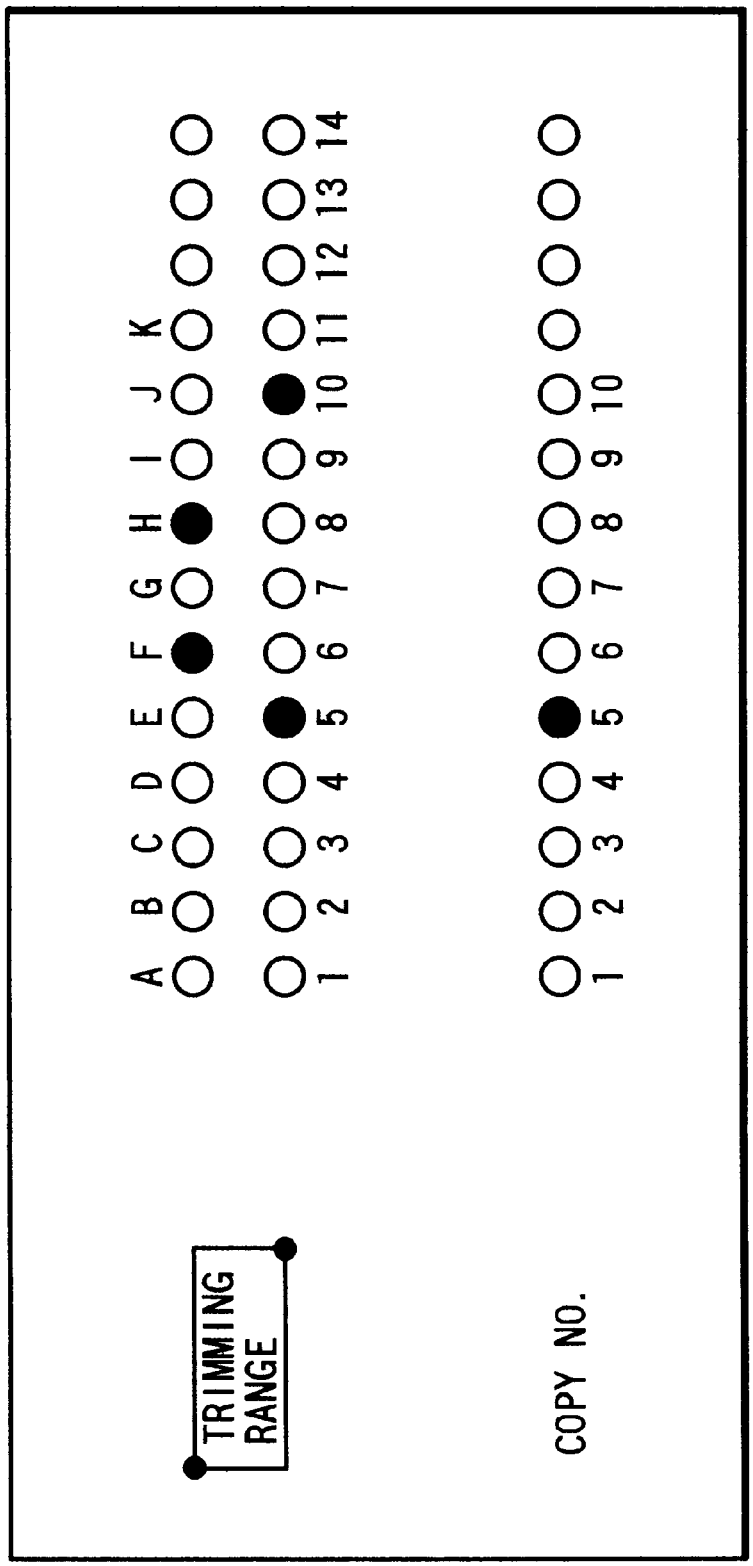
FIG. 10 is a diagram showing an example for a trimming range in a mark sheet and an example of a designation of the number of copies according to the second embodiment of the present invention.

FIG. 8 is a diagram showing an example of a trimming sheet that is employed in this embodiment, and FIG. 9 is a diagram for describing the superimposition of a photograph 900 and a trimming sheet 901. In this case, the trimming sheet image 901 is superimposed on the photographic image 900, and the left upper corner of the photographic image 900 is matched with the original point of the trimming sheet 901. A trimming range is then designated by determining the coordinates of the left upper position and the right lower position. FIG. 10 is a diagram showing an example where the trimming position is designated. In this example, the left upper coordinates (F, 5) and the right lower coordinates (H, 10) are selected as a trimming range, and are marked in a mark sheet, as is shown in FIG. 10. In addition, the number of copies, five in this example, is recorded on the mark sheet, as is shown in FIG. 10.

When the above setup mark sheet 901 is read at step S22, (F, 5) and (H, 10) are stored as trimming positions in the position information memory 7 at step S23. At step S24, the number of copies, "5", is read and is stored in the copy number memory 8. Then, at step S26, an image is obtained by trimming and removing a portion 910 in the photographic image, and at step S28, the image is printed on a recording medium, such as a card.

As is described above, according to the second embodiment of the present invention, without requiring an output device, such as a monitor, an image that is obtained by cutting a desired portion from an original image, such as a photograph, is printed on a recording medium, such as a card.

The scanner printer of this embodiment performs printing with a simple operation and in a short time.

The present invention may be applied for use with a system that is designed with a plurality of devices or for use with an apparatus that has a single device. Further, the present invention can be applied when a program to carry out the present invention is supplied to a system or to an apparatus.

As described above, according to the first and second embodiments, since the scanner is employed both for reading a mark sheet and for reading an original image, image processing of the original image is instructed by a mark sheet.

In addition, according to the embodiments, since masking of an original image is instructed by using a masking sheet, a monitor, such as a display device, and an input device, such as a keyboard, are not required, and a desirable card can be easily produced.

Further, since a cutting range for an image and the number of copies can be designated by a mark sheet, the designation that is accomplished by using a keyboard and a display device is not necessary.

Therefore, an apparatus that has a simple structure and a low cost is provided.

Moreover, since a trimming area is instructed by a mark sheet, an area of an original image that is to be processed is easily instructed.

According to the embodiments, since key switches are separately provided and are employed to instruct the scanner to read an original and to read a mark sheet, only an easy operation is required to read a desired original and to perform the desired image processing on that original to enable the printing of the resultant image on a card, etc.

As is described above, according to the present invention it is possible for a sheet on which information for instructing a processing method for an original image is described to be read by an image input section, for the image process described on the sheet to be performed, and for processed image data to be output.

According to the present invention, a common reader performs the reading of a sheet for instructing masking positions and the reading of an original image, and outputs the original image.

Further, according to the present invention, it is possible for image processing positions to be instructed by using a mark sheet, for image processing to be performed at the instructed original image positions, and for the resultant image to be output.

In addition, according to the present invention desirable image data is output in a designated number of copies by using a mark sheet to instruct image processing positions and the number of copies that are to be made.

With the above described arrangement, an image input means reads and enters an original image, while the input means also reads information that is recorded on a sheet and stores the information. The image processing that is consonant with the stored information is performed on the original image data that are read by the image input means, and the resultant image data are output.

Third Embodiment

Figure 11:
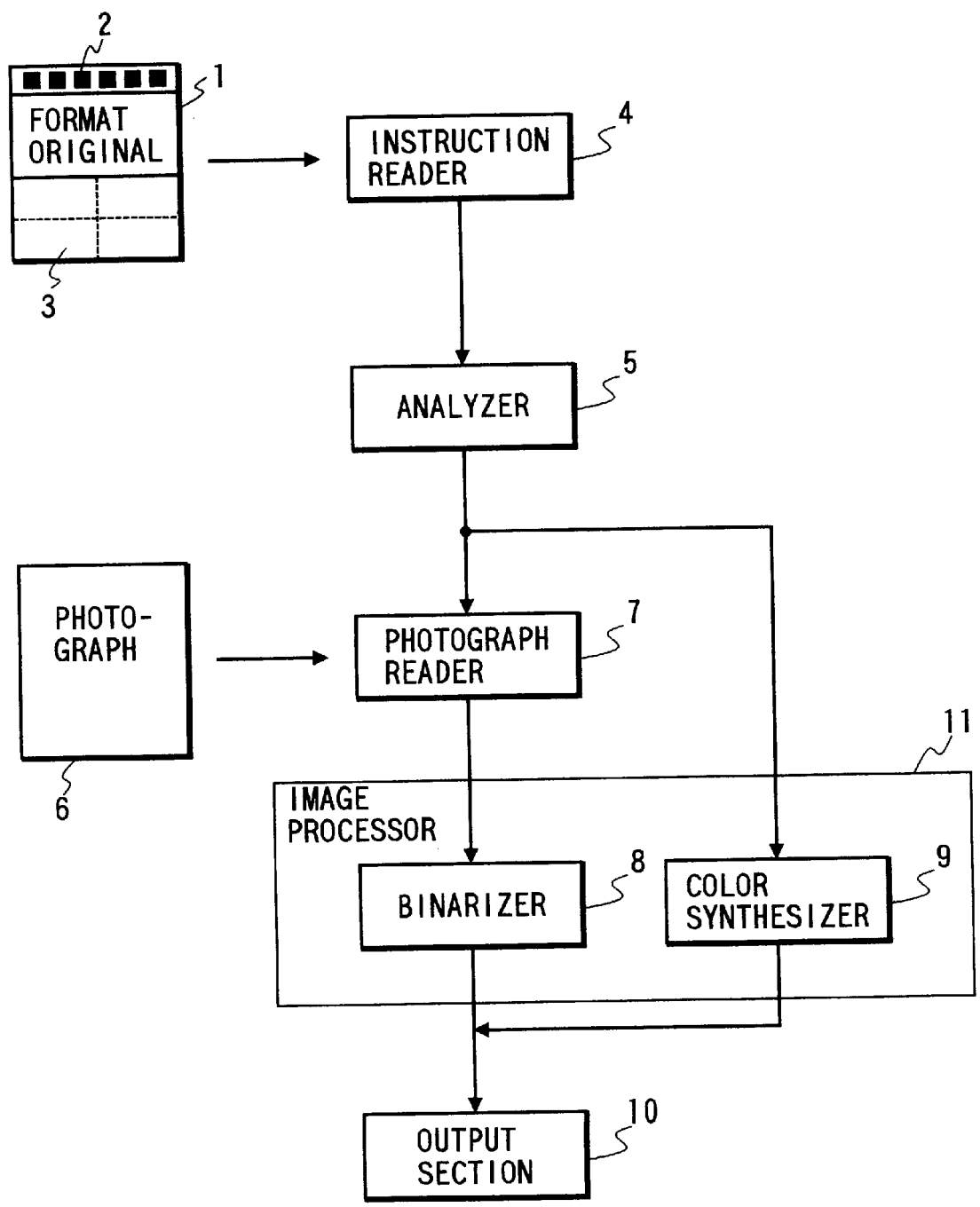
FIG. 11 is a schematic functional block diagram illustrating the function arrangement according to a third embodiment of the present invention.

FIG. 11 is a schematic block diagram illustrating the functional arrangement according to a third embodiment of the present invention.

In FIG. 11, image information is described in a format original 1. An instruction image 2 is the one for instructing the processing contents for a read image, such as a photograph or an illustration. In this embodiment, the instruction image 2 is expressed by using a bar code or a mark sheet. An illustration 3 is described, each separated area being in each color component. The format original 1 in this embodiment is designed with the instruction image 2 indicated by a bar code or a mark sheet, and the illustration 3.

An instruction reader 4 reads the format original 1 by using an input device, such as a scanner. In this embodiment, not only the instruction image 2 but also the illustration 3 are read during the reading of the format original 1. An analyzer 5 extracts the instruction image (a bar code or a mark sheet in this case) from the format original 1 that is read by the instruction reader 4, and analyzes the information.

A photographic image 6 is a source of photographic image data. A photograph reader 7 reads the photographic image 6 by using an input device, such as a scanner, when the instruction for photographic processing is issued by the analyzer 5. An image processor 11 performs image processing that is instructed by a bar code or a mark sheet. For example, a binarizer 8 binarizes image data of the photograph 6 that is read by the photograph reader 7 for each of the color components Y (yellow), M (magenta), C (cyan), and Bk (black) in order to output the result to a printer. Upon the receipt of an instruction for illustration processing that is issued from the analyzer 5, a color synthesizer 9 synthesizes an illustration image that is formed for each color.

An output section 10 outputs the result obtained by the image processing by using an output device, such as a printer. Although the instruction reader 4 reads the image of the illustration 3 along with the instruction image 2 in this embodiment, the instruction image 2 and the illustration 3 may be described in different originals and may be read independently.

Figure 12:
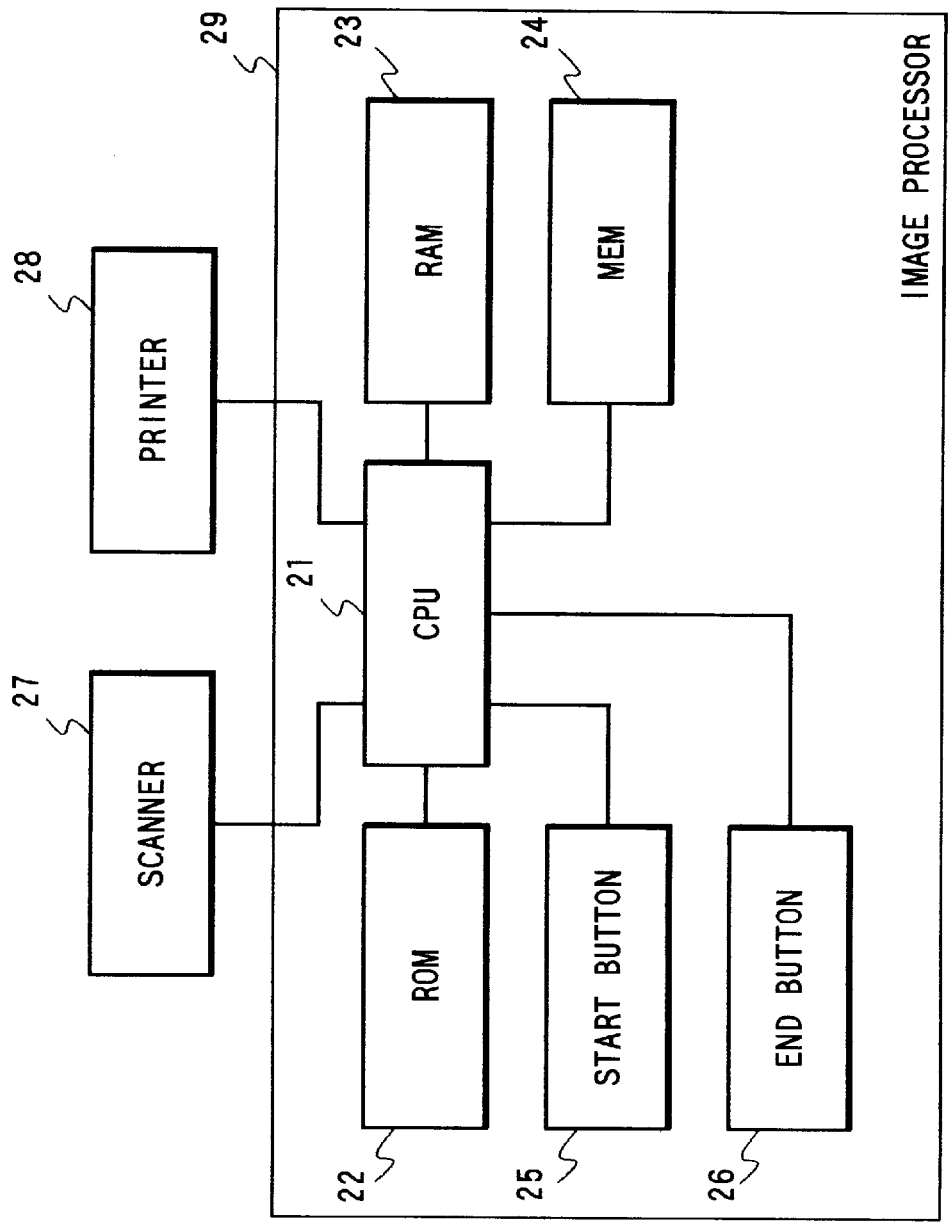
FIG. 12 is a block diagram showing the structure of an image processing apparatus according to the third embodiment of the present invention.

FIG. 12 is a block diagram illustrating the arrangement of an image processing apparatus in this embodiment. A CPU 21 controls the entire image processing apparatus. A ROM 22 is employed to store a control program that accomplishes image processing in this embodiment. The control program stored in the ROM 22 is executed by the CPU 21. A RAM 23 provides a work area or an auxiliary storage area for the CPU 21 for the execution of various processes. A memory 24 is employed to store the image data for the photograph or the instruction image that are read by the scanner 27. A start button 25 is used to start image processing, and an end button 26 is used to terminate image processing.

The scanner 27 reads the image data and a printer 28 outputs the photographic image for which the image processing is performed. As for the printer, an inkjet printer for color printing can be used. Reference number 29 denotes the entire image processing apparatus.

Figure 13:
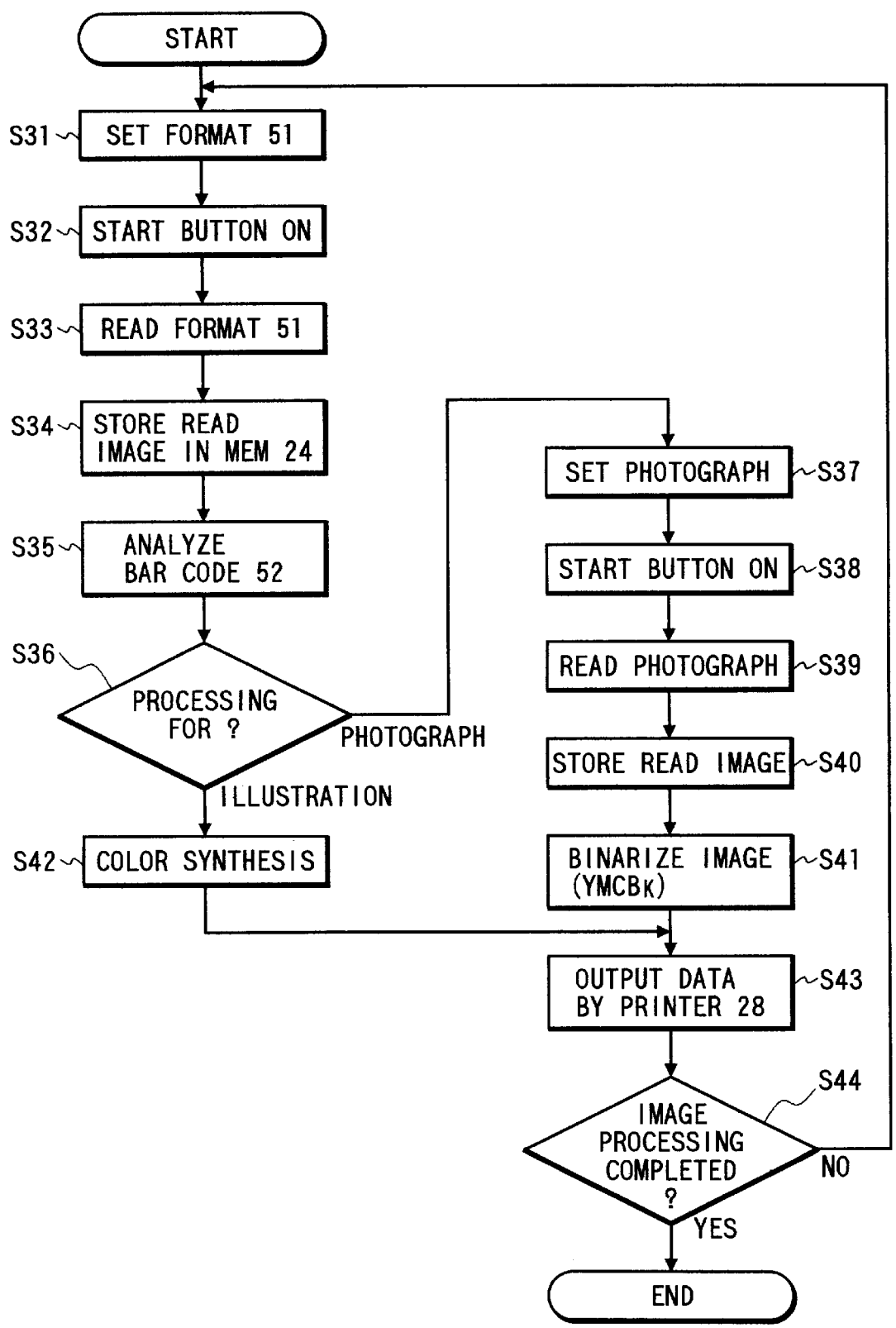
FIG. 13 is a flowchart showing the operation of the image processing apparatus according to the third embodiment of the present invention.

FIG. 13 is a flowchart for the operation of the image processing apparatus in this embodiment.

Figure 14:
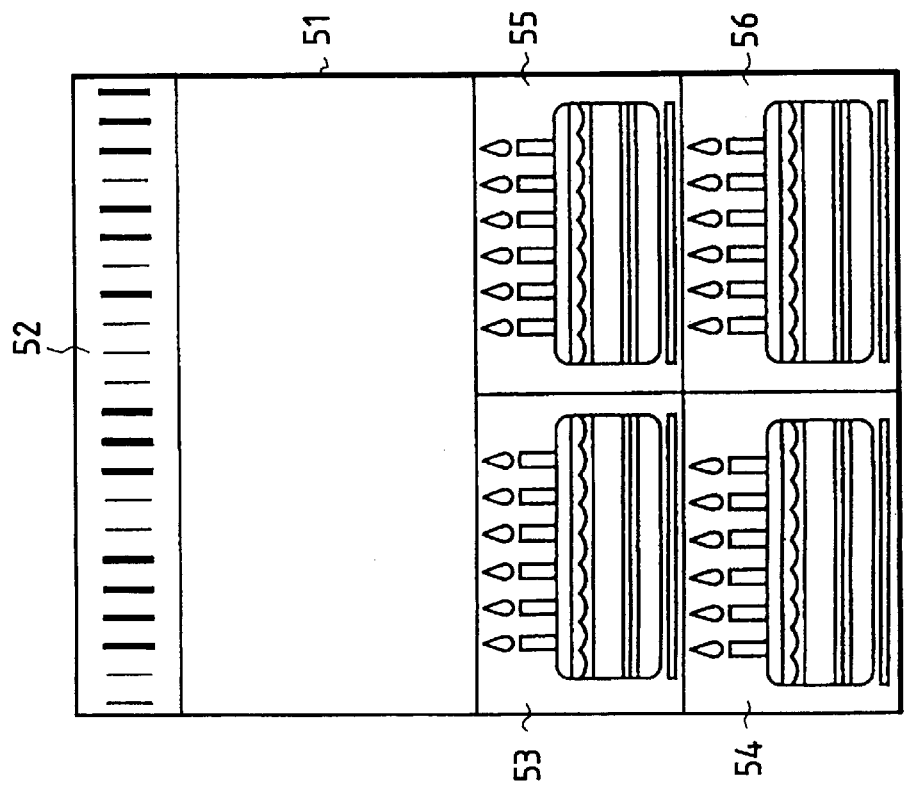
FIG. 14 is a diagram showing a format original according to the third embodiment of the present invention.

At step S31, a format original (which is image data for a bar code 52 and for illustrations 53, 54, 55 and 56 that are each described in different colors) 51 shown in FIG. 14 is set in position at the scanner 27.

The format original 51 employed in this embodiment is shown in FIG. 14. An image processing method for a photograph or an illustration is instructed by the bar code 52. The illustrations 53, 54, 55 and 56 are portrayed in different colors: illustration 53 is depicted in yellow; illustration 54, in magenta; illustration 55, in cyan; and illustration 56, in black. Such a format original 51 is set in position at the scanner 27 at step S31.

When, at step S32, the start button 25 is depressed to start image processing, at step S33, the image data of the format original 51 is read by the scanner 27. At step S34, the image data of the format original 51 that is read at step S33 are stored in the memory 24 (the image data may be stored in the RAM 23). At step S35, the bar code 52, which is the instruction image for the format original 51, is analyzed to determine whether the image processing designated by the bar code 52 is photographic processing or illustration processing.

If, as the result of analyzing the bar code information, the image processing instruction is for photographic processing, program control moves from step S36 to step S37. At step S37, a photograph (image data) is set in position at the scanner 27 for the performance of the photographic processing. At step S38, when the start button 25 is depressed, the scanner 27 begins the photographic processing. At step S39, the image data for the photograph is read by the scanner 27. At step S40, the photographic image data that have been read at step S39 are stored in the RAM 23 or the memory 24. At step S41, the image processing for the photograph is performed according to the image processing method that is instructed by the bar code 52. In this case, the YMCBk binarization is performed on the read photographic image data that are to be output to the printer 28. Then, program control goes to step S43.

If, at step S36, the image processing instruction obtained by analyzing the bar code information 52 is for illustration processing, program control goes to step S42. At step S42, the illustration image processing is performed as instructed by the bar code 52. In this embodiment, color synthesis is performed for the illustrations 53, 54, 55 and 56 of the format original 51 that are each depicted in different-colors. Then, program control advances to step S43.

At step S43, the data obtained by performing the image processing are output by the printer 28. At step S44, a check is performed to determine whether or not the end button 26 has been depressed. When the end button 26 has not been depressed, the image processing is assumed to continue and program control returns to step S31 to repeat the above described process. When, at step S45, the end button 26 has been depressed, the image processing is terminated.

As described above, according to the present invention, since an instruction image that indicates the contents of the image processing is included in the format original, it is read by the scanner and is analyzed to obtain information for image processing. Therefore, an input device and a display device, which designate the contents of the image processing, are not required, and the size of an apparatus can be reduced. Further, since a user does not have to instruct image processing, the user is freed of the necessity to perform the complex operation of setting the processing contents.

In this embodiment, whether an image on the first original or an image on the second original should be processed is determined by which processing, i.e., the illustration processing or the photographic processing, is instructed by an instruction image. The present invention is not limited to this. The instruction image may represent the contents of the image processing that correspond to originals: For example, the first original is for an illustration image and the second is for a photographic image.

Although in the embodiment an explanation is given in detail for when a bar code is employed as an instruction image, a mark sheet may be employed for the instruction image. An explanation is given below of a case where a mark sheet is employed as the instruction image.

Figure 15:
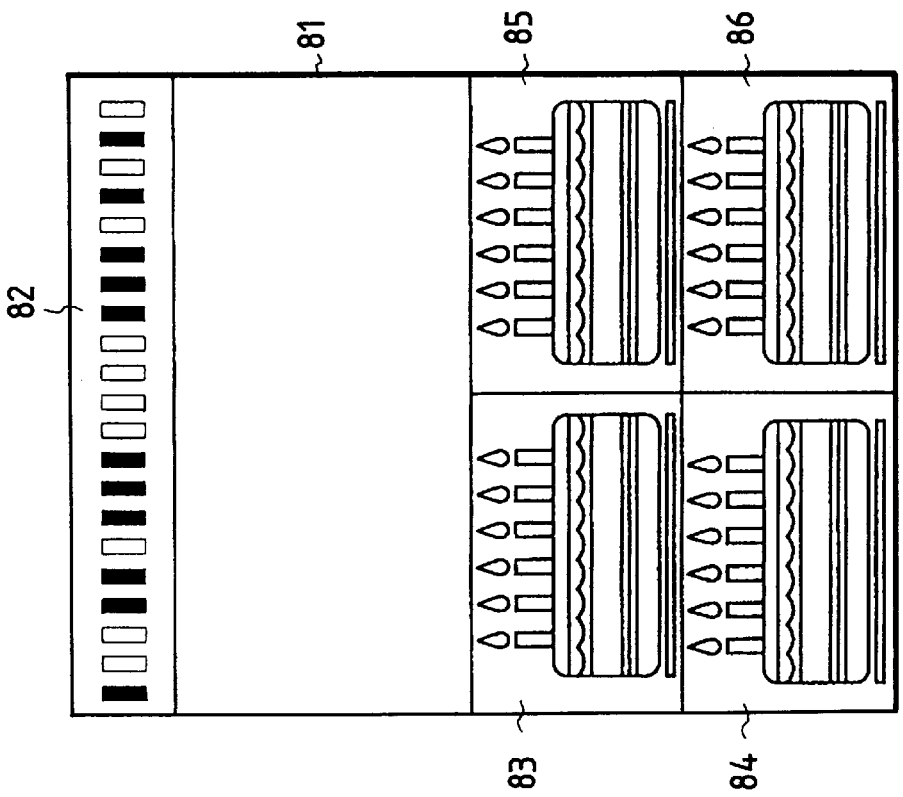
FIG. 15 is a diagram showing a format original when a mark sheet is employed as an instruction image.

FIG. 15 is a format original 81 when a mark sheet is employed as an instruction image. At step S31, which has previously been described, the format original 81 is set in position at the scanner 27. A mark sheet 82 is an instruction image that prescribes an image processing method for a photograph or an illustration. Illustrations 83, 84, 85 and 86 are depicted in different colors in the same manner as are the illustrations 53 through 56 in FIG. 14.

The procedures that are applied when the mark sheet 82 is employed as an instruction image are the same as those that are shown in the flowchart in FIG. 13, with the exception that the bar code 52 is replaced by the mark sheet 82 as the instruction image.

As is described above, by using a mark sheet as an instruction image, a user can easily change an instruction image (i.e., change the contents of the instruction for image processing).

Figure 16:
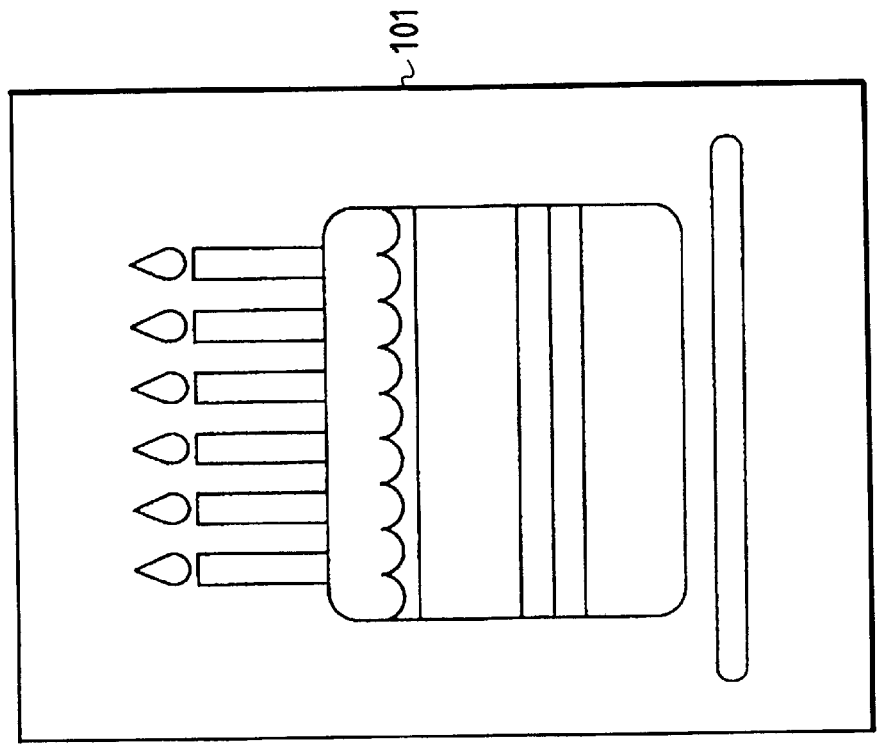
FIG. 16 is a diagram showing the output of the illustration processing according to the third embodiment of the present invention.

FIG. 16 is a diagram that shows the output that was obtained as a result of the illustration process in the third embodiment. A printed output 101 is obtained by applying to the illustrations 53 through 56 (83 through 86) the image processing method that is instructed with the bar code 52 or the mark sheet 82. The illustrations 53 through 56 for the individual colors are synthesized to obtain a single image that is in turn output.

Figure 17:
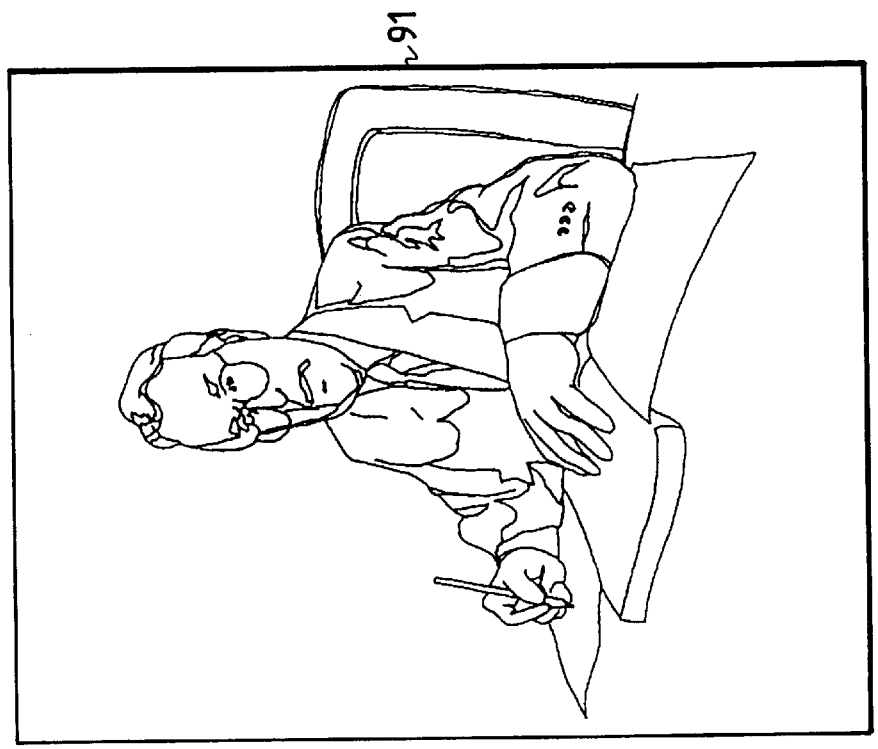
FIG. 17 is a diagram showing a photographic original example that is employed in the third embodiment of the present invention.

FIG. 17 is a diagram showing an example of a photographic original that is employed in the third embodiment. A photographic original 91 is read by the scanner 27 when the processing for a photographic image is initiated by an image processing method that is instructed by the bar code or the mark sheet. The image of the photograph 91 is binarized for each of the colors C, M, Y and Bk, and the binarized image is output by the printer 28.

As described above, according to the present invention, since information for instructing an image processing method is presented by using a bar code or a mark sheet, the bar code information or the mark sheet information can be analyzed, and the image processing that is specified by that information can be performed. Therefore, for the image processing instruction contents it is not necessary to employ a keyboard, a mouse, and a display device, and the size of the apparatus can be reduced. Further, since the information that is required for identifying the image processing contents is described by the bar code or the mark sheet, a complicated operation of setting the image processing contents is not necessary and the operability of the apparatus is thus improved.

The contents of the image processing that are specified by using an instruction image are not limited to those in the embodiment. Information about whether or not the edge of the image is stressed, or the designation of a pseudo middle tone process may be included. Further, a photographic image may be included in a format original that has an instruction image.

In addition to the synthesis of images, the distribution of the shades of color components can be designated in order to form an illustration image that has a desirable color arrangement. In this case, the shades of the color components are visually changed by altering mesh patterns (e.g., the overall painting pattern wherein all the picture elements are painted and a 50% halftone (a checkered flag pattern) that provides for painted picture elements to be alternately located side by side and front and back).

In this manner, various images are formed by using illustrations for different color components. In other words, if there is an illustration image for each color component, an illustration with many colors is obtained by synthesizing these illustration images.

The present invention may be applied for use with a system that is designed by a plurality of devices or for use with an apparatus that has a single device. Further, the present invention can also be applied when a program for carrying out the processing specified in the present invention is supplied to a system or to an apparatus.

As described above, according to the present invention, common reading means reads both an instruction image, for designating the contents of the image processing, and an image, on which the image processing is performed according to the designated contents of the processing, and input/output devices that designate image processing contents are not required, so that an increase in the size of the apparatus is prevented from being increased.

Fourth Embodiment

Figure 18:
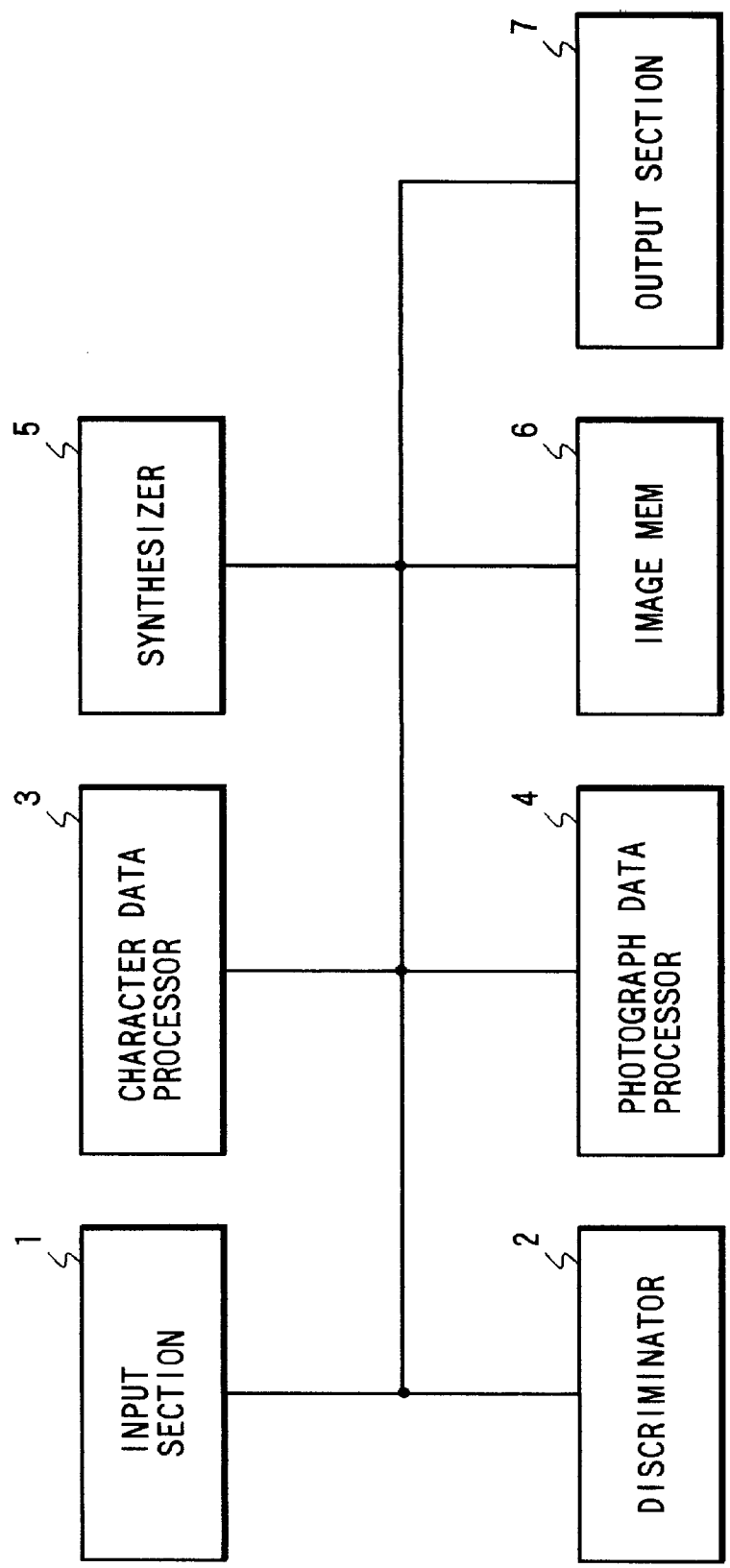
FIG. 18 is a block diagram illustrating the structure of an image processing apparatus according to a fourth and a fifth embodiment of the present invention.

FIG. 18 is a schematic block diagram illustrating the arrangement of an image processing apparatus according to a fourth embodiment of the present invention.

In FIG. 18, an input section 1, such as a scanner, receives image data, such as character data and photographic data. A discriminator 2 determines whether the input image data are character data or photographic data. A character data processor 3 generates binary data for a high resolution by using the character data that are entered by the input section 1 and that are determined to be character data by the discriminator 2. A photographic data processor 4 provides photographic data for a multi-bit low resolution, based on photographic data that are entered by the input section 1 and that are determined to be photographic data by the discriminator 2. A synthesizer 5 combines the character data and the photographic data on a single plane. An image memory 6 is employed to develop image data that are synthesized by the synthesizer 5. An output section 7 outputs the synthesized image data in the image memory 6 to, for example, a printer or a display device.

Examples of a determination condition under which the discriminator 2 determines whether or not image data are character data or photographic data are as follows.

(1) The order in which image data are input is established; for example, character data are input first and photographic data are input second.

(2) Determination is made based on the input data (e.g., the character data tends to be "OOH" or "FFH").

(3) A mark indicating that the data are character data is added to the first line of image data.

(4) An operator changes switches in consonance with the data that are input and issues an instruction. Any of the above described conditions may be employed.

Such determination of the character image and the photographic image can also be applied for embodiments that are described later.

Figure 20:
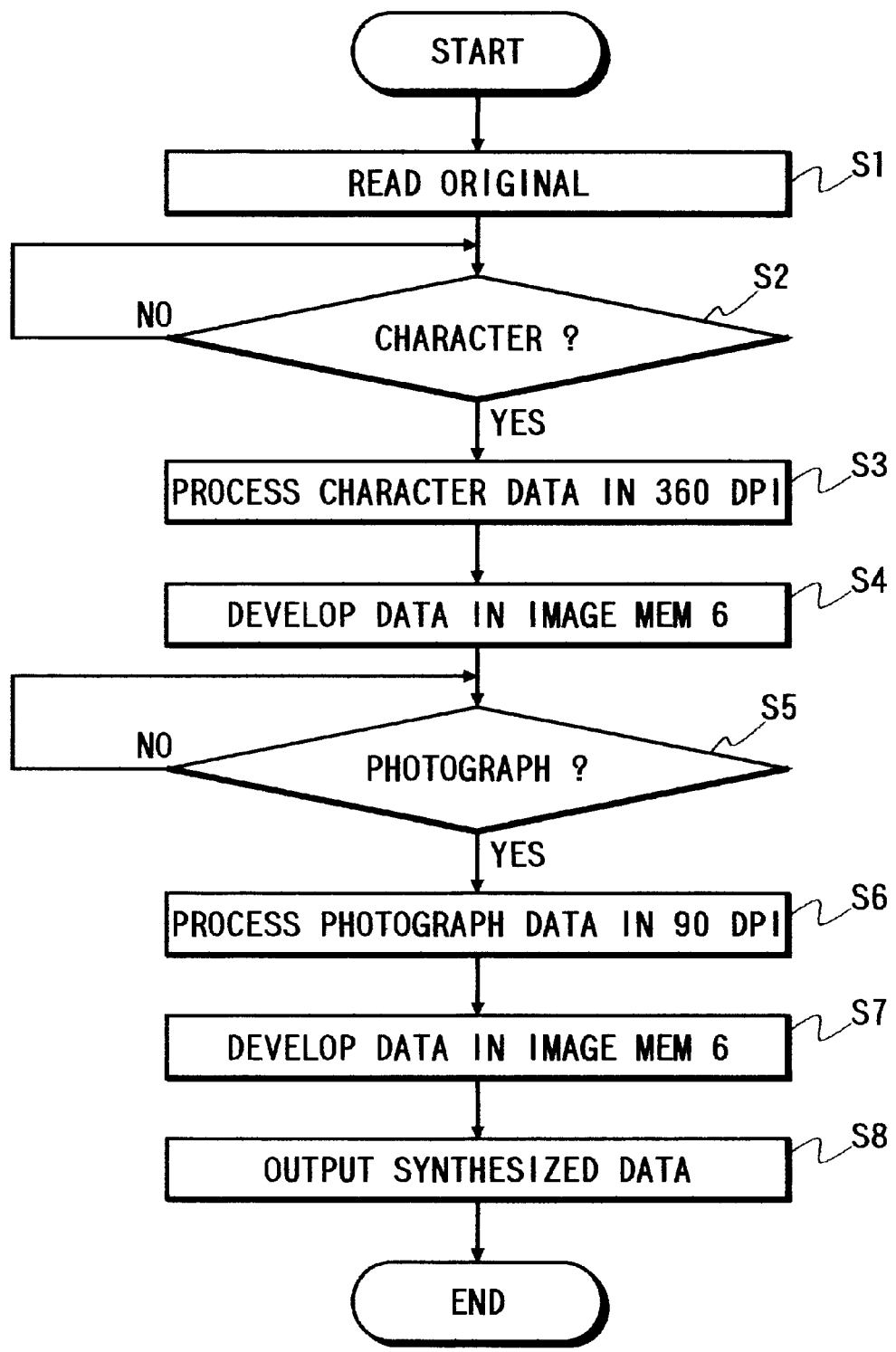
FIG. 20 is a flowchart showing the processing performed by the image processing apparatus according to the fourth and the fifth embodiments of the present invention.

FIG. 20 is a flowchart showing the processing that is performed by an image processing apparatus according to the fourth embodiment.

Figure 19:
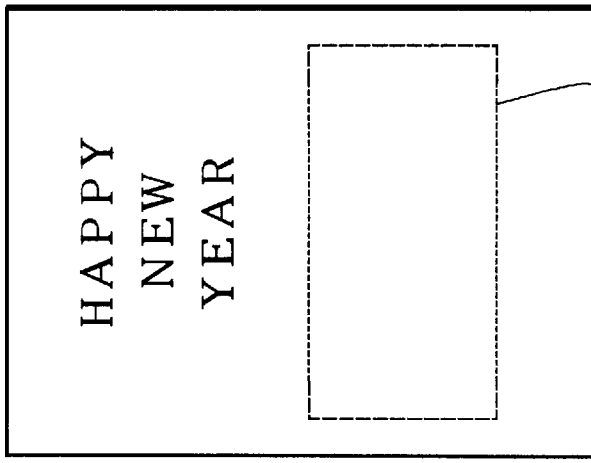
FIG. 19 is a diagram showing an example of a character original according to the fourth and the fifth embodiments of the present invention.

An explanation is given for a case where the image processing apparatus in this embodiment prepares a New Year's card with a photograph, for example, as is shown in FIG. 19.

First, the input section 1 reads and enters character data for a character original, and then reads and enters a photograph of a different photographic original. The character data and the photographic data that are read in this manner are combined and the resultant composition is output. The input section 1 has a color scanner that has a reading resolution of 360 dpi (dot per inch). The resolution for the characters that are to be printed on a New Year's card is 360 dpi, and the resolution for the photograph is 90 dpi.

The processing is described while referring to the flowchart in FIG. 20.

At step S1, the color scanner of the input section 1 scans and reads the character portion of a character original shown in FIG. 19. At step S2, the discriminator 2 distinguishes the character data portion and inputs the distinguished character data. At step S3, the character data processor 3 employs the character data that have been read and input to perform a binarization process at a resolution of 360 dpi. The quantity of the binarized character data is approximately ¹⁄₂₄ of the original character data. The binarized character data are transmitted through the synthesizer 5 and are developed in the image memory 6 (step S4).

When the photographic original is scanned by the input section 1 and, at step S5, the discriminator 2 determines that the scanned portion is the photographic data, the photographic data are read and input. At step S6, the photographic data processor 4 employs the read photographic data to convert RGB multi-bits into data at a resolution of 90 dpi. Compared with RGB multi-bit image data of 360 dpi, the amount of multi-data is reduced approximately ¹⁄₁₆ by performing the calculation ¼ (90/360 dpi)×¼ (90/360 dpi)=16. The RGB multi-bit data of 90 dpi are developed in the image memory 6 by the synthesizer 5 (step S7). The synthesized image data that are developed in the image memory 5 are output by the output section 7 to a printer or to a display device (step S8). Reference number 201 in FIG. 19 denotes the synthesized position of a photograph.

Fifth Embodiment

A fifth embodiment of the present invention is described below. Since the arrangement and the processing of the apparatus in the fifth embodiment are basically the same as those in the fourth embodiment, a detailed explanation of the arrangement is not given. In the fifth embodiment is shown an example where a New Year's card with a photograph is prepared at a resolution that is higher than that in the fourth embodiment.

In this process, first, a character image is read and then a photographic image is read. The read character data and the photographic data are synthesized and the composition is output. The resolution of the color scanner is set to 360 dpi, the same as in the fourth embodiment, the printing resolution for the character portion of the New Year's card is set to 360 dpi, and the resolution of the photograph portion is set to 180 dpi.

The processing of the fifth embodiment is described below while referring to the previous flowchart in FIG. 20.

Figure 21:
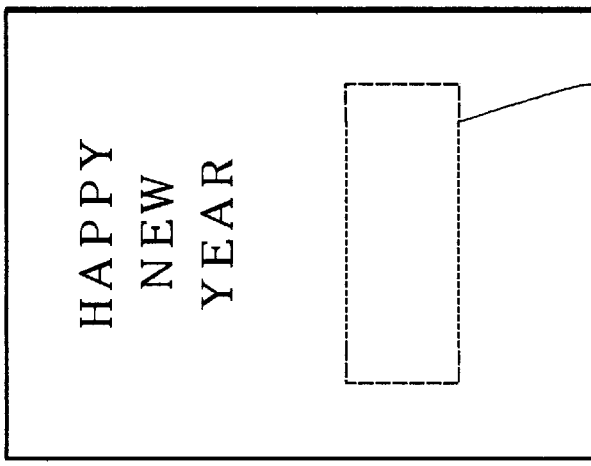
FIG. 21 is a diagram showing superimposed positions for the character original and a photograph according to the fourth embodiment of the present invention.

First, the color scanner of the input section 1 reads a character original as shown in FIG. 21 (step S1). At step S2, the character data portion that is determined by discriminator 2 to be the character original is input. The character data processor 3 employs the read character data and performs a binarization process on the data at a resolution of 360 dpi (step S3). The quantity of the binarized data is about ¹⁄₂₄ of the quantity of original data. The binarized character data are developed in the image memory 6 by the synthesizer 5 (step S4).

When, at step S5, the photographic original is scanned and read and the discriminator 2 distinguishes the scanned original as a photograph, the photographic data are input. By employing the thus read photographic data, the photographic data processor 4 converts RGB multi-bit data into data at a resolution of 180 dpi (step S6). The obtained quantity of the photographic data is ¼ of the original amount.

The data quantity obtained by synthesizing the character data and the photographic data is (½×½)/4=¹⁄₁₆.

(180/360 dpi)(180/360 dpi)¼ size

According to the fifth embodiment, the data amount is reduced to about ¹⁄₁₆, compared with the amount of RGB multi-bit data at 360 dpi. The RGB multi-bit data of 180 dpi are developed in the same image memory 6 by the synthesizer 5 (step S7). The synthesized data that are developed in the image memory 6 are output by the output section 7 to a printing apparatus, such as a printer, or to a display device (step S8). Reference number 401 in FIG. 21 denotes a synthesized position of a photograph.

In addition, when the photographic data processor 4 employs the read photographic data to acquire the RGB multi-bit data at 180 dpi, if the process Y, ¼C and ¼C is performed, the data quantity is reduced by half. The amount of multi-bit data in this case is:

(½×½)/4×(½)=¹⁄₃₂.

(180/360 dpi)(180/360 dpi)¼ size

Figure 22:
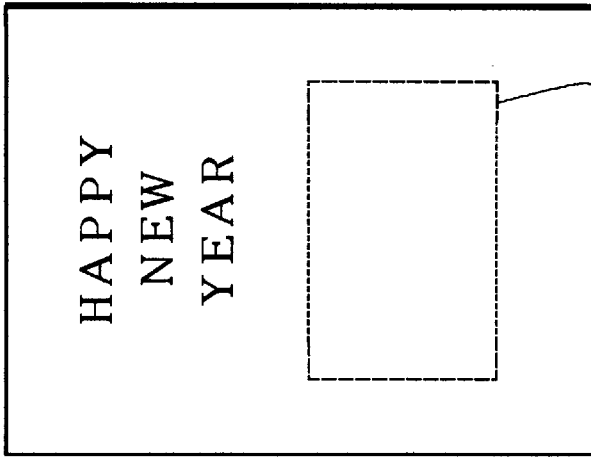
FIG. 22 is a diagram showing superimposed positions for the character original and a photograph according to the fifth embodiment of the present invention.

It is therefore apparent that the data quantity is reduced to ¹⁄₃₂ of the quantity of the multi-data of 360 dpi. Thus, the size of a photograph is doubled while the amount of synthesized image data is halved. In other words, the output of a photograph that is ½ the size of that in the fourth embodiment is obtained by using the technique Y, ¼C and ¼C. The position of the photograph in this case is indicated by a dotted portion 501 in FIG. 22.

As is described above, according to the fifth embodiment, through the image processing performed by the image processing apparatus for the preparation of a New Year's card with a photograph, an image with high quality having beautiful characters and a clear photograph are output from a limited memory area that has a small capacity.

Sixth Embodiment

Figure 23:
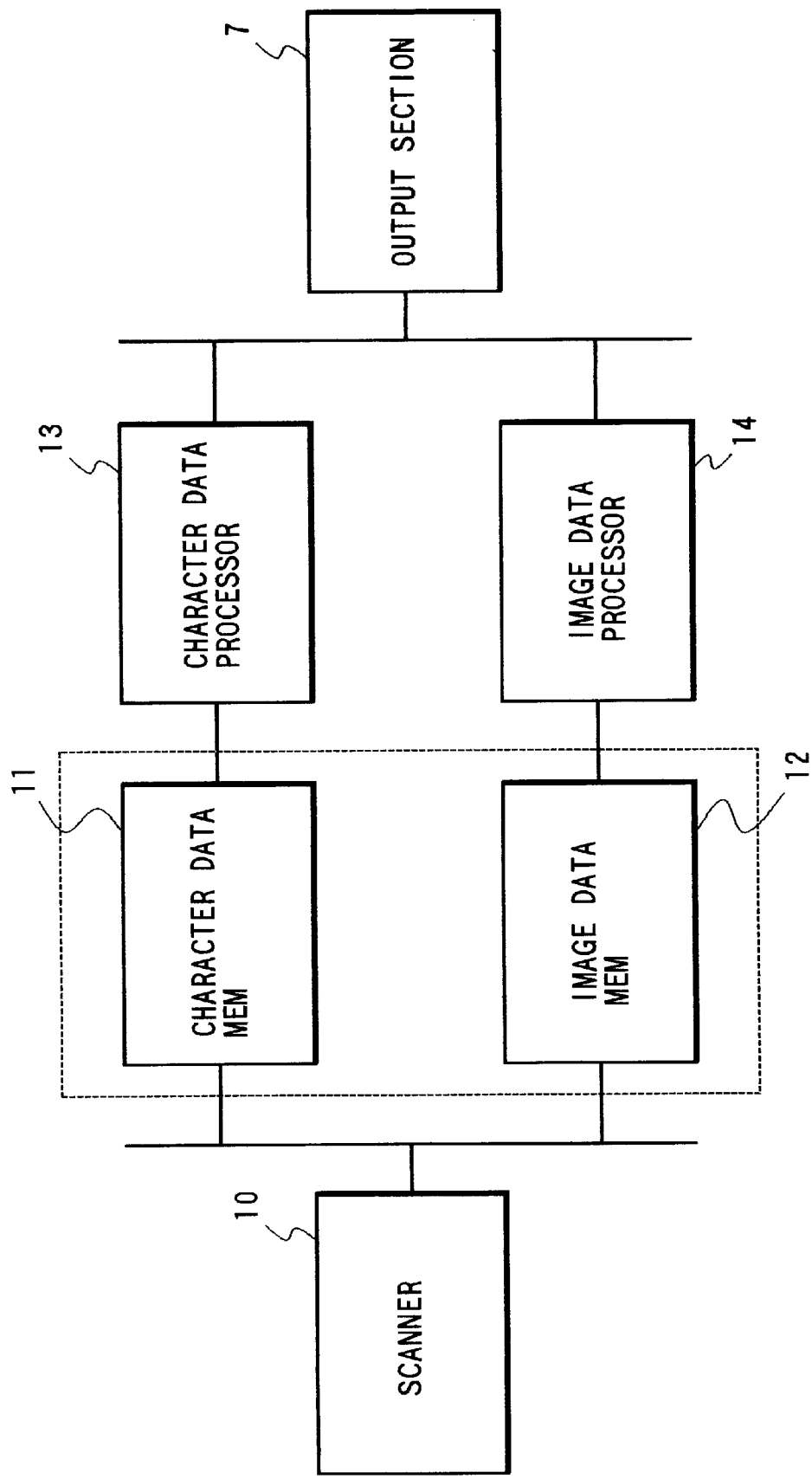
FIG. 23 is a block diagram illustrating the structure of an image processing apparatus according to a sixth embodiment of the present invention.

FIG. 23 is a schematic block diagram illustrating the arrangement of an image processing apparatus according to a sixth embodiment.

In FIG. 23, a scanner 10, which is a color scanner, for example, photoelectrically scans and reads an original image, and outputs corresponding image data at a resolution of, for example, 360 dpi. A character data memory 11 is used to store character data that are input by the scanner 10. An image data memory 12 is used to store image data (other than character data) that are input by the scanner 10. A character data processor 13 reads the character data from the character data memory 11, and converts the data into binary data for a single color. An image data processor 14 reads the image data from the image data memory 12, and processes the data according to the area tone. An output section 7 is the same as that in the fourth embodiment.

Figure 24:
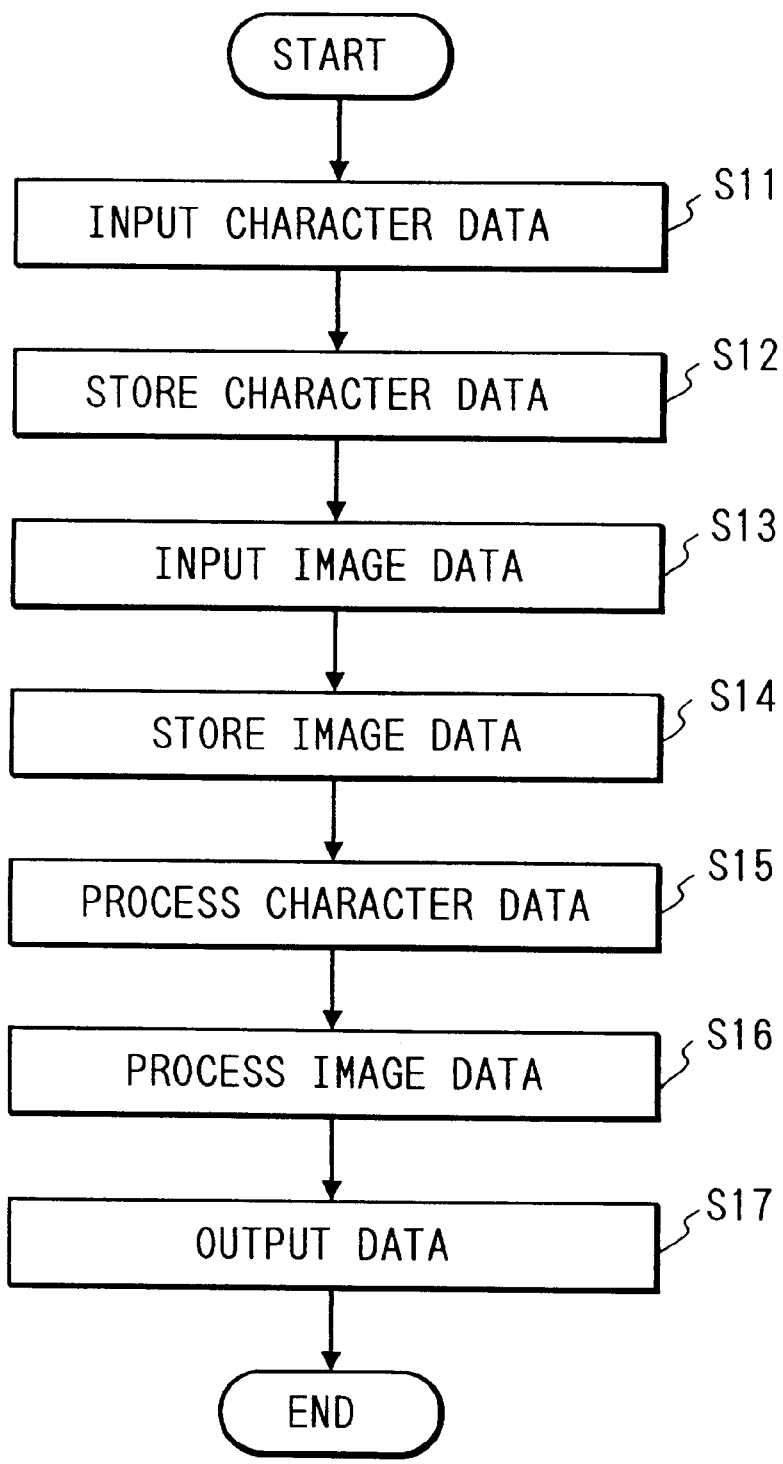
FIG. 24 is a flowchart showing the processing performed by the image processing apparatus according to the sixth embodiment of the present invention.

FIG. 24 is a flowchart of the processing in this embodiment.

First, at step S11 data for an original that is scanned by the scanner 11 are input and the character data portion of the data is input. The identification of the character data portion may be also accomplished by using the discriminator 2 of the fourth embodiment, or it may be instructed by an operator. The input character data are stored in the character data memory 11 (step S12).

At step S13, the data obtained by the scanning by the scanner 10 are input and the image data portion is stored in the image data memory 12 (step S14). The identification of the image data portion is accomplished by the determination process of the discriminator 2. When the character data and the image data are stored, program control advances to step S15, where binarization for a single color is performed on the character data. Then, at step S16, an area tone process is performed on the image data. At step S17, the resultant data are output by the output section 7 to a printer or to a display device.

For the sixth embodiment, as well as in the previous embodiments, the preparation of a New Year's card with a photograph is described.

Figure 25:
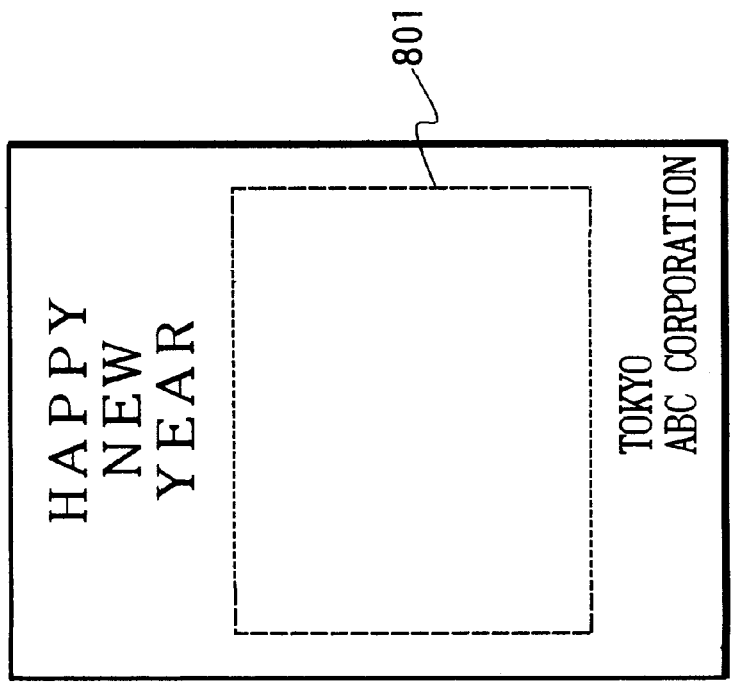
FIG. 25 is a diagram showing superimposed positions for the character original and a photograph according to the sixth embodiment of the present invention.

A character original shown in FIG. 25 is scanned by the scanner 10 and is read at 360 dpi, and then a photographic image is separately read. The read character data are stored in the character data memory 11, while the photographic image data are stored in the image data memory 12.

Figure 26:
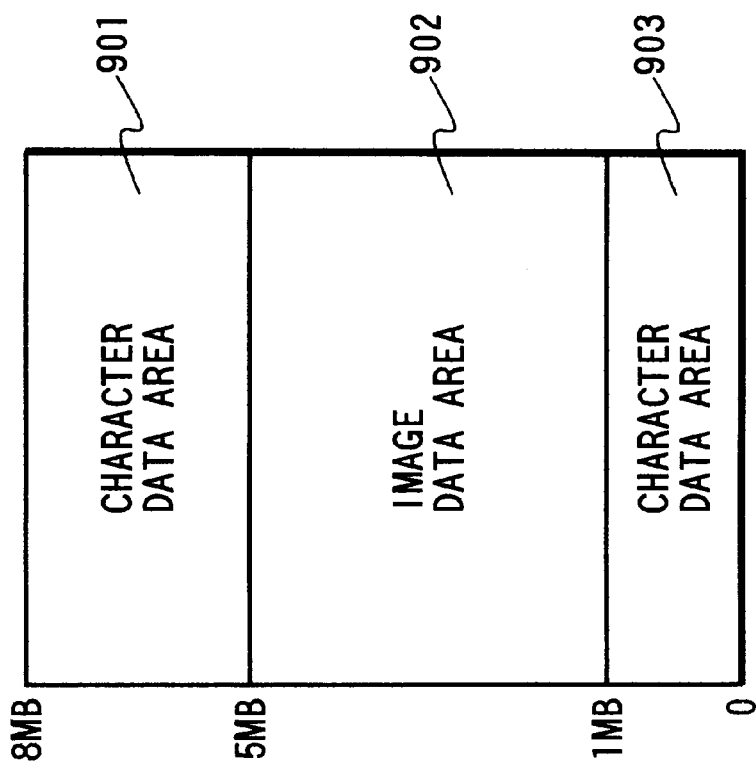
FIG. 26 is a diagram for explaining character data areas and an image data area according to the sixth embodiment of the present invention.

FIG. 26 is a diagram showing storage areas in the memory for the character data and image data. A character data area 901 indicates a character data portion that corresponds to the upper character original, an image data area 902 indicates an image data portion that is inserted into a photograph insertion area 801, and a character data area 903 indicates a character data portion that corresponds to the characters below the photograph insertion area 801.

The character data areas 901 and 903 correspond to the character data memory 11 and have a memory capacity of about 4 MB, for example. The image data area 902 corresponds to the image data memory 12 and has a memory capacity of about 4 MB.

Since the single-color binarization process is performed on the character data portion, printing output that has no smudging is obtained in a short period of time. On the other hand, since tone conversion is performed on the image data by using, for example, an error diffusion method, a very fine image is acquired.

As is described above, according to this embodiment, since the single-color binarization process is performed on image data for characters and area tone processing is performed on data for the photographic portion, the total amount of image data is reduced and the characters and the photograph are very precisely reproduced and in fine detail.

The present invention may be applied for use with either a system that has a plurality of devices or for use with an apparatus that has a single device. Further, the present invention can be applied for use when a program for carrying out the present invention is supplied to a system or to an apparatus to realize the present invention.

As is described above, according to the present invention, since the input character data are binarized and the input photographic data are processed into multi-bit data at a low resolution, the total quantity of the image data is reduced.

Further, according to the present invention, the total processing time required for providing a synthesized image is reduced by shortening the processing time for the character data.

In addition, according to the present invention, the character image portion is preferably reproduced.

Moreover, according to the present invention, since the character image portion is binarized and the photographic image portion is processed at a reduced resolution, the total time required for processing the image data is reduced.

Seventh Embodiment

Since the arrangement of an image processing apparatus in a seventh embodiment is the same as that in the third embodiment, the description is omitted. In the seventh embodiment, a format original (attribute instruction image) and an original image, such as a photograph, is explained in detail.

Figure 27:
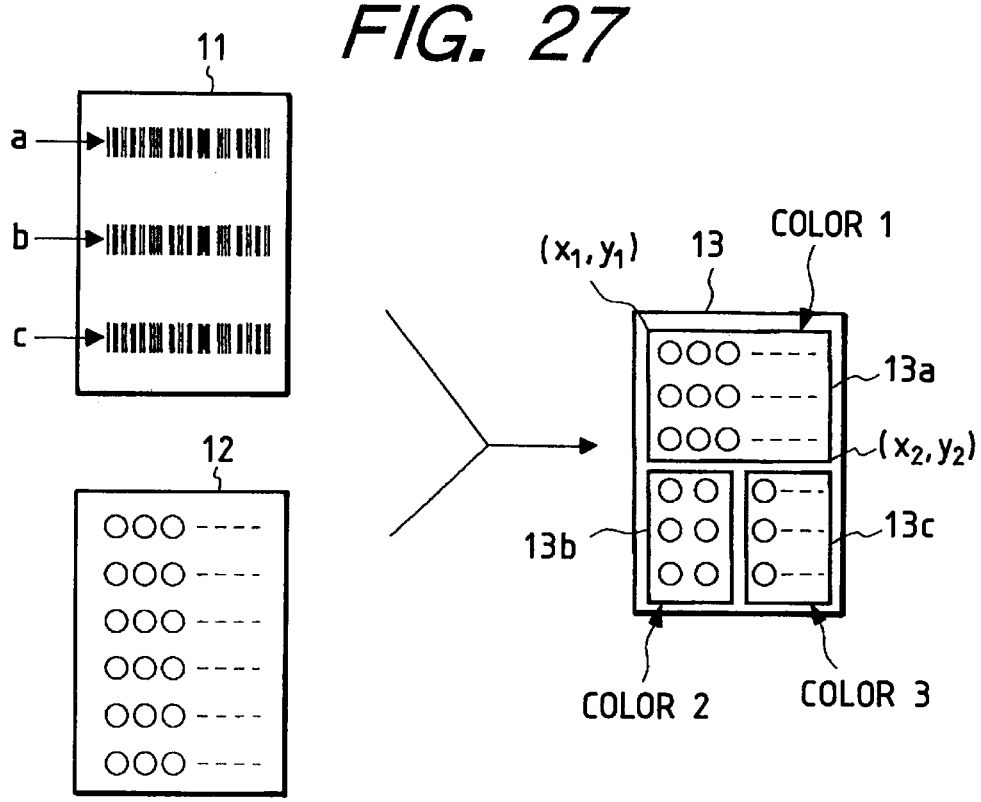
FIG. 27 is a diagram showing an attribute instruction image and an original image, and an output that is obtained from them according to a seventh embodiment of the present invention.

FIG. 27 is a diagram showing an attribute instruction image and an original image, and the output results that are obtained with them. In a format original 11 is described an attribute instruction image for instructing data attributes, such as a character frame range and a character color. Bar codes are employed for the instruction image in this embodiment. In an original 12 an original image is drawn. An output image is printed on an output original 13. The output of an image is acquired so that image processing as is instructed by the attribute instruction image on the format original 11 is performed on the original image on the original 12.

In an example shown in FIG. 27, a range (position) 13a of the output image 13 and the image processing contents (background color, character color, character effect process (e.g., shading), etc.) are designated by a bar code a in the format original 11. The range can be designated by, for example, the xy coordinates of vertexes that are diagonally positioned (for example, the range 13a can be designated by (x1, y1) and (x2, y2)). The same is applicable to bar codes b and c for instructing the image processing contents in ranges 13b and 13c.

Figure 28:
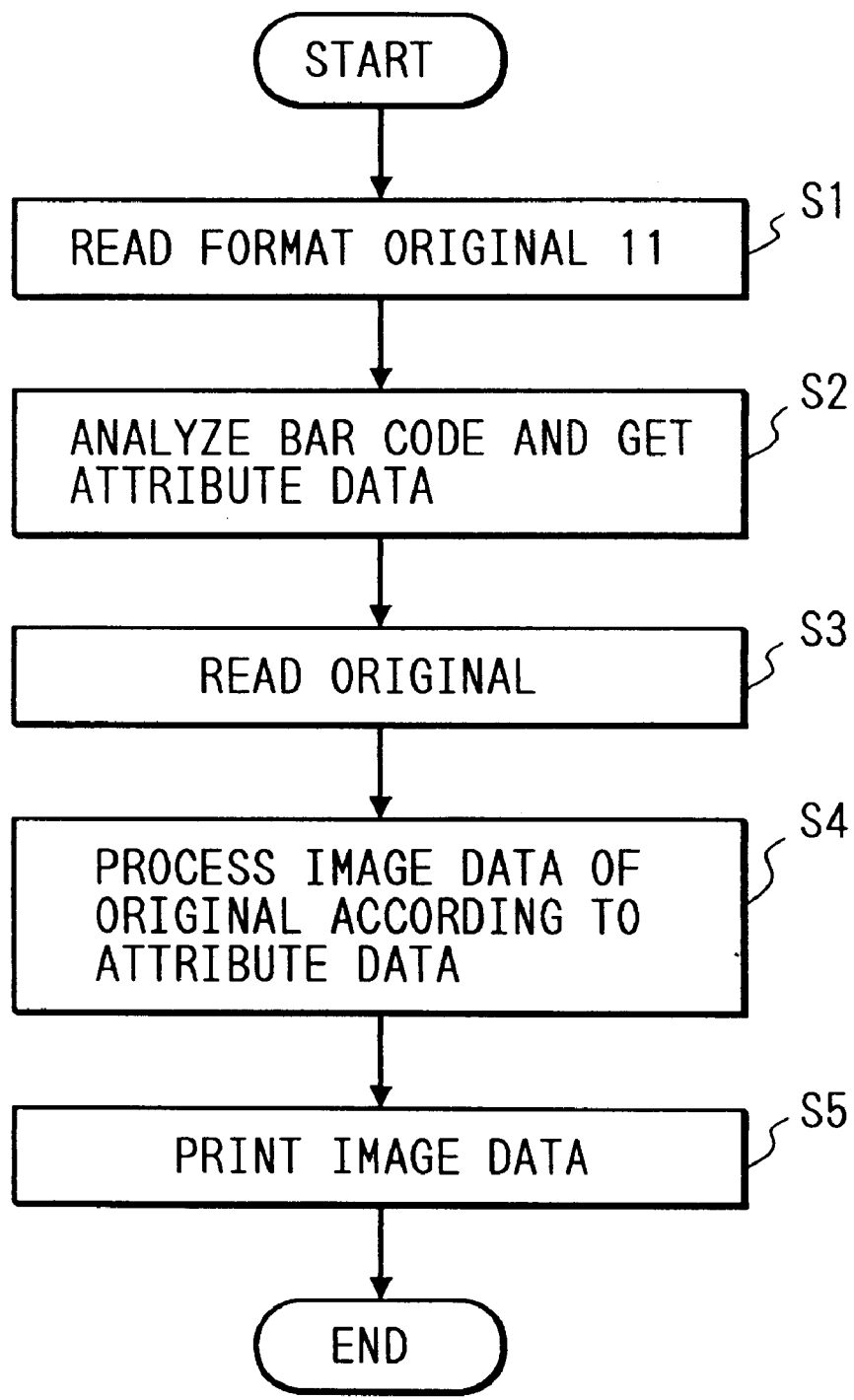
FIG. 28 is a flowchart showing the operating procedures for an image processing apparatus according to the seventh embodiment of the present invention.

The processing of the thus structured apparatus in the seventh embodiment is described while referring to a flowchart in FIG. 28. A control program for realizing the process shown in FIG. 28 is stored in the ROM 22 and is executed by the CPU 21.

First, the scanner 27 reads the format original 11 in which attribute instructions, such as the range of a character frame and a character color, are described with a bar code (step S1). The pattern of the read bar code is analyzed by the CPU 21, and the attribute instruction data that are related to the character frame range and the character color are temporarily stored in the RAM 23 (step S2). The original that is to be output is read by the scanner 27, and is stored as image data in the RAM 23 (step S3). For the image data, the CPU 2 executes the image processing (color conversion, etc.) that is in consonance with the attribute instruction data (step S4). Then, all image data that are obtained through the image processing that is designated by the attribute instruction data are printed by the printer 28 (step S5).

As is described above, according to the seventh embodiment, an image on the format original (first original) that is read by the scanner 27 is analyzed and the attribute instruction data are acquired. Then, the image processing that is in consonance with the attribute instruction data is performed on an image on the original (second original) that is read by the scanner 27. That is, since both the attribute instruction data and the original image are input by the scanner 27, an input device, such as a tablet, for attribute instruction is not required and an apparatus that has a low cost is provided.

Although, in this embodiment, an example is presented wherein a format original is read before an original, as long as the image data of the original are temporarily stored in the RAM 23, the format original may be read after the original.

When the format original is read in advance, it is not always necessary for the image data of the scanned original to be temporarily stored in the RAM 23. If the image processing speed is higher to a sufficient degree than the reading speed of an original, the image data sent from the scanner may be accumulated in the RAM 23 while image processing is performed on the data.

Further, although in this embodiment a bar code is employed for attribute instructions, means other than a bar code may be used. A mark sheet, for example, may be used in a format original.

Figure 29:
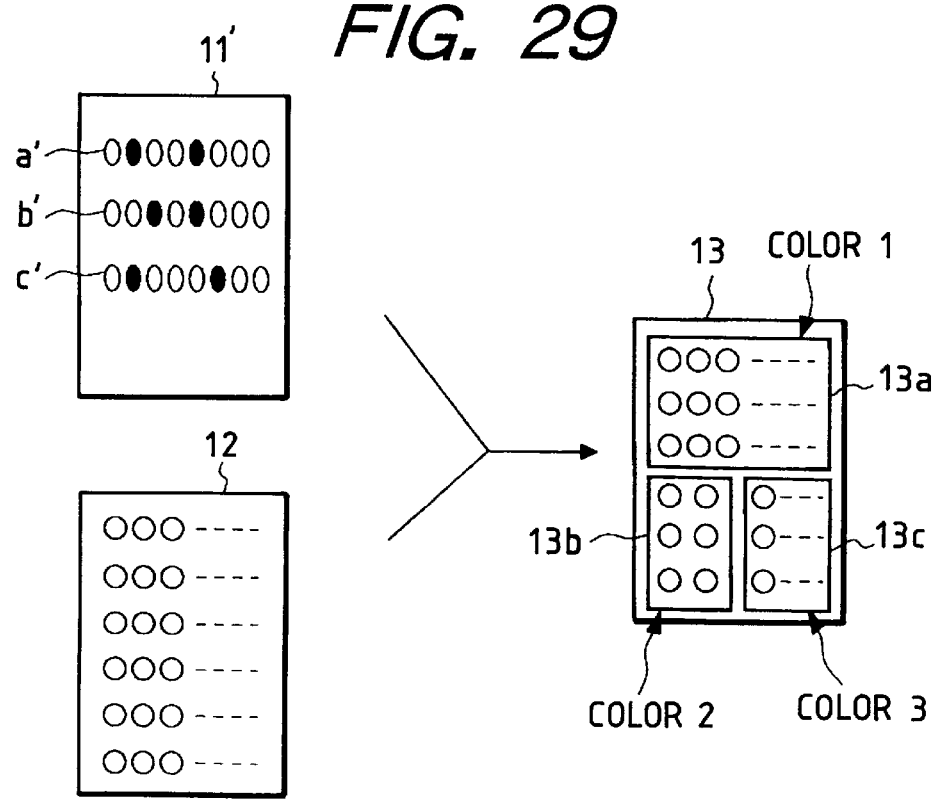
FIG. 29 is a diagram showing an attribute instruction image and an original image, and an output that is obtained from them when a mark sheet is used as the attribute instruction image.

FIG. 29 is a diagram for explaining the process when a mark sheet is used for an original image. A format original 11' includes a mark sheet for attribute instructions, such as a character frame range and a character color. An original 12 and an output original 13 are the same as those in FIG. 27. Data a' in the format original 11' are employed to instruct the attributes of a range 13a. A user fills in the mark sheet to designate attribute information.

As is described above, when a mark sheet is used instead of a bar code, a user can easily designate desired attribute information.

Eighth Embodiment

In the seventh embodiment, an example wherein a format original and an original are separate sheets has been described. In an eighth embodiment, an example wherein a format original and an original form a single sheet is described. Since the arrangement of an apparatus in this embodiment is the same as that in the seventh embodiment, no description is given.

FIGS. 30A through 30C are diagrams showing original image examples in the eighth embodiment. In an original 21 shown in FIG. 30A, an area 21a is where a bar code that represents attribute instruction data are described, and an original area 21b is where an original image is described. The size of the original 21 may be one that results from the combining of the two original sheets into one sheet, as is shown in FIGS. 30A and 30B, or may be one that results from the inclusion of a bar code that is described in one part of the original, as is shown in FIG. 30C. According to the method shown in FIG. 30C, format information is indicated in the margins of the original.

In the above described examples, the positions of the areas for attribute instructions and for an original are determined in advance. Image processing (color changes, etc.) is performed on the original area (the original portion), and the result is output. Of course, it may be so designed that a user can set the areas for a bar code and an original by employing an operational panel, etc.

Figure 31:
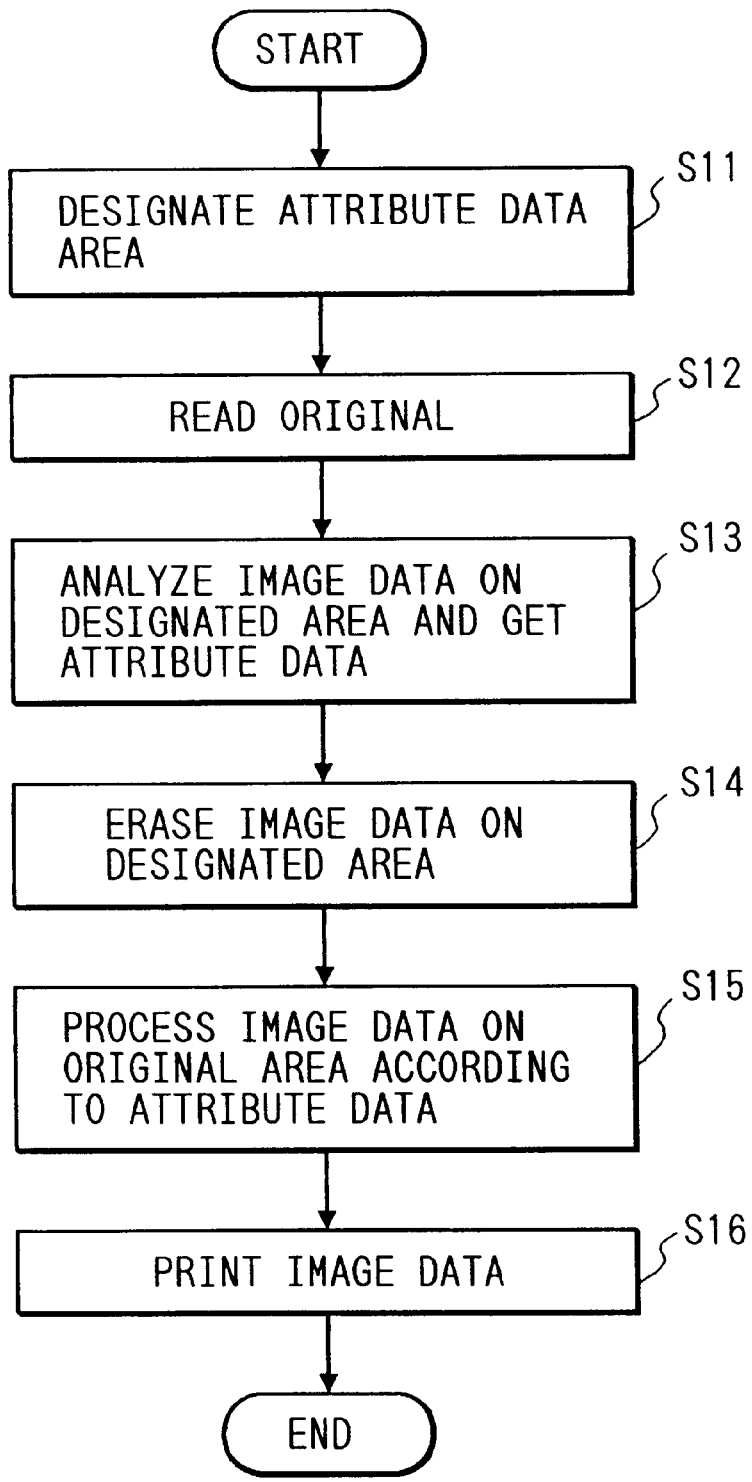
FIG. 31 is a flowchart showing the operating procedures for an image processing apparatus according to the eighth embodiment of the present invention.

FIG. 31 is a flowchart showing the processing for the eighth embodiment. A control program for performing the flowchart is stored in the ROM 22 and is executed by the CPU 21.

At step S11, the area for the attribute instruction data is designated. In the area designation method, when, for example, the "left half of the original" is selected, the state in FIG. 30A is set. When the "upper ¼ of the original" is selected, the state in FIG. 30B is set. Further, when "margins of the original (e.g., 20 mm at the top and the bottom and on the left and the right side)" is selected, the state in FIG. 30C is set. It should be noted that the state in FIG. 30C exists when the bar code is indicated in a part of the margin.

At step S12, the original is read by the scanner 27 and the read image data are stored in the RAM 23. At step S13, the image in the designated area is analyzed and the acquired attribute instruction data are stored in the RAM 23. At step S14, the image in the designated area is erased because it is possible to prevent an image (a bar code in this case) that indicates the attribute instruction data and that is not necessary for the printing from being printed.

At step S15, the image in the original image area is processed according to the attribute instruction data that are stored in the RAM 23. Then, at step S16, the processed image is printed.

As described above, according to the eighth embodiment, an original area for an image to be printed and an area that includes attribute instruction data are provided on a single sheet, and the image in the original area is processed according to the attributes, which are instructed by the attribute instruction data. Since the original image and the attribute instructions are described on a single sheet, the management of an original is easier than in the seventh embodiment.

The printing can be performed on a sheet in a proper size by varying the size of an original that is read and the size of a sheet that is to be output. When, for example, the size of the original 21 in FIG. 30A is A3, the required size that is to be output is half that, i.e., A4. Therefore, the apparatus is so designed that an original that is size A3 is read and an image that covers an A4 size area, which is the right half, is printed on an A4 size sheet.

By using the margin as is shown in FIG. 30C, the size of the original that is read can match the size of a sheet that is to be printed.

Ninth Embodiment

In a ninth embodiment, two types of images are employed to designate an attribute instruction.

FIG. 32 is a diagram showing an attribute instruction image and an original image, and the output results that are obtained with them according to the ninth embodiment.

In a format original 31 is formed an image that represents attribute instruction data by means of a bar code and a mark sheet. In a bar code portion 31a, bar codes are described for data attribute instructions, such as a character frame range in which a color change for characters is designated and a character color. In a mark sheet portion 31b, a user can later enter desired data in a mark sheet form. With this mark sheet, a user issues a desired attribute instruction.

Figure 33:
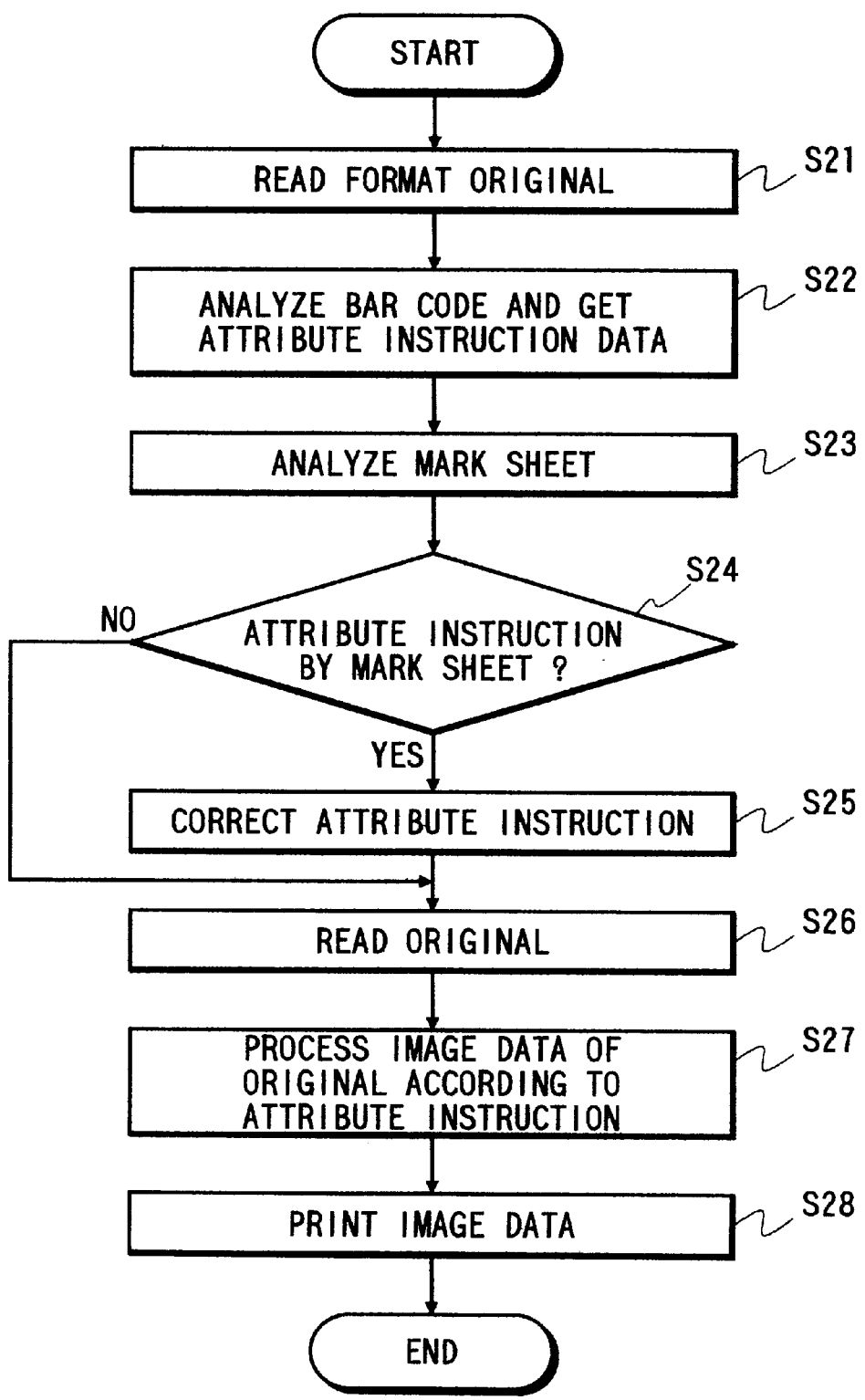
FIG. 33 is a flowchart showing the operating procedures for an image processing apparatus according to the ninth embodiment of the present invention.

FIG. 33 is a flowchart showing the processing for the ninth embodiment. A control program for performing the processing is stored in the ROM 22 and is executed by the CPU 21.

At step S21, the format original 31 is read by the scanner 27. At step S22, the bar codes in the bar code portion 31a in the format original 31 are analyzed, and attribute instruction data are acquired and stored in the RAM 23.

At step S23, the mark sheet in the mark sheet portion 31b of the format original 31 is analyzed. At step S24, a check is performed to determine whether or not the attribute instruction is designated by the mark sheet. If, the attribute instruction is designated by the mark sheet, program control advances to step S25, where the attribute instruction stored in the RAM 23 is corrected according to the contents that are designated by the mark sheet. When no attribute instruction is designated by the mark sheet, program control goes to step S26.

At step S26, the original is read and the read image data are stored in the RAM 23. At step S27, the image data for the original are processed according to the attribute instruction that is stored in the RAM 23. At step S28, the resultant image data are printed.

As described above, according to the ninth embodiment, when there is no entry in the mark sheet portion 31b, the range of a character frame and the character color are changed according to the instruction that is designated by the bar code portion 31a. When there is an entry in the mark sheet portion 31b, the image processing for that article is performed according to the instruction designated in the mark sheet, while image processing for the other portions is performed according to the instruction that is provided by the bar codes.

As described above, according to the ninth embodiment, since the attribute instruction that is the default and is designated by bar codes is changed as needed, a flexible attribute instruction procedure is performed. Since the attribute instruction is set as the default by the bar codes, the attribute instruction need only be issued for necessary articles, and the load that is placed on a user is reduced.

As described above, according to the above described seventh through ninth embodiments, a scanner for inputting an original is used to designate attribute instructions, such as the designation of a range and a color change, and a special input device is not required, so that an image processing apparatus that designates a range and a character color is provided at a low cost.

The present invention can be applied for use with a system that has a plurality of devices or for use with an apparatus that includes a single device. Further, the present invention can be applied for use when a program for carrying out the present invention is supplied to a system or to an apparatus to realize the present invention.

As described above, according to the present invention, it is possible to read an original which includes an original image and an attribute instruction image for designating the contents of the image processing for the original image, and to perform the image processing in consonance with the attribute instruction contents that are indicated by the attribute instruction image. And, therefore, since a single device serves as an input device for inputting attribute instruction contents and as a device for reading an original image, an image processing apparatus is provided at a low cost.

Tenth Embodiment

Figure 34:
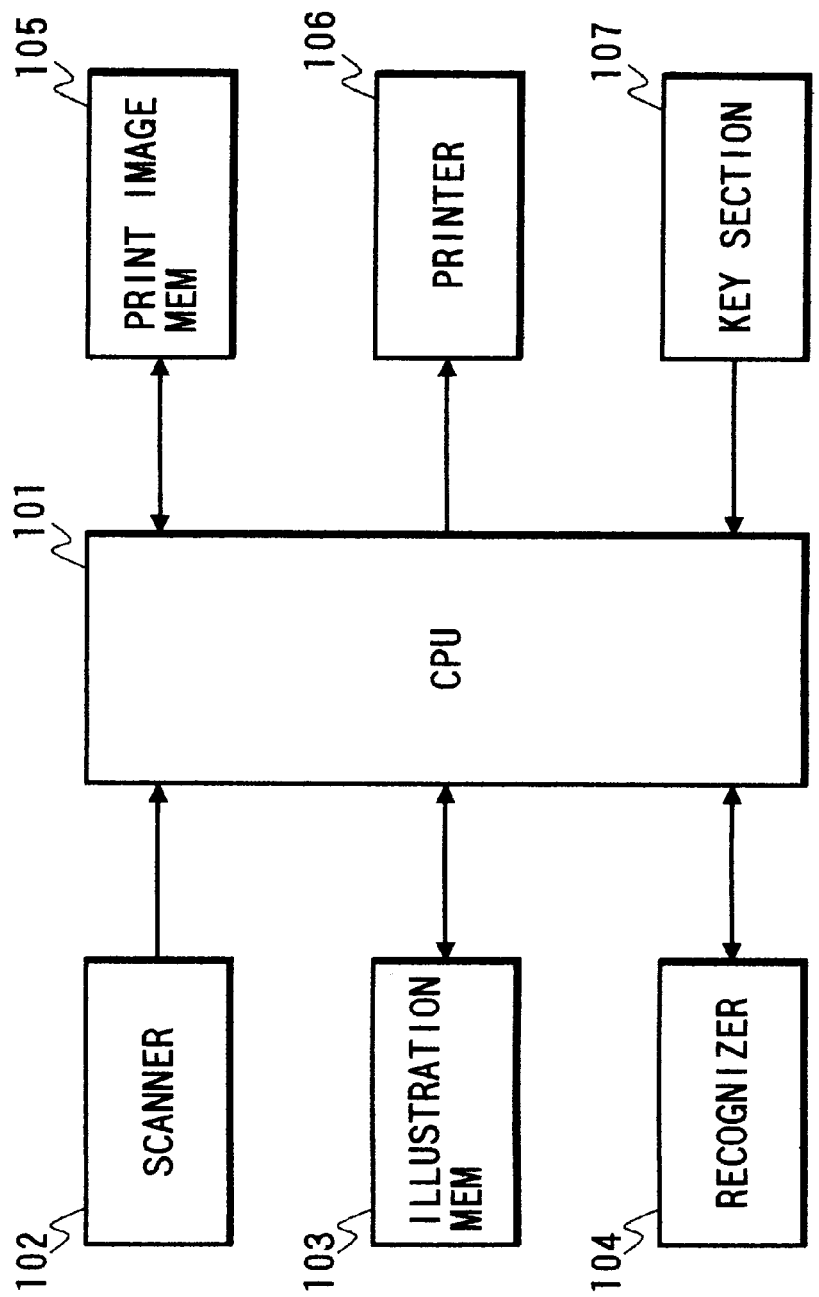
FIG. 34 is a schematic diagram illustrating the arrangement of an image processing apparatus according to a tenth embodiment of the present invention.

A perspective outline of an image processing apparatus according to this embodiment is shown in FIG. 1. Since a detailed explanation is given in the first embodiment, no further description is given here. FIG. 34 is a schematic block diagram showing the arrangement of an image processing apparatus in this embodiment.

In FIG. 34, a CPU 101 controls the entire operation of the image processing apparatus according to the embodiment. A scanner 102 reads an image, such as an illustration. An illustration/symbol memory (hereafter referred to simply as "illustration memory") 103 is used to store image data. A symbol recognizer (hereafter referred to as a "recognizer") 104 recognizes the shape, the size, and the direction of an image that is read by the scanner 102. A print image memory 105 is used to store an image to be printed. A printer 106 prints an image in consonance with the contents stored in the print image memory 105. A key section 107 is used to transmit various instructions to the CPU 101.

Figure 35:
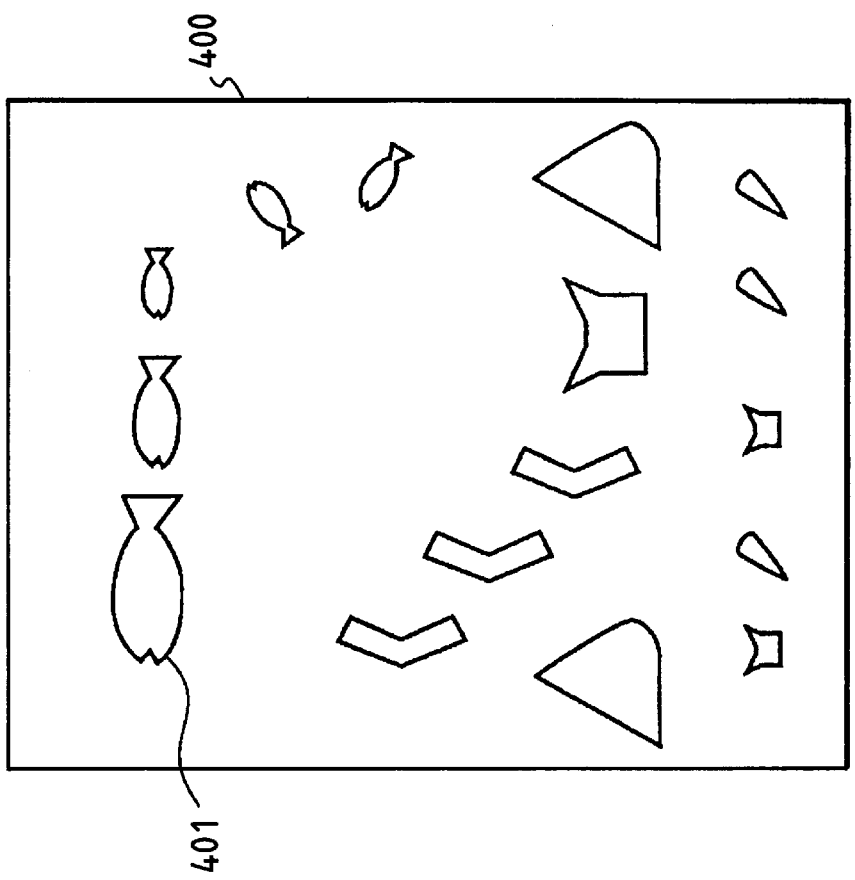
FIG. 35 is a diagram showing a reading sheet of first type symbols according to the tenth embodiment of the present invention.

FIG. 35 is a diagram showing an illustration reading sheet 300.

In FIG. 35, common illustrations 301 through 305 (e.g., a fish drawing 301) on the left are samples that constitute desirable final outputs after editing is performed. Symbol FIGS. 306 through 310 (e.g., only the outline FIG. 306 of a fish) (hereafter referred to as "first type symbols") correspond to the illustrations 301 through 305 on the left. The first type symbols are information for specifying drawings that are finally to be printed.

Figure 36:
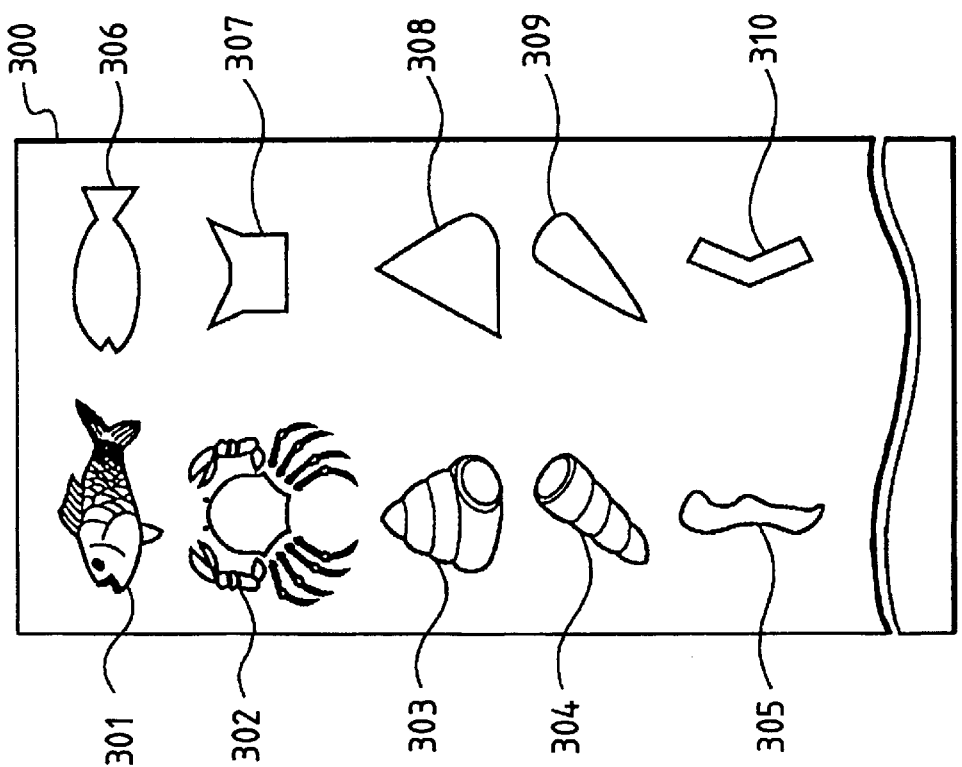
FIG. 36 is a diagram showing a sheet of second type symbols.

FIG. 36 is a diagram showing a sheet 400 in which are depicted second type symbols which are described later.

One of the figures in FIG. 36 (e.g., the largest FIG. 401 that depicts only the outline of a fish) is a symbol figure (hereafter referred to as a "second type symbol") whose shape is similar to that of the first type symbol. Various symbols are drawn in desired sizes, directions, and positions in correspondence with illustrations that are finally to be printed. The second type symbol is input information that corresponds to the specifying information, and is drawn using a template in FIG. 37.

Figure 37:
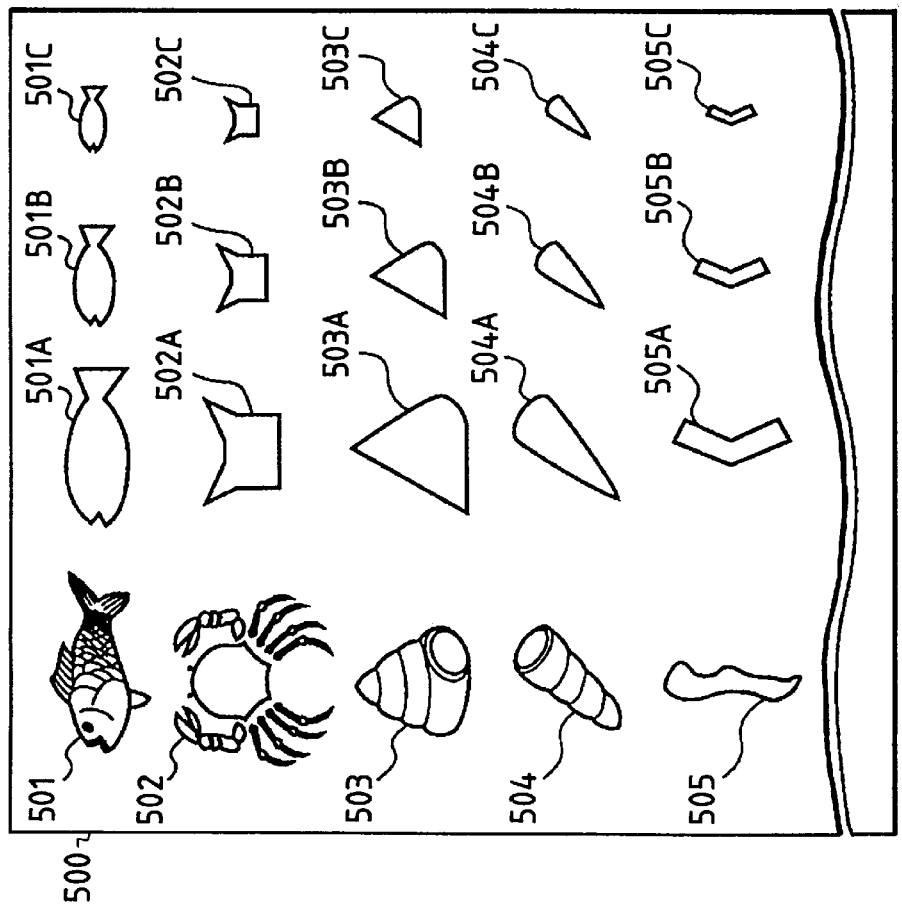
FIG. 37 is a diagram showing a template according to the tenth embodiment of the present invention.

In a template 500, which is made of a plastic plate, in FIG. 37, illustrations 501 through 505 (e.g., a fish FIG. 501) are included on the left, and to the right of the illustrations are provided through holes (e.g., 501A, 501B and 501C for a fish figure), in three different sizes, that have the same shapes as symbols for the illustrations. To print a fish figure, one of the through holes 501A, 501B and 501C in FIG. 37 is used to draw a figure with a pen, etc., at a desired position and in a desired direction on a sheet in FIG. 36. To print, for example, an illustration of a large crab that is pointed downward, a through hole 502A is used to draw the crab pointed downward. In this manner, the editing of the illustration is facilitated.

The basic operation of the image processing apparatus in this embodiment is explained while referring to FIGS. 34 through 38.

When the reading sheet 300 shown in FIG. 35 is fed through the entrance 101 in FIG. 1 and the input key 404 in FIG. 1 is depressed, the illustrations and the first type symbols are read by the scanner 102 in FIG. 34 and are identified by the recognizer 104 in FIG. 34. The illustrations and the first type symbols are stored as pairs in correspondence with each other in the illustration memory 103 in FIG. 34, and the reading sheet 300 is then discharged. The scanner 102 and the recognizer 104 in FIG. 34 serve as image reading means and recognition means.

Following this, when the sheet 400 in FIG. 36 is fed through the entrance 101 in FIG. 1 and the input key 402 in FIG. 1 is depressed, the second type symbols are read by the scanner 102 in FIG. 34 and are identified by the recognizer 104 in FIG. 34. The shapes of these symbols are compared with those of the first type symbols stored in the illustration memory 103 in FIG. 34. In other words, the first type symbols whose shapes are the same as or similar to the second type symbols are searched for, and the illustrations that correspond to the first type symbols that are searched for are extracted from the illustration memory 103 in FIG. 34 and called up. In consonance with information concerning the sizes, the directions and the positions of the second type symbols, the extracted illustrations are arranged to print images, which are then stored in the print image memory 105 in FIG. 34, and the sheet 400 in FIG. 36 is discharged. The recognizer 104 in FIG. 34 serves with the CPU 101 as illustration extraction means.

Figure 38:
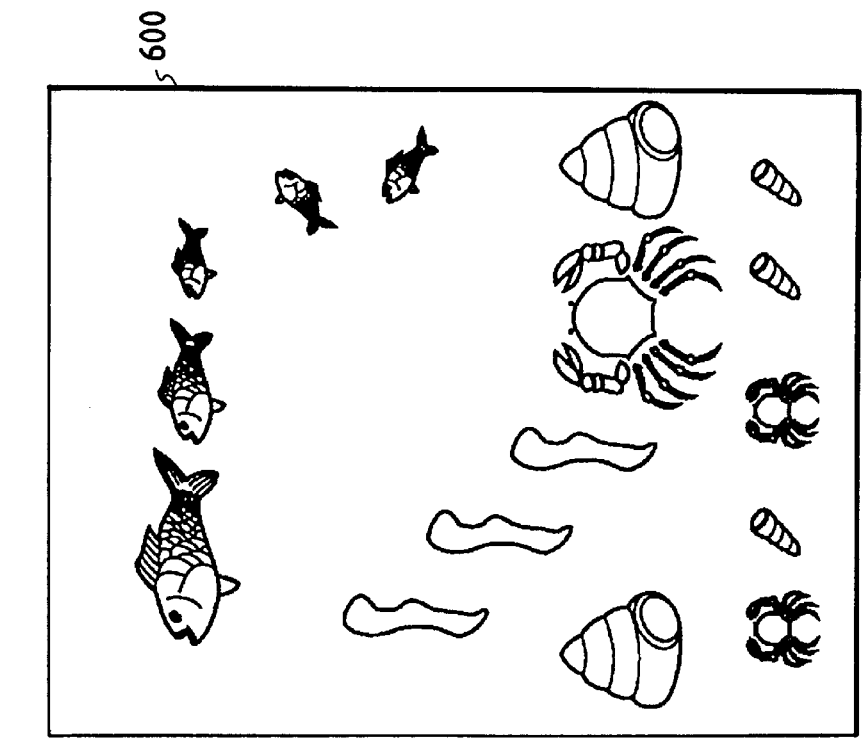
FIG. 38 is a diagram showing printed material that is obtained by using the sheet of the second type symbols according to the tenth embodiment of the present invention.

When a predetermined printing sheet is fed through the entrance 101 in FIG. 1 and the input key 403 is depressed, the printing is performed by the printer 106 in FIG. 34 in consonance with the contents that are stored in the print image memory 105 in FIG. 34. A copy 600 that is output based on the sheet 400 in FIG. 36 is shown in FIG. 38.

The processing of the image processing apparatus is described in detail below while referring to FIGS. 39 through 41.

Figure 39:
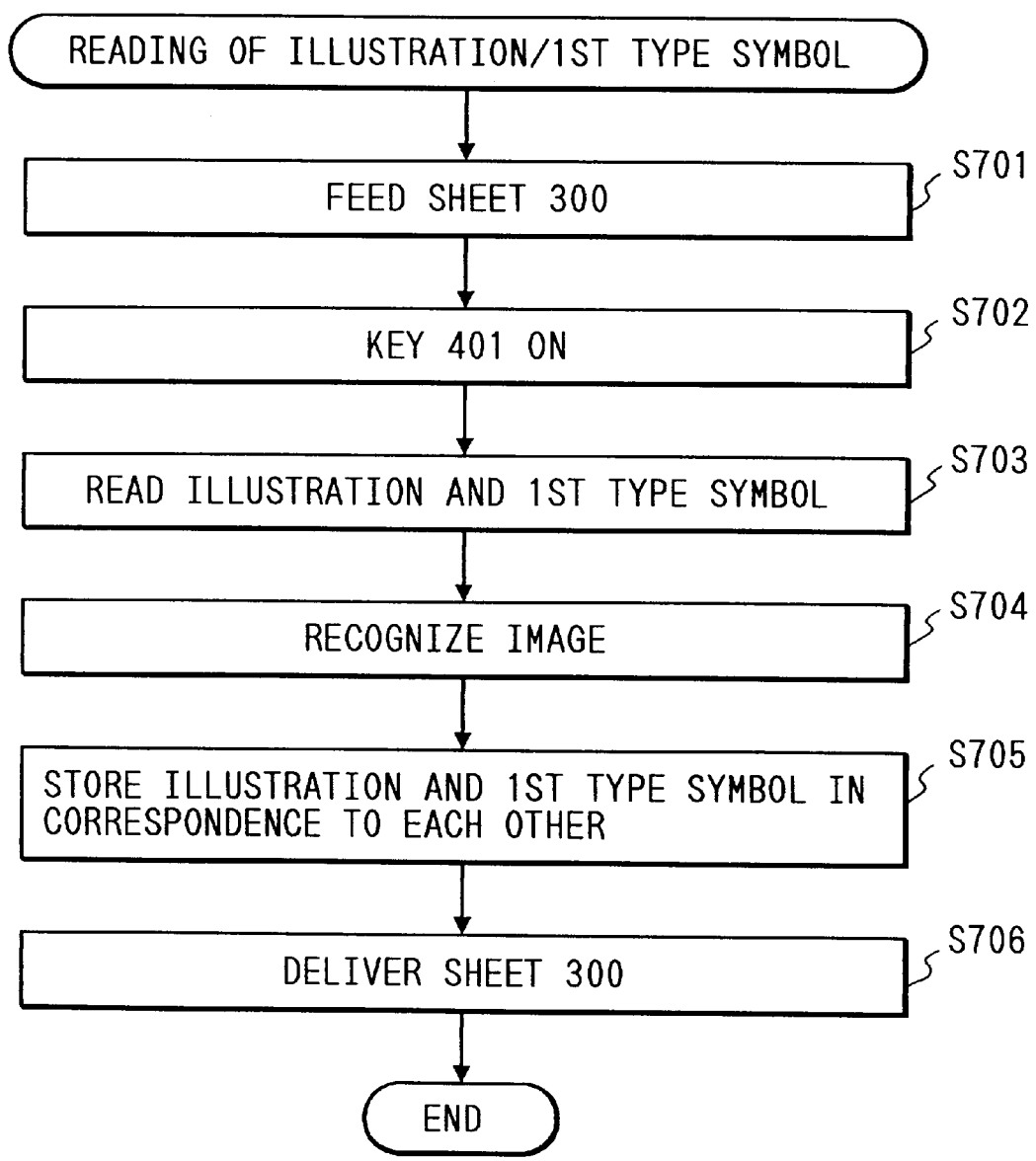
FIG. 39 is a flowchart showing a reading routine for an illustration and a first type symbol according to the tenth embodiment of the present invention.

FIG. 39 is a flowchart showing the routine of reading the illustration/first type symbol. First, the reading sheet 300

(FIG. 35) is fed (step S701) and the input key 401 in FIG. 1 is depressed (step S702). Illustrations and the first type symbols are read (step S703), and their images are identified (step S704). The illustrations and the first type symbols are stored in correspondence with each other (step S705), and the reading sheet 300 is discharged (step S706). This routine is thereafter terminated.

Figure 40:
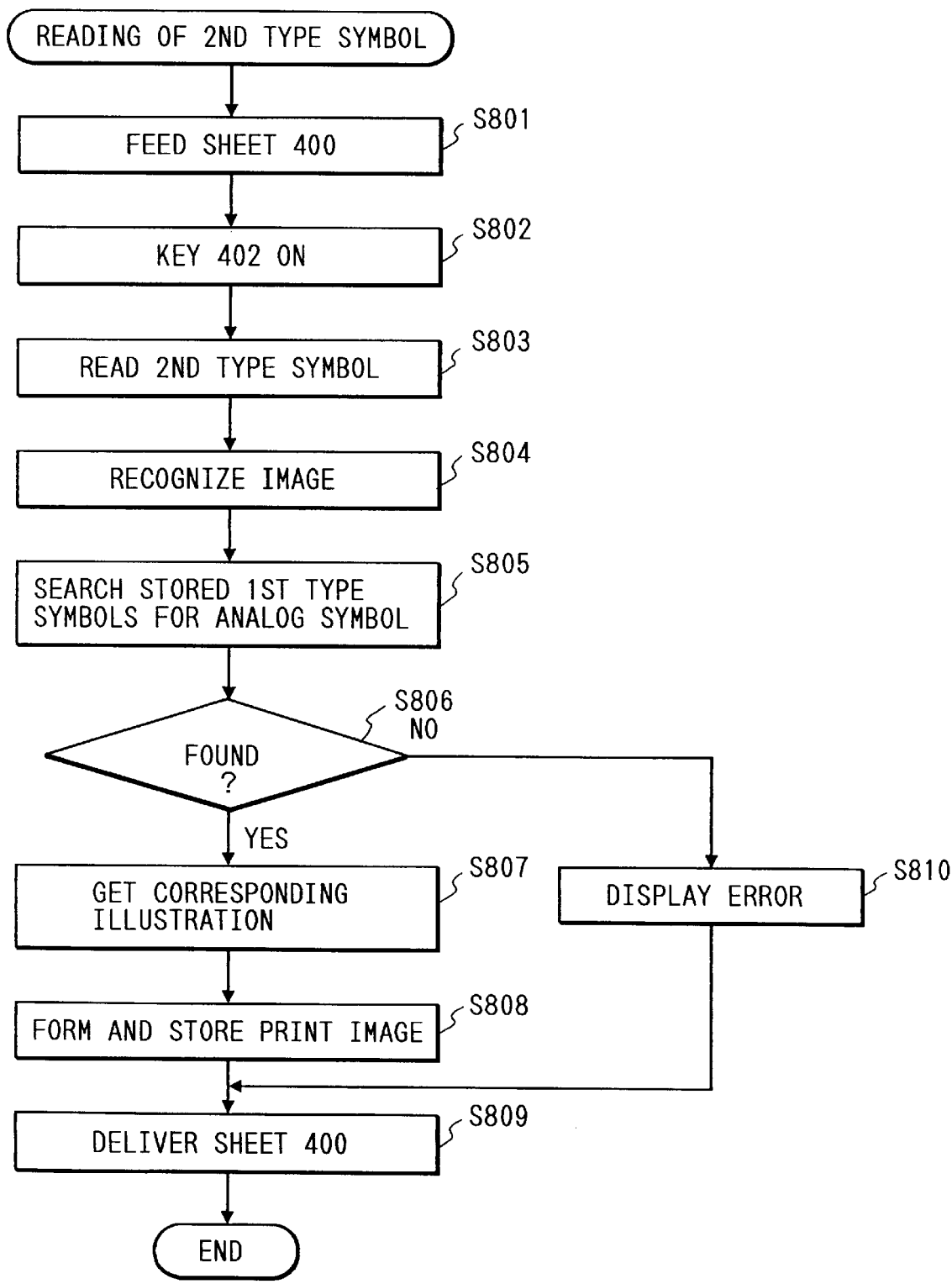
FIG. 40 is a flowchart showing a reading routine for a second type symbol according to the tenth embodiment of the present invention.

FIG. 40 is a flowchart showing the routine for reading the second type symbols. The sheet 400 (FIG. 36) whereon the second type symbols are included is fed (step S801) and the input key 402 in FIG. 1 is depressed (step S802). The second type symbols are read (step S803). Their images are identified (step S804), and the first type symbols that have similar shapes are searched for among the first type symbols that are stored (step S805). At step S806, a check is performed to determine whether or not the symbols that are similar in shape to the second type symbols have been found. If the symbols that are in similar shape have been found, corresponding illustrations are extracted from the illustrations that are already stored (step S807). In consonance with information concerning the sizes, the directions and the positions of the second type symbols, print images are prepared and stored (step S808), and the sheet 400 of the second type symbols is discharged (step S809). This routine is thereafter terminated.

When, at step S806, there are no first type symbols that are similar in shape to the second type symbols, a predetermined error display is displayed on a display section (not shown) (step S810), and the sheet is discharged. This routine is thereafter terminated.

Figure 41:
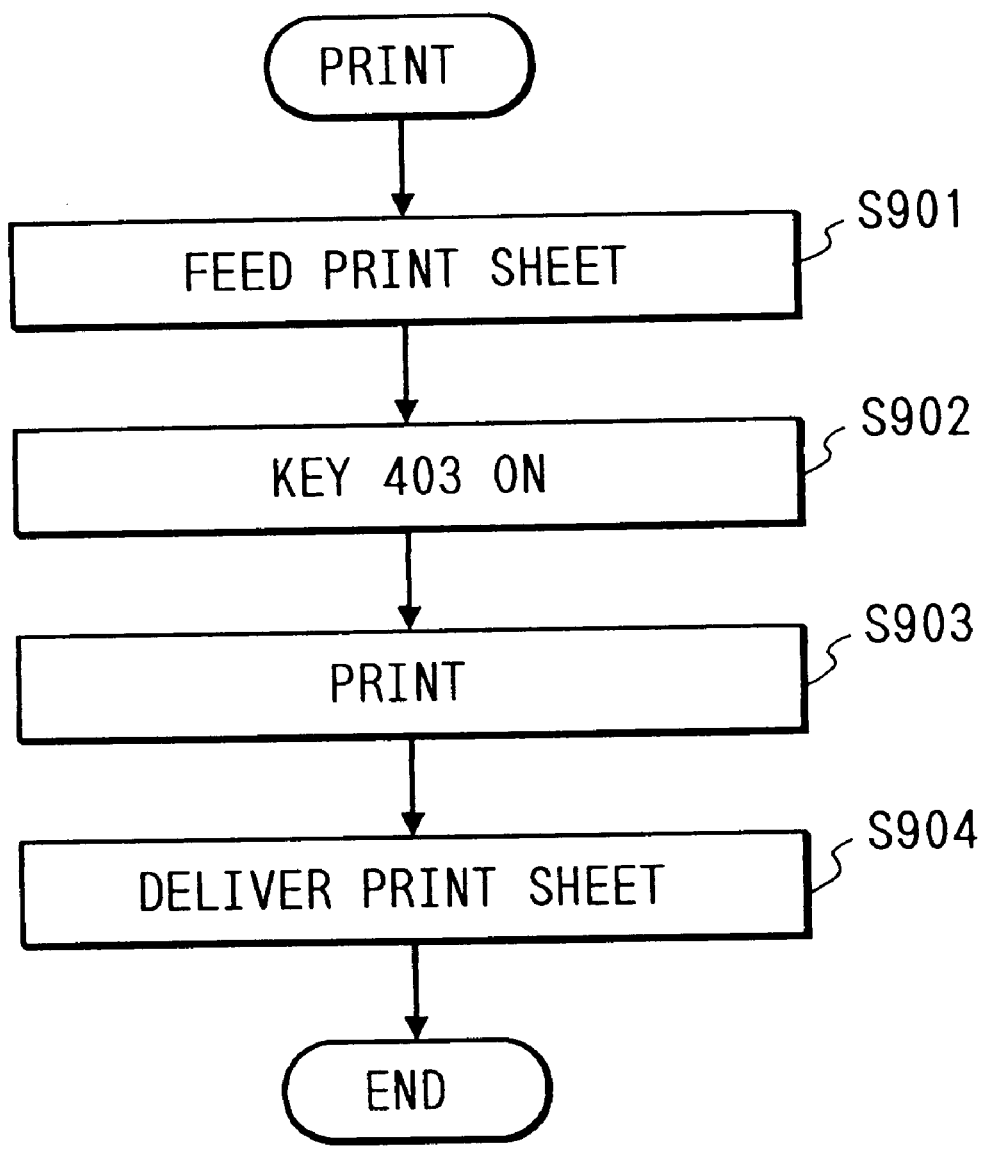
FIG. 41 is a flowchart showing a printing routine according to the tenth embodiment of the present invention.

FIG. 41 is a flowchart for a printing routine. A print sheet is fed (step S901) and the input key 403 in FIG. 1 is depressed (step S902). An image is printed in consonance with the stored print image data (step S903) and the print sheet is discharged (step S904). This routine is thereafter terminated. In this manner, illustrations are combined on a single sheet without requiring a display, and common illustrations are effectively utilized to edit various types of illustrations.

In this embodiment, the illustration reading sheet 300 (FIG. 35) is employed for storing the illustrations and the first type symbols in correspondence with each other. However, other media may be employed, and an external storage medium (an FD, etc.) on which data are stored may be read. The illustrations and the first type symbols may be read pair by pair or at one time in multiple pairs. A non-volatile memory may be used to store the read contents, or data may be stored in advance in a ROM, etc. Alternatively, both these storing methods and the sheet reading may be employed.

In this embodiment, the input keys 401, 402 and 403 in FIG. 1 are used in order to issue operation instructions. The need for the input keys may be obviated by providing on the reading sheet bar codes or a mark sheet that carry the same input information as that entered by the input keys. In this case, analyzing means for bar codes, etc., is provided in the scanner.

Figure 43:
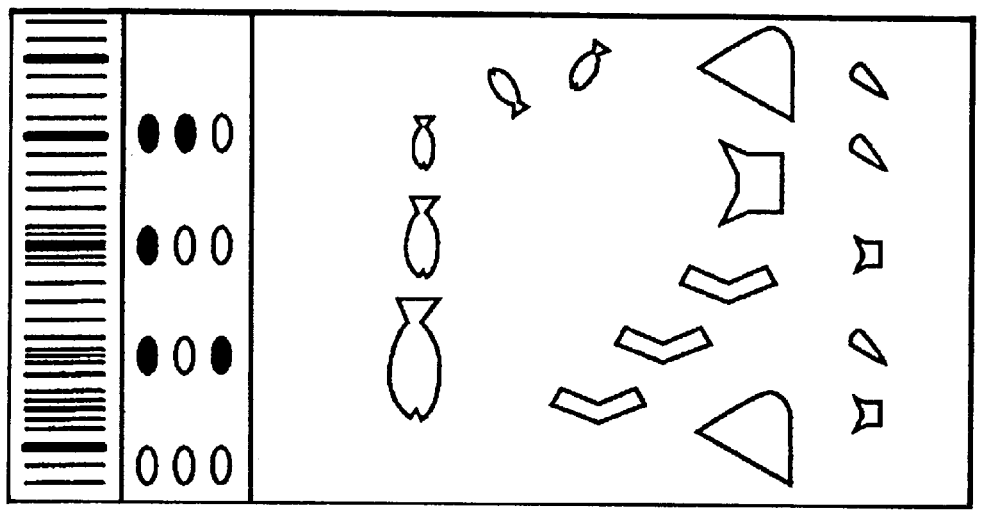
FIG. 43 is a diagram showing a reading sheet of the second type symbols according to the tenth embodiment of the present invention on which are a bar code and a mark sheet.
Figure 42:
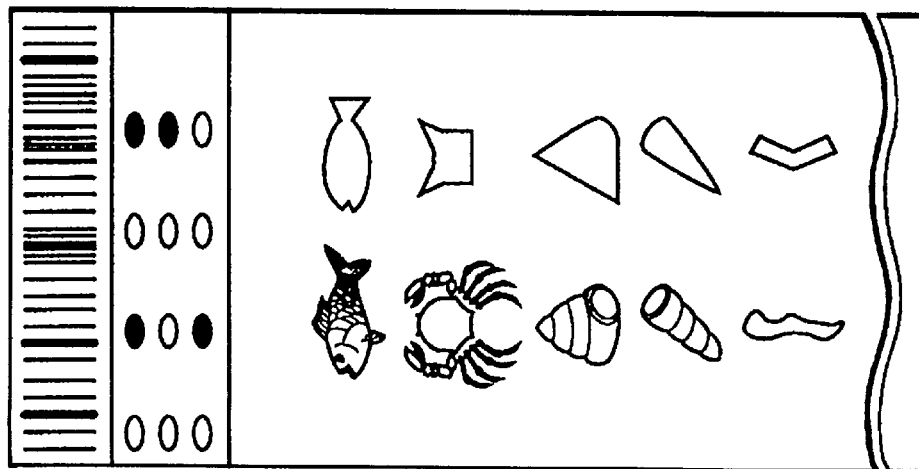
FIG. 42 is a diagram showing a reading sheet according to the tenth embodiment of the present invention on which are a bar code and a mark sheet.

FIGS. 42 and 43 are diagrams showing sheets that include a bar code and a mark sheet. In FIG. 42 is shown a reading sheet that has a bar code in the uppermost portion and a mark sheet in the second from the top portion, and a fish figure and others are the same as those in FIG. 35. In FIG. 43 is shown a sheet in which a bar code and a mark sheet are provided in the same manner and the second type symbols are included, and a fish symbol and others are the same as those in FIG. 36.

The three input keys described above may be combined into one start key, and the sheets may be fed in the above described manner.

The sheet entrance 101 in FIG. 1 and the scanner 102 in FIG. 34 are used in common to read the illustrations and the first type symbols, and to read the second type symbols, but may be provided independently. Further, the entrance and the discharge ports for printing may be provided independently.

Although in this embodiment an illustration is specified by using the first type symbol, the other method may be employed to specify the illustration. Information that specifies a desired illustration, such as information for a symbol, a character, a color, a bar code, or a voice, may be employed in correspondence with the desired illustration.

In this embodiment, the first type symbols that are similar in shape to the second type symbols are searched for among the stored first type symbols. The symbols that have substantially the same shape may be searched for. Instead of the second type symbols, other input information that correspond to the first type symbols may be employed, such as information for a symbol, a character, a color, a bar code, or a voice.

The printing mode has been changed in consonance with information concerning the sizes, the directions, and the positions of the second type symbols. Among the information items, only one or two items may be employed, or other information (coloring) may be added.

Although in this embodiment, a plate in which through holes are employed as a template for drawing the second type symbols, any other means for drawing symbols of illustrations may be employed, and a stamp, for example, may be used. The template in this embodiment can also be used for drawing the first type symbols.

As described above, the read and identified illustrations, and information for specifying the illustrations are stored in correlation with each other. An operator prepares input information that corresponds to the information for specifying the illustrations that are to be printed, and inputs the prepared information to the image reading means. The illustrations that are to be printed are extracted from the illustrations that are stored in the image storing means, and are printed. Therefore, a display, etc., is not required, and by effectively utilizing common illustrations, illustrations can be edited on a sheet.

Since the illustrations are printed in consonance with the recognition results obtained by the recognition means, more varied illustration editions are possible.

The illustration edition is facilitated more by using the reading sheet or the template.

Eleventh Embodiment

Figure 44:
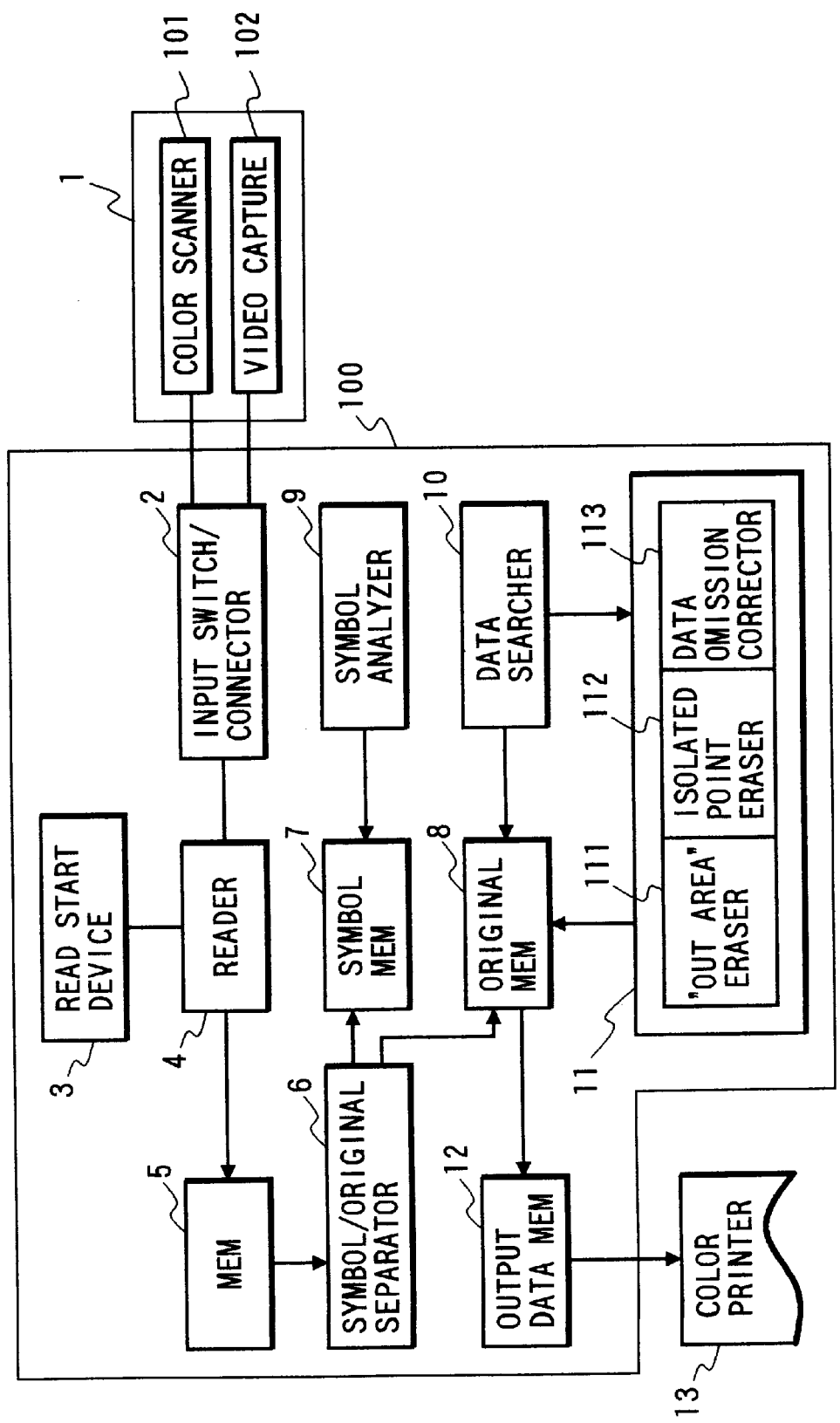
FIG. 44 is a block diagram illustrating the arrangement of an apparatus that represents the feature of an eleventh embodiment of the present invention.

FIG. 44 is a block diagram illustrating an eleventh embodiment of the present invention. In FIG. 44, a common input device 1 reads an original on which are symbols, and reads image data that is to be pasted. In this embodiment, a color scanner 101 for reading an original image and a video capture 102 for reading an image from a video tape or a television constitute the input device 1.

An input device connection section 1 connects the input device 1 to an apparatus main body 100. A read start device 3 counts the timing for reading an original on which are symbols, and an image that is to be pasted, and functions when an original with accompanying symbols is set in the scanner 101 and when image data that are to be pasted are read. A reader 4 actually reads data when the reading start is instructed by the read start device 3. The reader 4 can read data for both the color scanner 101 and the video capture 102. The video capture 102 can receive data from a device, such as a TV, a VTR or a PC, that transmits a signal.

A memory 5 is used to temporarily store the read data. A symbol/original separator 6 separates the read data into a symbol portion and an original portion. A symbol memory 7 and an original memory 8 are used to store the original data with symbols that are separated by the symbol/original separator 6. The symbol area data are stored in the symbol memory 7, while the original area data are stored in the original memory 8.

A symbol analyzer 9 analyzes a control symbol for the data that are stored in the symbol memory 78, and performs the primary control for the present invention. In this embodiment, a symbol indicating whether or not there is erasing and correction means is designated. To perform erasing and correction, a data searcher 10 searches for internal and external data for series of characters 312 and 313 and an image area 311 (see FIG. 46) in an original portion b. A processing device 11 actually performs processing data when data are found by the data searcher 10 that are to be erased or corrected. The processing device 11 includes an "out area" eraser 111, an isolated point eraser 112, and a data omission corrector 113. An output data memory 12 is used to store the erased or corrected data as output data. A color printer 13 prints the stored output data. A color copy machine, etc., that prints the output in color can be connected.

With the above arrangement, the processing of the embodiment is explained below while referring to the flowcharts in FIGS. 45A and 45B.

Figure 45B:
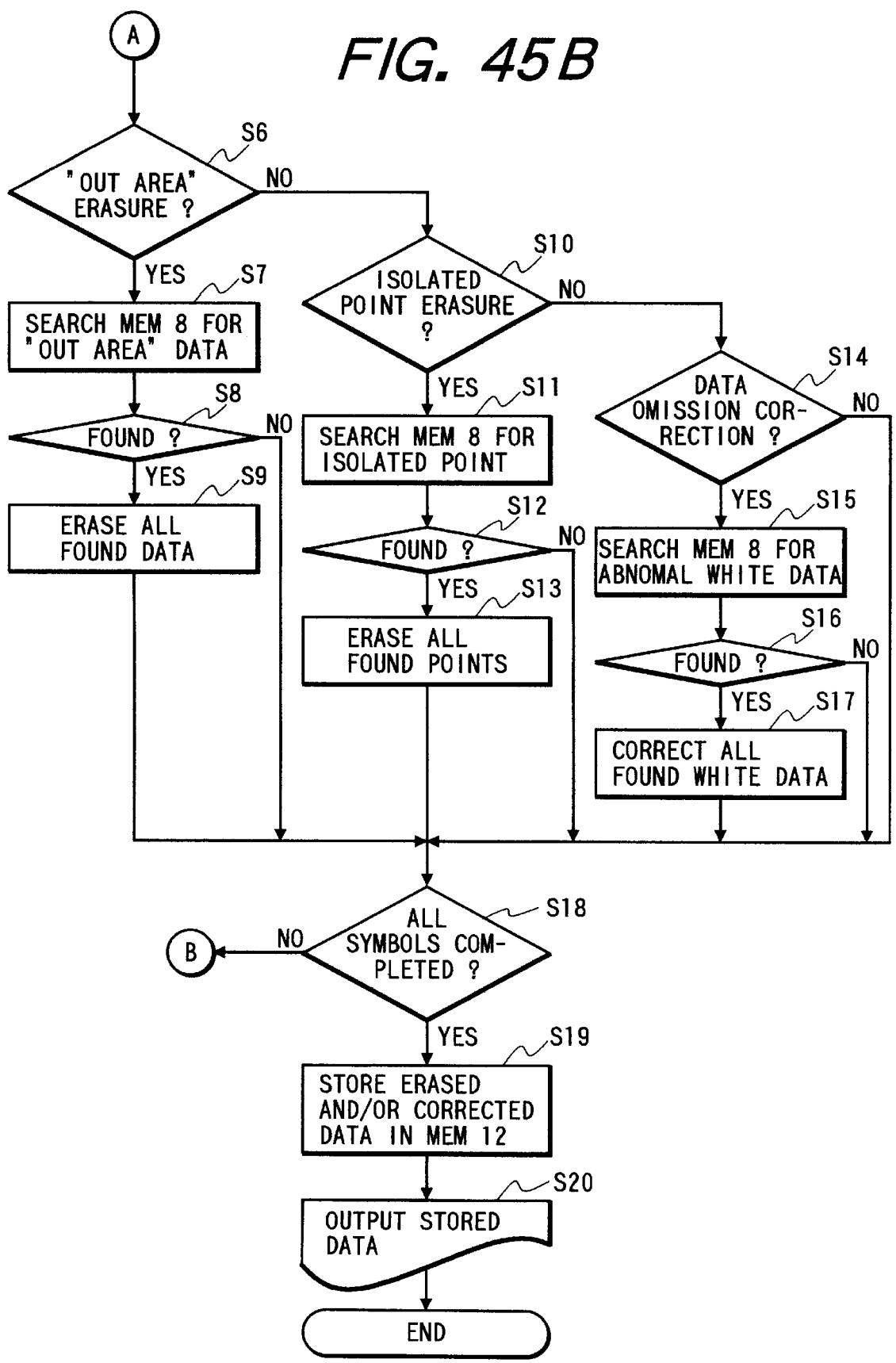
FIG. 45 is comprised of FIGS. 45A and 45B are flowcharts showing the operating procedures for the eleventh embodiment of the present invention.

The processing in the flowcharts in FIGS. 45A and 45B show procedures for each block in the arrangement shown in FIG. 44.

Figure 46:
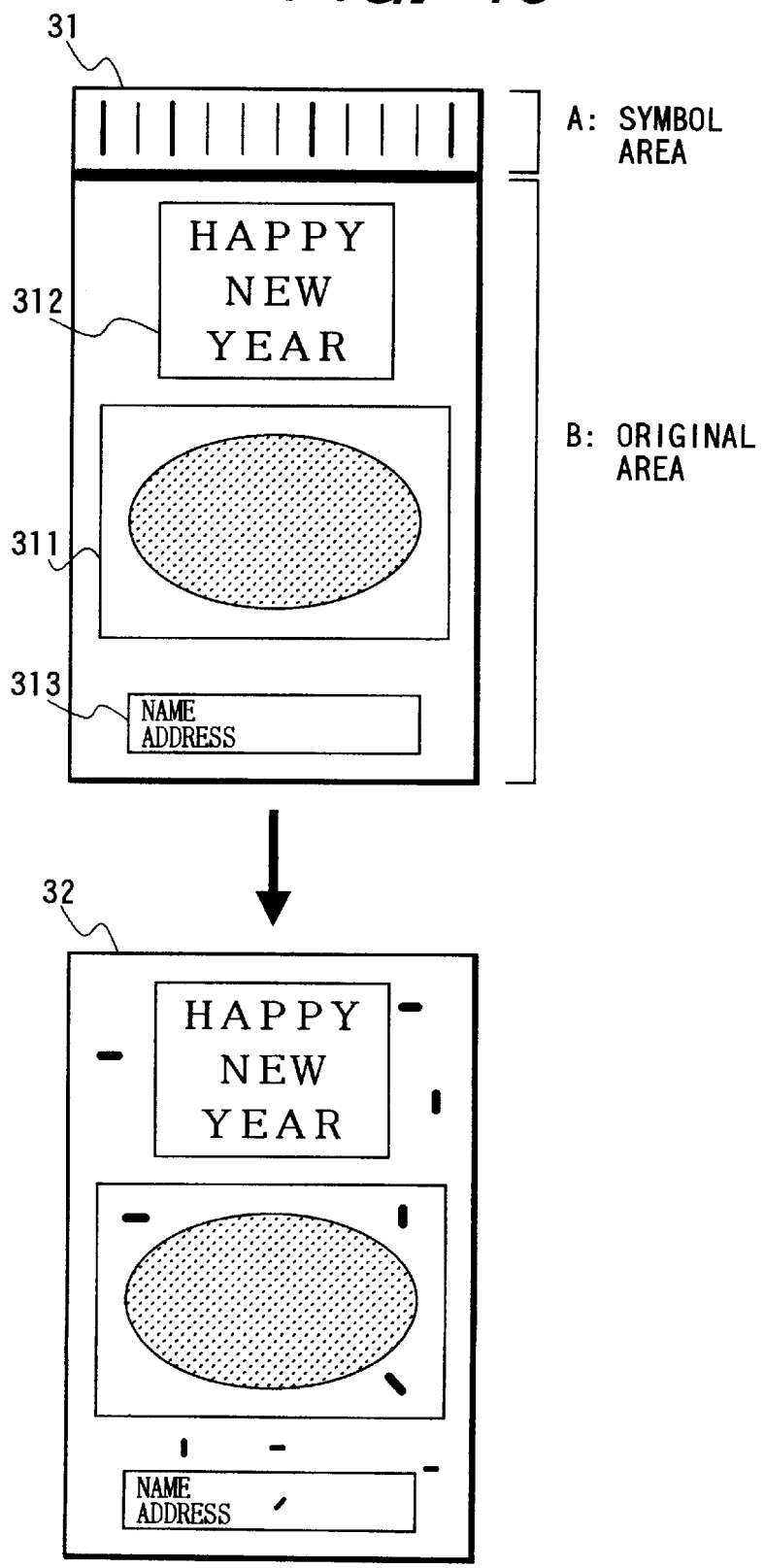
FIG. 46 is a diagram showing an example for an input original that is to be employed and data that have been entered according to the eleventh embodiment of the present invention.

FIG. 46 is a diagram showing an original example with accompanying symbols that is to be read, and a data example that is obtained by the reading that is performed according to this embodiment. An original 31 with accompanying symbols has as its symbol a bar code wherein a indicates a bar code as a symbol area and b indicates an original area. Codes for erasing or correcting data are described in the bar code area a. A state 32 that is obtained by reading the original 31 includes stains and blank areas.

Figure 47A:
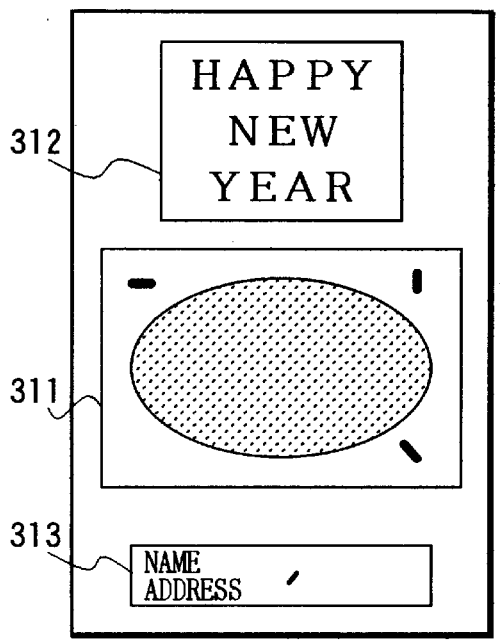
FIGS. 47A through 47D are diagrams showing printed examples obtained after the individual processes are performed in the eleventh embodiment of the present invention.
Figure 47B:
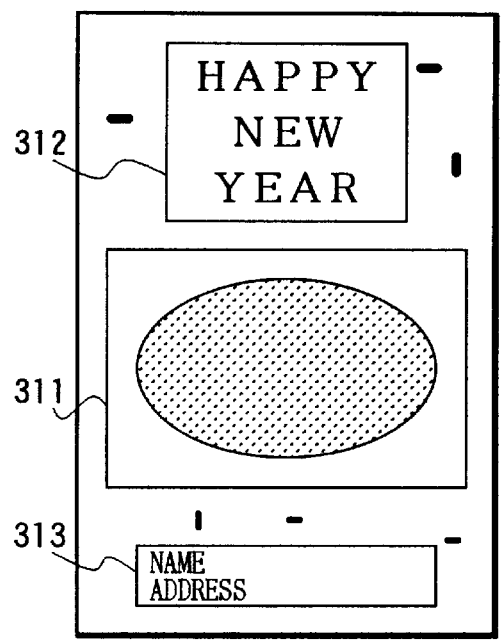
Figure 47C:
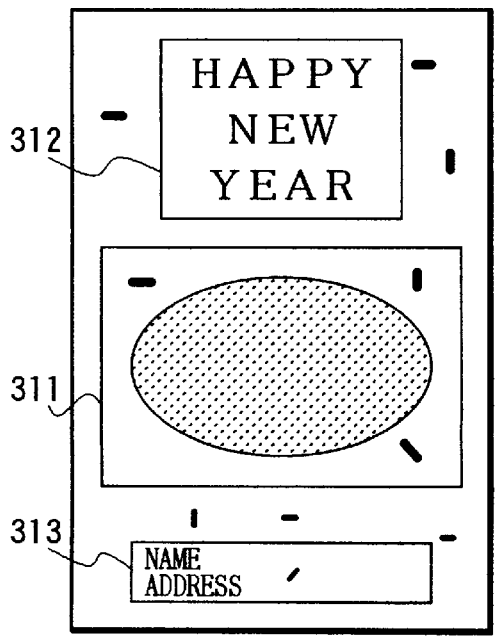
Figure 47D:
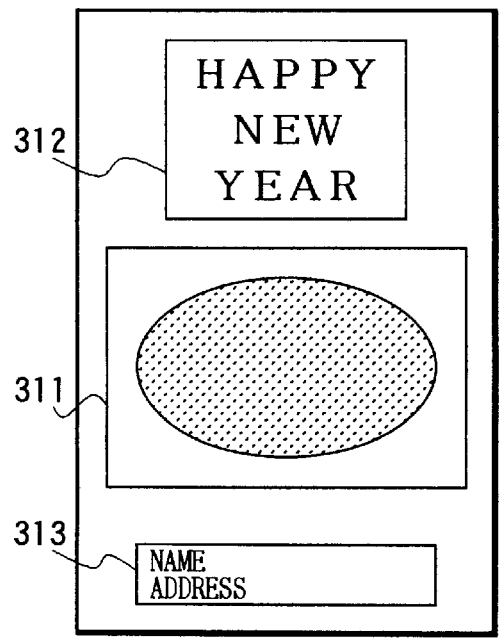

FIGS. 47A through 47D are diagrams showing the results obtained by performing the erasing and correcting processes in this embodiment. The state in FIG. 47A shows the result obtained by performing the "out area" erasing, the state in FIG. 47B shows the result obtained by performing the within-area isolated point erasing, the state in FIG. 47C shows the result obtained by performing the within-area data omission correction, and the state in FIG. 47D shows the result obtained by performing the processes described for FIGS. 47A through 47C.

Figure 48:
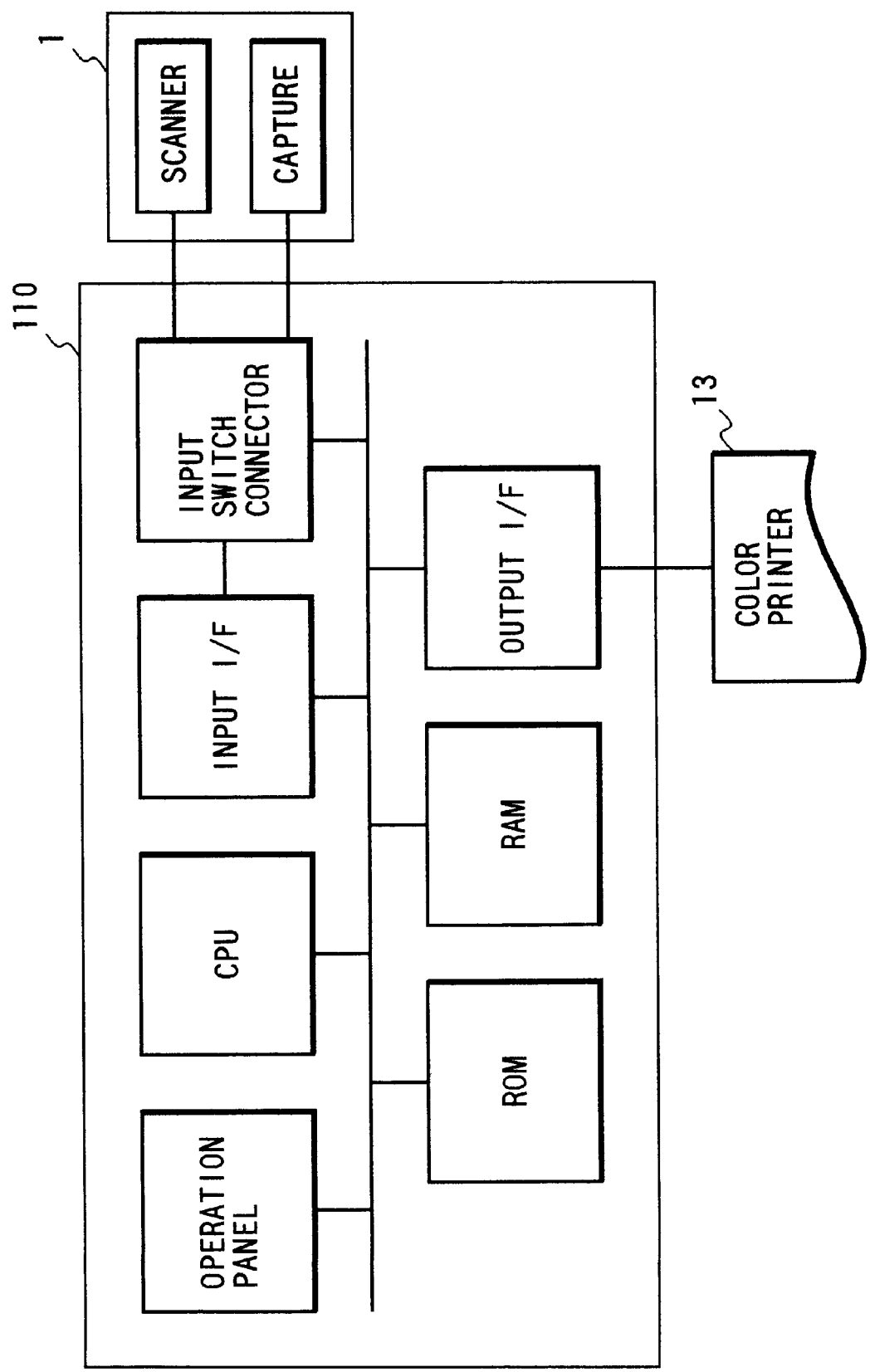
FIG. 48 is a diagram illustrating the arrangement of an image processing apparatus according to the eleventh embodiment of the present invention.

While referring to the flowcharts in FIGS. 45A and 45B, a detailed description is given for the process whereby the input original 31 is read, stains and blank areas included in the read data 32 are analyzed, and all the corrections shown in FIG. 47D are performed. In this embodiment, a program for the procedures in the flowcharts in FIGS. 45A and 45B is stored in the ROM and the CPU 1 is controlled by that program. Its arrangement is shown in FIG. 48. The image processing apparatus 110 includes a ROM and a RAM where a program and data are stored, a CPU that controls the entire system by executing the program, an input interface that connects the input device 1 to the apparatus 110, and an output interface that connects a printer 13 to the apparatus 100. Each block shown in FIG. 44 is realized by the CPU executing the program. The RAM has a working area for storing data that are generated during the execution of the programs. A storage memory for storing read data, a symbol area, a bar code area, an original area, and output data, which is described while referring to the flowcharts in FIGS. 45A and 45B, are included in the RAM.

The processing in the flowcharts in FIGS. 45A and 45B is now described.

First, at step S1, a check is performed to determine whether or not a read start is instructed by the read start device 3. Since this is the first data reading, an original with accompanying symbols is to be unconditionally read by the scanner 101. Therefore, the original with symbols must be set in advance at the color scanner 101. At step S2, the scanner 101 is activated to read the original with accompanying symbols. At step S3, the read original with accompanying symbols is stored in the memory 5.

At step S4, the stored read data are separated into the data for symbol area a and the data for the original area b, which are stored respectively in the symbol memory 7 and the original memory 8. At step S5, the stored symbols are analyzed to examine in order the type of processing means and the presence of such means. At step S6, a check is performed to determine whether or not, as the result of the analysis, the process to be performed is out-area erasing.

When out-area erasing is designated, at step S7, the original memory 8 is searched for data that fall outside the area (outside the range) of the data stored in the memory 8. The original area b is stored in the original memory 8, and the area (range) here indicates the interiors of the character areas 312 and 313 and of the image area 311. At step S8, a check is performed to determine whether or not data are found during the search at step S7. If data were found, the unnecessary data are erased at step S9. If there are no such data, program control goes to step S18. The result obtained is shown in FIG. 47A.

When, at step S6, the result of the analysis does not indicate out-area erasing, at step S10, a check is performed to determine whether or not the result is isolated point erasing. When the erasing of isolated points is designated, at step S11, the original memory 8 is searched to examine whether or not there are isolated points in the area of the stored data. At step S12, a check is performed to determine whether or not isolated points are found as a result of the search. If there are such isolated points, all of them are erased (step S13). If there are no isolated points, program control goes to step S18.

When, at step S10, the result of the analysis does not designate isolated point erasing, at step S14, a check is performed to determine whether or not the result designated data omission correction. If the result does not designate data omission correction, program control moves to step S18. If data omission correction is designated, at step S15, as well as at step S11, the data in the area of the original memory 8 are searched to find abnormal white data, which is blank space in black data. When, at step S16, it is determined that there is blank space in the data area, at step S17 the white data portion is corrected.

After one of the above described processes is performed, at step S18, a check is performed to determine whether or not all the symbol analysis and all the designated processes have been completed. When they have not yet been completed, the process is repeated, beginning at step S5, until they are completed.

When the analysis of all the symbols is ended, at step S19 the data on which erasing and correction have been performed are stored in the output data memory 12. The stored output data are output by the color printer 13 at step S20. The processing is thereafter terminated.

As described above, since processing for isolated points or for data blank areas, or for the processing of an image that fall outside an area is performed in accordance with the designation that is read with an image, and since the operation is performed in consonance with the designation, isolated point erasing and data omission correction is performed without requiring manipulation by an operator.

Although in this embodiment a color image has been employed, a monochrome image can be processed in the same manner. An image in FIGS. 46 or 47A through 47D may be data obtained by synthesizing an image area and a character area, instead of a single image. In this case, the processing for an out-area image, isolated points and data blank areas in each component image may be performed either before or after the synthesis.

In this embodiment, the presence of out-area erasing, data, isolated points, and data blank areas is examined and corresponding erasing and correction are performed. However, since the process routine is made more simple by performing only the process that is adequate for the employed apparatus, the process is simplified.

A range searched by the data searcher 10 may be designated in the symbol area a, and the designated process may be performed within that range.

Further, in this embodiment, the types and the need for processes, and the search area are designated by symbols in an original with accompanying symbols. When a mark sheet is used for the symbols that are added to the original, a user performs only a desired process. In addition, when a range for performing the process is designated by a user, a process according to the user's instruction need only be indicated on the mark sheet and read as in this embodiment.

As described above, according to the image processing apparatus of the embodiment, a symbol, such as a bar code or a mark sheet, is added to an original to designate the processing, and its range, for stains and blank areas that occur during the data reading due to the performance of the input device that reads an original and an image. Therefore, automatically, the erasing of these stains or the correcting of blank areas is determined, and data in the optimal state are prepared and output without a user being aware. In addition, output data is prepared as is instructed by a user by employing an easy operation (by only placing marks in a symbol, such as a mark sheet). Thus, such complicated work wherein data are read and a user erases or corrects the data each time is not required. Since this process is performed, the apparatus is simply structured and is provided at a low cost.

Twelfth Embodiment

FIG. 49 is a block diagram illustrating the arrangement of a twelfth embodiment according to the present invention. Although in this embodiment a bar code is used as a symbol to be read for switching input devices, actually a mark sheet or other analyzable symbol may be used.

In FIG. 49, a read start device 601 counts the timing for reading a format original and image data, and performs functions when a format original is positioned at a scanner and at a timing whereat image data to be synthesized is read. A reader 602 actually reads data when a read start is instructed by the read start device 601. An input switch 603 is employed to switch reading devices (a color scanner 605 and a video capture 606), and is usually connected to the color scanner 605. When the input switch 603 receives a switching instruction as the result of the analysis of the bar code, which is described later, it changes the connection to an instructed device. An input device connector 604 is actually connected to the reading devices, and has contact points that are connected to the inside by the input switch 603.

The color scanner 605 reads a format original and a synthesized image, and one that is available on the market may be used. The video capture 606 can receive data from a device, such as a TV, a VTR, or a PC, that can transmit a video signal. A memory 607 is used to temporarily store data that have been read by the reader 602. A symbol/original separator 608 separates the data into a bar code area and an original area. An original memory 609; and a symbol memory 610 are employed to store the format original data that have been separated by the separator 608; data for the original area are stored in the original memory 609 and the data for the bar code area are stored in the symbol memory 610.

A symbol analyzer 612 determines a control code for the data that are stored in the bar code memory 610, and this control is the primary one for the present invention. In this embodiment, a control code is designated for instructing from which device the following image data are to be read. An output data memory 613 is employed to store synthesized output data. The data stored therein are output by a color printer 614.

With the above arrangement, the processing of the embodiment is explained below while referring to the flowcharts in FIGS. 50A and 50B.

Figure 51B:
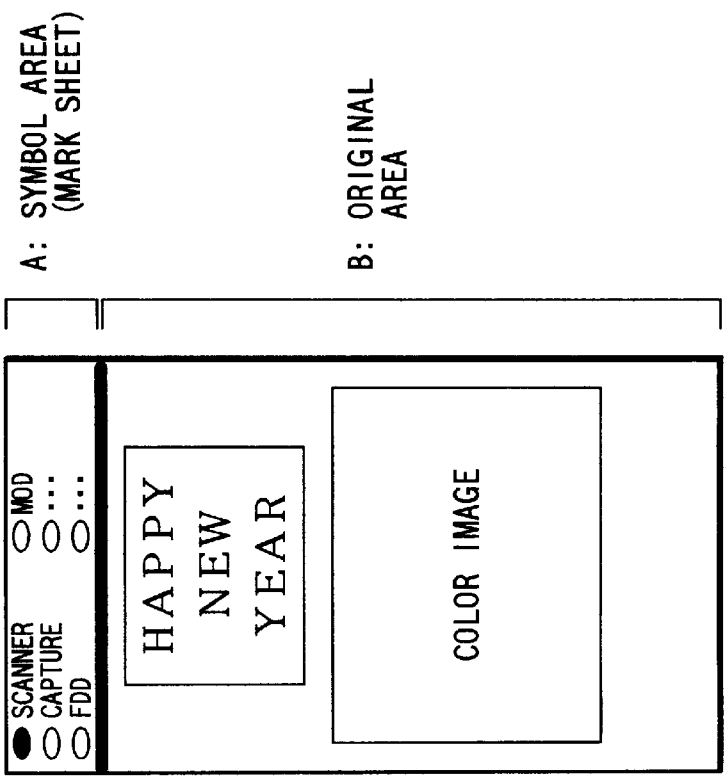
FIGS. 51A and 51B are diagrams showing an example for an input original that is to be employed according to the twelfth embodiment of the present invention.
Figure 51A:
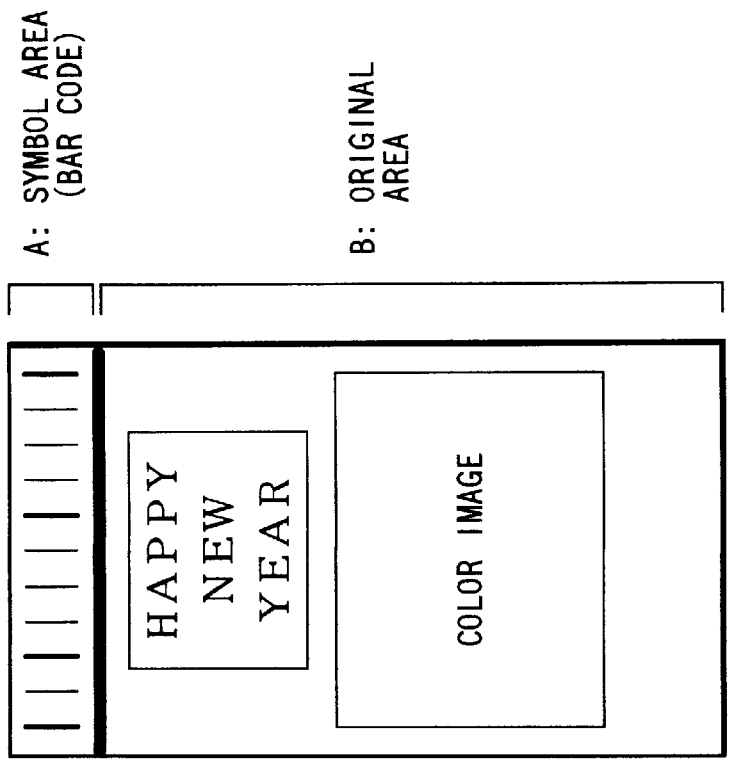

FIG. 51A is a diagram showing an example of an original that is first read by a scanner according to this embodiment. A bar code is used in a symbol area a, as is shown in FIG. 51A. An original area is denoted by b. A control code for switching the input devices of the present invention is included in the bar code area a. The symbol area a may be described with a mark sheet, as is shown in FIG. 51B.

Figure 50B:
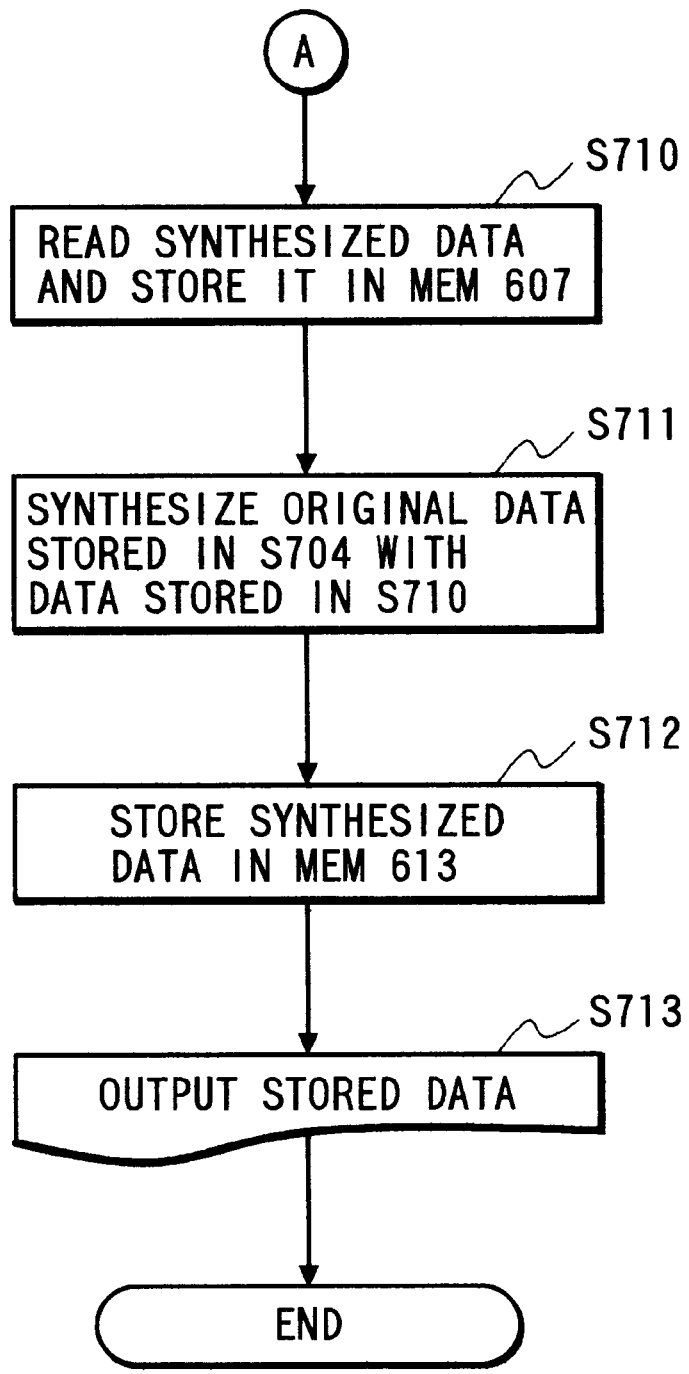
FIG. 50 is comprised of FIGS. 50A and 50B which are flowcharts showing the operating procedures for the twelfth embodiment of the present invention.

In this embodiment, a program, etc., related to the flowcharts in FIGS. 50A and 50B is stored in a ROM (not shown), and a CPU is controlled by the program stored in the ROM. Such an arrangement is shown in FIG. 48, as in the eleventh embodiment.

While referring to the flowcharts in FIGS. 50A and 50B, the procedures performed up until a synthesized image is output are described, with stress being laid on reading and analyzing an input original in FIGS. 51A and 51B and on switching the input devices.

At step S701, a check is performed to determine whether or not a read start is instructed by the read start device 601. Since this is the first data reading, a format original with accompanying symbols is to be unconditionally read by the scanner 605. Therefore, the format original must be positioned in advance at the scanner 605. At step S702, the scanner 605 is activated to read the format original shown in FIGS. 51A and 51B.

At step S703, the read format original with an accompanying bar code is stored in the memory 607. At step S704, the read data that are stored in the memory 607 are separated into the bar code area a and the original data area b, which are respectively stored in the symbol memory 610 and the original memory 609.

At step S705, the stored symbol area (bar code data) is analyzed, and at step S706, a check is performed to determine whether or not the designated device for reading image data is a scanner or a video capture device. When the designated input device is a scanner, at step S707 this is reported to the input switch 603, which switches to the scanner 605. When a video capture device is designated, at step S708 this is also reported to the input switch 603, which switches to the video capture 606.

When the switching has been completed, the wait state for the reading of synthesized data is set. A user provides synthesized data to the input device that is designated by the symbol area, and instructs a read start. At step S709, the process loops until the read start occurs. Upon the receipt of the instruction for the read start, program control shifts to the reading of the synthesized data.

At step S710, the synthesized data are read, and stored in the memory 607. At step S711, the data synthesizer 611 syntheses the original data, which are stored at step S704, and the synthesized data, which are stored at step S710. At step S712, the resultant synthesized data are stored in the output data memory 613, and are printed by the color printer 614. The processing is thereafter terminated.

As described above, since the designation of a device for inputting a synthesized image is read as a symbol and the image is input by the device according to that instruction, switching of the input devices is voluntarily performed by the apparatus without requiring the switching of those devices by an operator, and thus processing efficiency is increased.

In the twelfth embodiment described above, a description is given by employing a color scanner and a video capture as specific connectors that are designated in a bar code. By increasing the types of input devices that are determined from bar codes by symbol analyzer 612 at step S705 in FIGS. 50A and 50B, any kind of input device can be set. If, for example, a floppy disk drive (FDD), a photomagnetic drive (MOD), or RS data are connected, these can be switched as input devices.

Thirteenth Embodiment

In the twelfth embodiment, a symbol for the designation of an input device is recorded on an original that is first read, and switching of the input devices is performed by reading that symbol. In a thirteenth embodiment, a symbol for the designation of an output device is recorded on an original that has been read first. A synthesizing process is performed by reading that symbol, the symbol that has been read with the original is analyzed before its output, and the output device is then changed according to the analysis result and prints an image.

Figure 52:
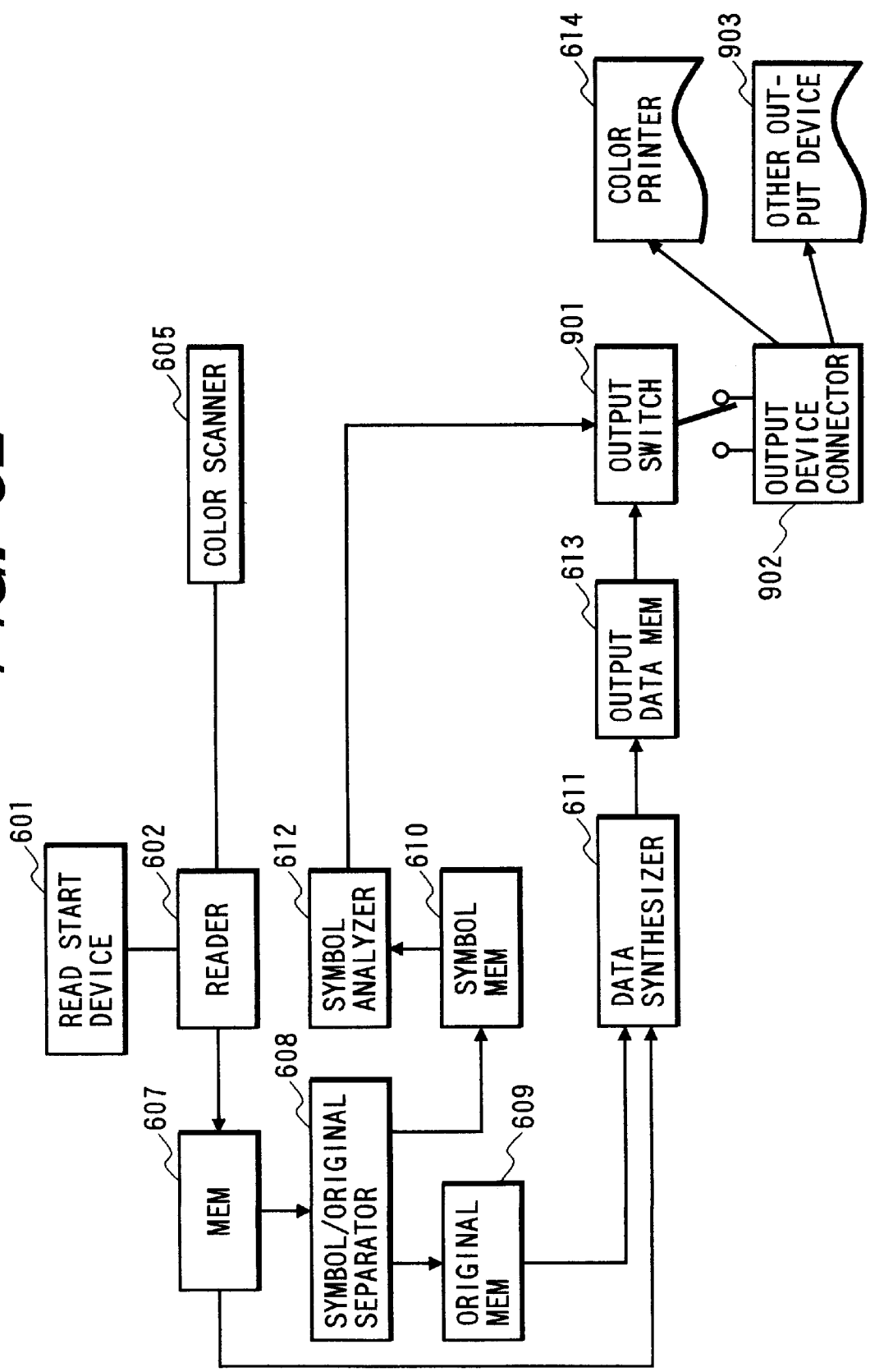
FIG. 52 is a block diagram illustrating the arrangement of an apparatus that represents the feature of a thirteenth embodiment of the present invention.

FIG. 52 is a block diagram wherein the arrangement for switching input devices in the twelfth embodiment is changed to that for switching output devices. A color scanner 695 is provided in place of the input switch 603, the input device connector 604, the color scanner 605, and the video capture 606 in FIG. 49. An output switch 901 and an output device connector 902 are additionally provided between the output data memory 613 and the color printer 614, and the color printer 614 and the other output devices 903 are connected to the output device connector 902. A monochrome printer and a copy machine, etc., are the other output devices.

Figures 53, 53A:
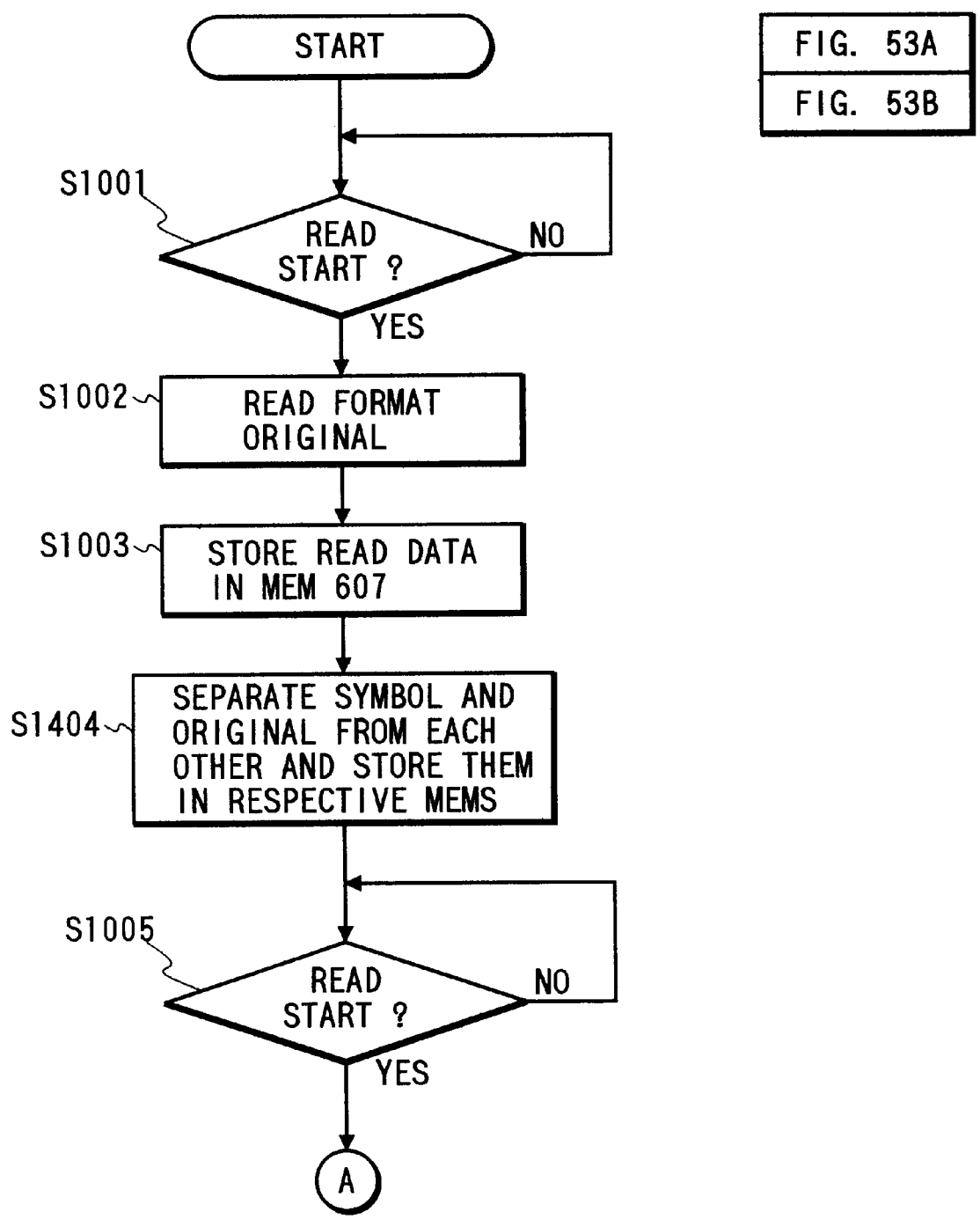
FIG. 53 is comprised of FIGS. 53A and 53B which are flowcharts showing the operating procedures for the thirteenth embodiment of the present invention.
Figure 53B:
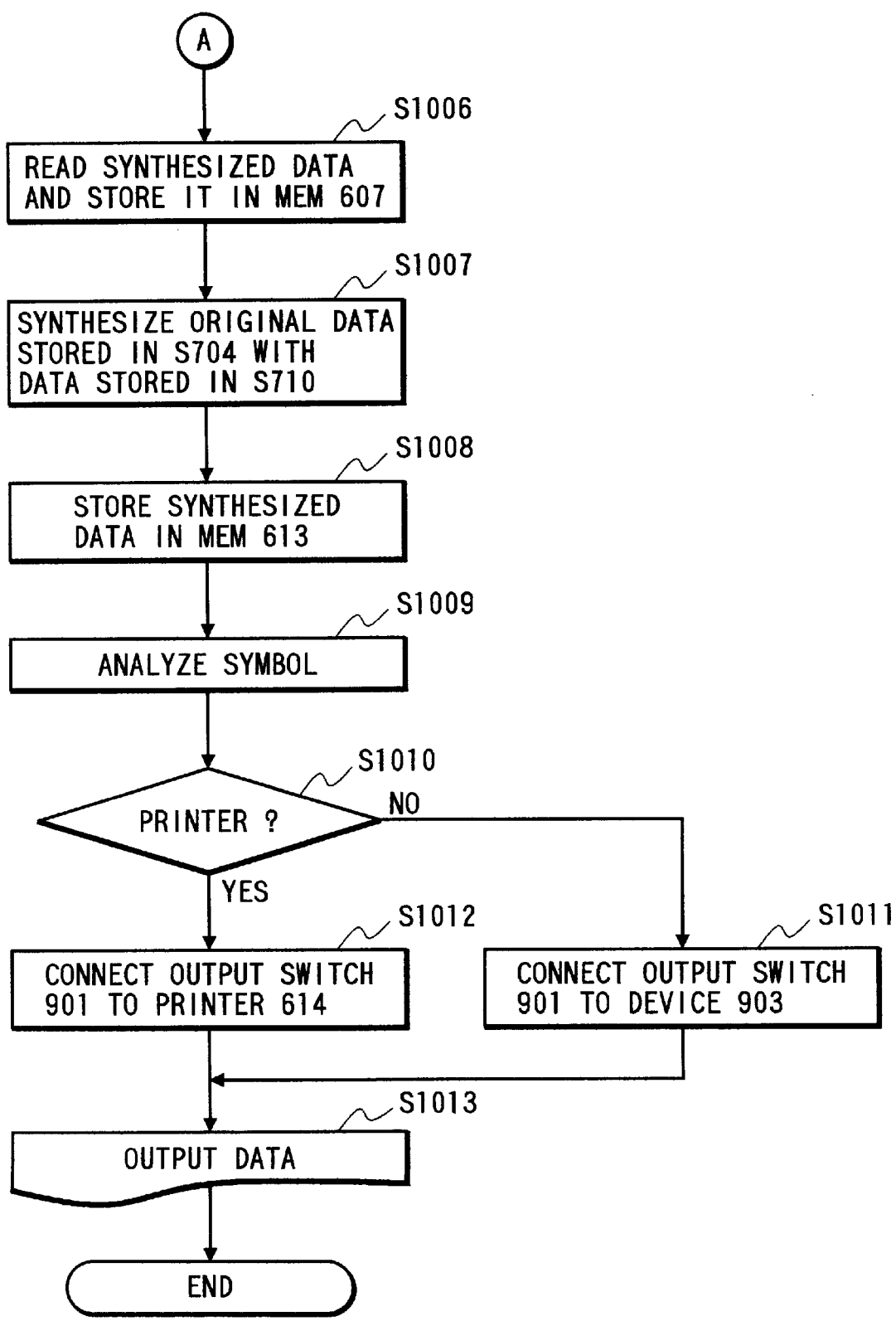

With the arrangement shown in FIG. 52, the processing for changing the output device in consonance with a symbol is realized by placing a procedure for the switching of input devices into the flowchart in FIGS. 50A and 50B at a position preceding the output. The processing at this time is shown in FIGS. 53A and 53B. In FIGS. 53A and 53B, steps S705 through S708 in FIGS. 50A and 50B are deleted from the flowcharts, and steps S1008 through S1013 are added. The difference in the flowcharts in FIGS. 53A and 53B from that in FIGS. 50A and 50B are specifically described.

At steps S1001 through A1008, the image that has been synthesized is stored in the output data memory 613. At step S1009, the symbol that is separated from the original at step S1004 and is stored in the symbol memory 610 is analyzed, and its output destination is determined at step S1010. According to the result of the determination, the output switch 901 is changed at step 1012 or at step S1011, and at step S1013, the contents in the output data memory 613 are output to the selected output destination.

Since the output destination is selected in the above described manner, an operator does not have to change the output devices each time, and efficient processing is performed.

Fourteenth Embodiment

In the twelfth and thirteenth embodiments, a symbol for switching an input device, or a symbol for switching an output device, is added to an original that has first been read, so that the switching of the devices is realized. In a fourteenth embodiment, a symbol for switching input devices and output devices is added to an original, and an input device and an output device are automatically changed by performing a single process. In this process, a symbol analyzer analyzes a symbol for input and output, and an input device is selected according to the analyzed symbol to read an image. Further, before the output date is obtained by synthesizing and is output, an output device is selected buy the output switch according to the analyzed symbol.

FIG. 54 is a block diagram showing the arrangement according to this embodiment. This arrangement includes both of the block arrangements shown in FIGS. 49 and 52, and is characterized by having both an input switch and an output switch.

Figure 55B:
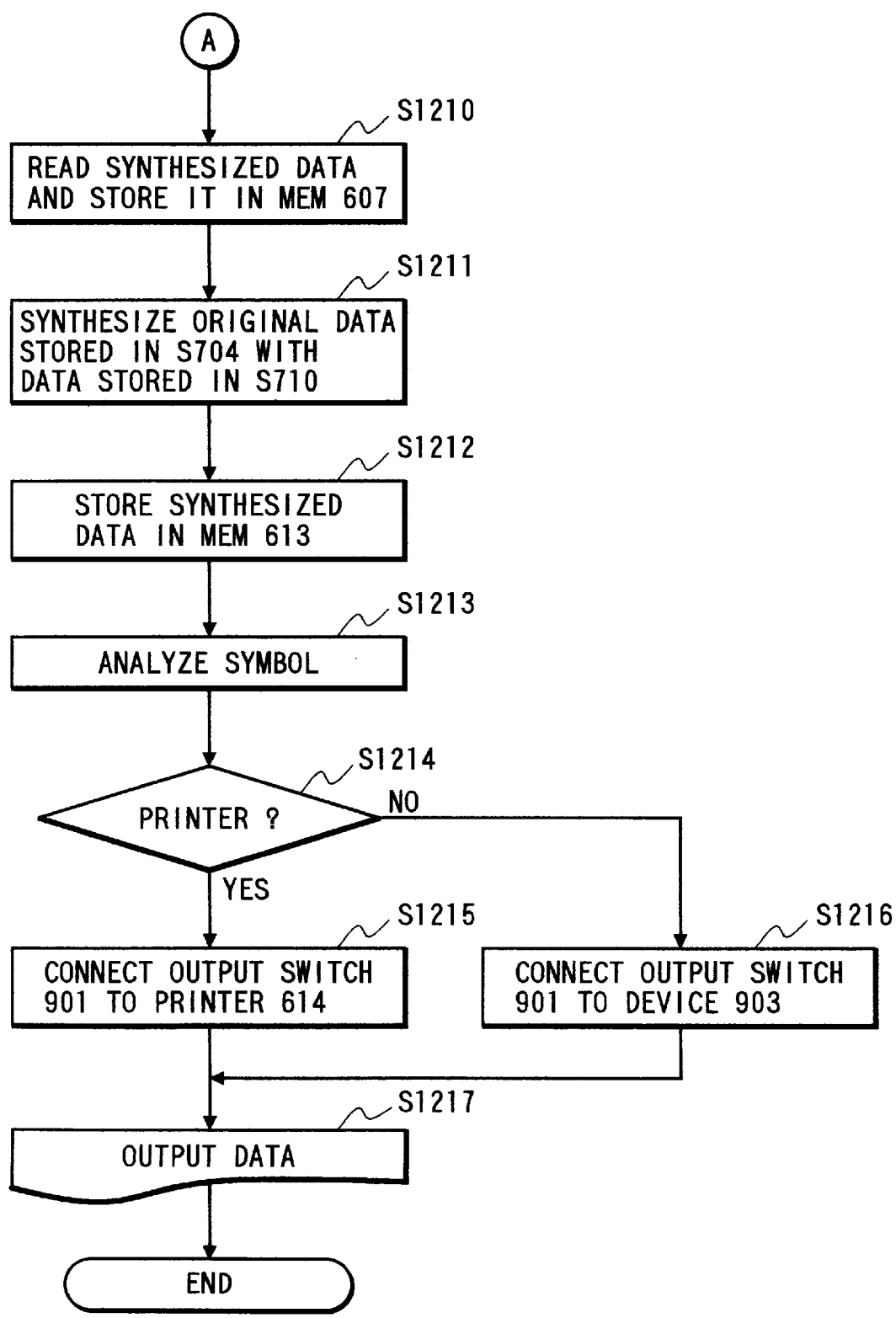
FIG. 55 is comprised of FIGS. 55A and 55B which are flowcharts showing the operating procedures for the fourteenth embodiment of the present invention.

FIGS. 55A and 55B are flowcharts showing the processing of this embodiment. This flowchart is provided by also combining the flowcharts shown in FIGS. 50A, 50B, 53A and 53B. Since a symbol that is read with an original includes information for instructing the switching of an input device and an output device, at steps S1205 and S1213 the symbol analyzer 612 analyzes the read symbol. Then, at steps S1207 and S1208 an input device is selected, while at steps S1215 and S1216 an output device is selected.

Since both the input device and the output device are designated by reading a symbol together with an original, it is not necessary for an operator to manually change the devices, and a processing series beginning that begins with the image input continues until its output can be efficiently performed.

Further, by designating an output device on an original in advance, an output device that is adequate for output data can be selected without a user being aware.

The present invention can be applied for use with a system that has a plurality of devices or for use with an apparatus that has a single device. Further, the present invention can be applied for a case where a program for carrying out the present invention is supplied to a system or to an apparatus to realize the present invention.

As is described above, according to an image processing method and an image processing apparatus of the present invention, the selective operation that is required for an image processing step is designated by a symbol that is read with an accompanying original in advance, the symbol is analyzed during the image processing and a corresponding process is performed, so that the selective operation is performed without requiring human effort and processing efficiency is increased.

Especially, a symbol, such as a bar code or a mark sheet, is added to an original to designate the processing, and the range, for stains and blank areas that occur during the data reading due to the performance of an input device that reads an original and an image. Therefore, automatically, the erasing of these stains or the correcting of blank areas is determined, and data in the optimal state are prepared and output without a user being aware. In addition, output data are prepared according to the instruction of a user by means of an easy operation (by only placing marks in a symbol, such as a mark sheet).

Thus, very complicated work is not at all necessary where data are read and a user erases or corrects data each time. Since this process is performed, the apparatus is simply structured and is provided at a low cost.

In addition, especially in an image processing apparatus to which a plurality of input devices or output devices are connected, a user does not have to change the connections of the input devices to the apparatus. A symbol for designating which input device is used for reading and which output device is used for outputting is added to an original that has first been read, and switching of the devices is performed according to the instruction described with the symbol. No human labor is required and the operation is very easily performed, so that the processing efficiency is improved. Further, by designating an output device on an original, an output device that is proper for output data is selected without a user being aware.

Since an original to which a bar code and another symbol are added is selected and read, when data are present at a position that falls outside a data area that is to be output, such data are assumed to be stains and are automatically erased without requiring complicated work.

Since an original to which a bar code and another symbol are added is selected and read, when isolated points are present within a data area that is to be output, such data are assumed to be stains and are automatically erased without requiring complicated work.

Since an original to which a bar code and another symbol are added is selected and read, when data blank areas are present within a data area that is to be output, such data blank areas are assumed to be data omission areas during the reading, and are automatically corrected without requiring complicated work.

Since an original with a mark sheet that is filled in is merely read, when data are present at a position that falls outside a data area that is to be output, such data are assumed to be stains and are automatically erased without requiring complicated work.

Since an original with a mark sheet that is filled in is merely read, when isolated points are present within a data area that is to be output, such data are assumed to be stains and are automatically erased without requiring complicated work.

Since an original with a mark sheet that is filled in is merely read, when data blank areas are present within a data area that is to be output, such data blank areas are assumed to be data omission areas during the reading, and are automatically corrected without requiring complicated work.

Symbols that represent a character area and an image area are added to the symbol on an original that includes a symbol, and an area to be searched is automatically determined.

Since an input device and/or an output device is selected in consonance with a symbol that is read with an image, data are input by a designated device and data are output to a designated device.

What is claimed is:

1. An image processing apparatus comprising:
    input means for inputting an original image having an image area containing an image, and a symbol area containing information indicative of an editing operation to be executed on the image in the image area, the image area being input without conversion;
    separation means for separating said original image that is input by said input means into said symbol area and said image area;
    analyzation means for analyzing said symbol area that is separated by said separation means to determine the information indicative of an editing operation to be executed on the image in the image area;
    execution means for performing a predetermined processing based on the information obtained by the result of analysis by said analyzation means to the image area separated by said separation means; and
    output means for outputting an image that is processed by said execution means.

2. An image processing apparatus according to claim 1, wherein said execution means includes correction means for correcting said image area that is separated by said separation means.

3. An image processing apparatus according to claim 2, wherein said correction means includes out-area erasing means for erasing an image that falls outside a range that is designated by said symbol area, isolated point erasing means for erasing an isolated point within said range, and blank area correcting means for correcting blank areas within said range.

4. An image processing apparatus according to claim 1, wherein said output means includes a color printer.

5. An image processing apparatus according to claim 1, wherein said input means includes a color scanner.

6. An image processing apparatus according to claim 1, wherein said symbol area is recorded with a bar code.

7. An image processing apparatus according to claim 1, wherein said symbol area is recorded with a mark sheet.

8. An image processing apparatus comprising:
    input means for inputting an original image having an image area containing an image, and a symbol area containing information indicative of an editing operation to be executed on the image in the image area, the image area being input without conversion;
    separation means for separating said original image that is input by said input means into said symbol area and said image area;
    analyzation means for analyzing said symbol area that is separated by said separation means to determine the information indicative of an editing operation to be executed on the image in the image area;
    out-area erasing means for erasing an image that falls outside a range that is designated by the information in said symbol area as determined by said analyzation means;
    isolated point erasing means for erasing an isolated point within said range;
    blank area correction means for correcting blank areas within said range;
    control means for controlling said out-area erasing means, said isolated point erasing means, and said blank area correction means in consonance with analysis results as determined by said analyzation means; and output means for outputting an image that is processed under control of said control means.

9. An image processing method comprising:

an input step of inputting an original image having an image area containing an image, and a symbol area containing information indicative of an editing operation to be executed on the image in the image area, the image area being input without conversion;

a separation step of separating said original image that is input at said input step into said symbol area and said image area;

an analyzation step of analyzing said symbol area that is separated at said separation step to determine the information indicative of an editing operation to be executed on the image in the image area;

an execution step of performing a predetermined processing based on the information obtained by the result of analysis by said analyzation step to the image area separated by said separating step; and an output step of outputting an image that is processed at said execution step.

10. An image processing method according to claim 9, wherein said execution step includes a correction step of correcting said image area that is separated at said separation step.

11. An image processing method according to claim 10, wherein said correction step includes an out-area erasing step of erasing an image that falls outside a range that is designated by said symbol area, an isolated point erasing step of erasing an isolated point within said range, and a blank area correcting step of correcting blank areas within said range.

12. An image processing method according to claim 9, wherein, at said output step, a color printer is included.

13. An image processing method according to claim 9, wherein, at said input step, a color scanner is included.

14. An image processing method according to claim 9, wherein said symbol area is recorded with a bar code.

15. An image processing method according to claim 9, wherein said symbol area is recorded with a mark sheet.

16. An image processing method comprising;

an input step of inputting an original image having an image area containing an image, and a symbol area containing information indicative of an editing operation to be executed on the image in the image area, the image area being input without conversion;

a separation step of separating said original image that is input at said input step into said symbol area and said image area;

an analyzation step of analyzing said symbol area that is separated at said separation step to determine the information indicative of an editing operation to be executed on the image in the image area;

an out-area erasing step of erasing an image that falls outside a range that is designated by the information in said symbol area as determined by said analyzation step;

an isolated point erasing step of erasing an isolated point within said range;

a blank area correction step of correcting blank areas within said range;

a control step of controlling said out-area erasing step, said isolated point erasing step, and said blank area correction step in consonance with analysis results as determined by said analyzation step; and an output step of outputting an image that is processed under control of said control step.

17. A computer readable medium having recorded thereon codes for implementing a computer implementable method for image processing comprising:

an input step of inputting an original image having an image area containing an image, and a symbol area containing information indicative of an editing operation to be executed on the image in the image area, the image area being input without conversion;

a separation step of separating said original image that is input at said input step into said symbol area and said image area;

an analyzation step of analyzing said symbol area that is separated at said separation step to determine the information indicative of an editing operation to be executed on the image in the image area;

an execution step of performing a predetermined processing based on the information obtained by the result of analysis by said analyzation step to the image area separated by said separating step; and an output step of outputting an image that is processed at said execution step.

18. A computer readable medium having recorded thereon codes for implementing a computer implementable method for image processing comprising:

an input step of inputting an original image having an image area containing an image, and a symbol area containing information indicative of an editing operation to be executed on the image in the image area, the image area being input without conversion;

a separation step of separating said original image that is input at said input step into said symbol area and said image area;

an analyzation step of analyzing said symbol area that is separated at said separation step to determine the information indicative of an editing operation to be executed on the image in the image area;

an out-area erasing step of erasing an image that falls outside a range that is designated by the information in said symbol area as determined by said analyzation step;

an isolated point erasing step of erasing an isolated point within said range;

a blank area correction step of correcting blank areas within said range;

a control step of controlling said out-area erasing step, said isolated point erasing step, and said blank area correction step in consonance with analysis results as determined by said analyzation step; and an output step of outputting an image that is processed under control of said control step.

* * * * *

UNITED STATES PATENT AND TRADEMARK OFFICE
CERTIFICATE OF CORRECTION

PATENT NO.    : 6,204,935 B1
DATED         : March 20, 2001
INVENTOR(S)   : Tsunenori Soma et al.

It is certified that error appears in the above-identified patent and that said Letters Patent is hereby corrected as shown below:

Title page,
Item [57], ABSTRACT,
Line 15, "correspond" should read -- corresponds --.

Drawings,
Sheet 34 of 47, FIG. 45 B,
"ABNOMAL" should read -- ABNORMAL --.

Column 1,
Line 9, "Back Ground" should read -- Background --; and
Line 46, "preformed" should read -- performed --.

Column 2,
Line 33, close up right margin;
Line 34, close up left margin;
Line 50, "such" should read -- such as --; and
Line 63, "as" should read -- an --.

Column 5,
Line 41, "are" should read -- which are --.

Column 9,
Line 42, "FIG. 10" should read -- ¶ FIG. 10 --.

Column 19,
Line 28, "are" should read -- is --.

UNITED STATES PATENT AND TRADEMARK OFFICE
CERTIFICATE OF CORRECTION

PATENT NO. : 6,204,935 B1
DATED : March 20, 2001
INVENTOR(S) : Tsunenori Soma et al.

It is certified that error appears in the above-identified patent and that said Letters Patent is hereby corrected as shown below:

Column 30,
Line 30, "date" should read -- data --.

Column 33,
Line 44, "comprising;" should read -- comprising: --

Signed and Sealed this

Eighth Day of January, 2002

Attest:

Attesting Officer

JAMES E. ROGAN
Director of the United States Patent and Trademark Office